US009047995B2

(12) United States Patent
Kropaczek et al.

(10) Patent No.: US 9,047,995 B2
(45) Date of Patent: Jun. 2, 2015

(54) METHOD AND SYSTEM FOR DESIGNING A NUCLEAR REACTOR CORE FOR UPRATED POWER OPERATIONS

(75) Inventors: David Joseph Kropaczek, Wilmington, NC (US); William Earl Russell, II, Wilmington, NC (US)

(73) Assignee: GLOBAL NUCLEAR FUEL—AMERICAS, LLC, Wilmington, NC (US)

( * ) Notice: Subject to any disclaimer, the term of this patent is extended or adjusted under 35 U.S.C. 154(b) by 2585 days.

(21) Appl. No.: 11/585,965

(22) Filed: Oct. 25, 2006

(65) Prior Publication Data
US 2007/0143083 A1  Jun. 21, 2007

Related U.S. Application Data

(63) Continuation-in-part of application No. 10/401,602, filed on Mar. 31, 2003, now Pat. No. 7,231,333, and a continuation-in-part of application No. 10/325,831, filed on Dec. 23, 2002, now Pat. No. 7,200,541, and a continuation-in-part of application No. 10/321,441, filed on Dec. 18, 2002, now Pat. No. 7,222,061.

(51) Int. Cl.
*G21C 19/19* (2006.01)
*G21D 3/00* (2006.01)
(Continued)

(52) U.S. Cl.
CPC *G21D 3/001* (2013.01); *G21C 5/02* (2013.01); *G21C 7/00* (2013.01);
(Continued)

(58) Field of Classification Search
USPC .......................................................... 376/267
See application file for complete search history.

(56) References Cited

U.S. PATENT DOCUMENTS

| 4,851,186 A | 7/1989 | Berte et al. ..................... 376/364 |
| 5,272,736 A | 12/1993 | Wolters, Jr. et al. .......... 376/267 |

(Continued)

FOREIGN PATENT DOCUMENTS

| EP | 1113456 A1 | 7/2001 |
| EP | 1113456 A1 * | 7/2001 |

(Continued)

OTHER PUBLICATIONS

European Search Report dated May 11, 2010 for corresponding European Application No. 07118797.5-2208.

(Continued)

*Primary Examiner* — Jack W Keith
*Assistant Examiner* — Sean P Burke
(74) *Attorney, Agent, or Firm* — Harness, Dickey & Pierce, P.L.C.

(57) ABSTRACT

In a method of designing a nuclear reactor core for uprated power operations, a set of constraints are inputted to be satisfied for uprated power operations, and a test reactor core design is generated based on the constraints. One or more automated tools may be selected from a set of automated tools to evaluate the test core design against the constraints. The selected tool may then be operated. Operation of the selected automated tool includes simulating reactor operation with the test core design, based on the constraints, to produce a plurality of outputs, comparing the outputs against the constraints, and providing data indicating constraints that were violated by the test core design during the simulation, based on the comparison. One or more of the automated tools are iterated until a test core design meets all constraints for uprated power operations, thereby representing an acceptable power uprate core design.

19 Claims, 32 Drawing Sheets

(51) Int. Cl.
*G21C 5/02* (2006.01)
*G21C 7/00* (2006.01)

(52) U.S. Cl.
CPC .... *G21Y 2002/201* (2013.01); *G21Y 2002/304* (2013.01); *G21Y 2004/30* (2013.01); *G21Y 2004/40* (2013.01); *Y02E 30/39* (2013.01)

(56) References Cited

U.S. PATENT DOCUMENTS

| | | | |
|---|---|---|---|
| 5,790,616 A | 8/1998 | Jackson | 376/245 |
| 5,790,618 A | 8/1998 | Fawks, Jr. | 376/259 |
| 5,912,933 A | 6/1999 | Shaug et al. | 376/216 |
| 5,923,717 A | 7/1999 | Fawks, Jr. | |
| 6,026,136 A | 2/2000 | Radkowsky | 376/173 |
| 6,075,529 A | 6/2000 | Tamegaya | 715/744 |
| 6,198,786 B1 | 3/2001 | Carroll et al. | 376/211 |
| 6,208,982 B1 | 3/2001 | Allen et al. | 706/11 |
| 6,243,860 B1 | 6/2001 | Holland | 717/141 |
| 6,263,038 B1 | 7/2001 | Kantrowitz et al. | 376/435 |
| 6,338,149 B1 | 1/2002 | Ciccone et al. | 714/38 |
| 6,381,564 B1 | 4/2002 | Davis et al. | 703/22 |
| 6,404,437 B1 | 6/2002 | Russell et al. | 345/473 |
| 6,430,247 B1 | 8/2002 | Mourlevat et al. | 376/254 |
| 6,526,116 B1 | 2/2003 | Nguyen et al. | 376/439 |
| 6,535,568 B1 | 3/2003 | Reese | |
| 6,701,289 B1 | 3/2004 | Garnett et al. | 703/14 |
| 6,748,348 B1 * | 6/2004 | Russell, II | 703/6 |
| 6,813,327 B1 | 11/2004 | Challberg | |
| 6,934,350 B1 | 8/2005 | Challberg et al. | 376/353 |
| 7,574,337 B2 | 8/2009 | Kropaczek et al. | |
| 7,804,929 B2 | 9/2010 | Karve et al. | |
| 8,109,766 B2 | 2/2012 | Russell, II et al. | |
| 2002/0085660 A1 | 7/2002 | Nakamaru et al. | 376/293 |
| 2002/0101949 A1 | 8/2002 | Nordberg | 376/122 |
| 2002/0101951 A1 | 8/2002 | Nakamaru et al. | 376/282 |
| 2002/0122521 A1 | 9/2002 | Bolger et al. | |
| 2003/0086520 A1 | 5/2003 | Russell et al. | 376/259 |
| 2004/0013220 A1 | 1/2004 | Casillas et al. | 376/245 |
| 2004/0052326 A1 | 3/2004 | Blanpain et al. | 376/411 |
| 2004/0059549 A1 | 3/2004 | Kropaczek et al. | 703/2 |
| 2004/0059696 A1 | 3/2004 | Kropaczek et al. | 706/46 |
| 2004/0066875 A1 | 4/2004 | Bazant | 376/381 |
| 2004/0096101 A1 | 5/2004 | Mori et al. | 382/162 |
| 2004/0101083 A1 | 5/2004 | Russell et al. | 376/256 |
| 2004/0122629 A1 | 6/2004 | Russell et al. | 703/2 |
| 2004/0122632 A1 | 6/2004 | Kropaczek et al. | |
| 2004/0191734 A1 | 9/2004 | Russell et al. | 434/218 |
| 2004/0220787 A1 | 11/2004 | Russell et al. | 703/6 |
| 2005/0015227 A1 | 1/2005 | Kropaczek et al. | 703/6 |
| 2005/0018806 A1 | 1/2005 | Gautier et al. | 376/406 |
| 2006/0149514 A1 | 7/2006 | Kropaczek et al. | 703/6 |
| 2006/0149515 A1 * | 7/2006 | Horton et al. | 703/6 |

FOREIGN PATENT DOCUMENTS

| | | |
|---|---|---|
| EP | 1113457 A1 | 7/2001 |
| EP | 1221701 | 7/2002 |
| EP | 1435626 | 7/2004 |
| EP | 1 524 674 | 4/2005 |
| EP | 1 675 127 | 6/2006 |
| EP | 1677314 A2 | 7/2006 |
| EP | 1 699 057 | 9/2006 |
| EP | 1699058 | 9/2006 |
| EP | 1 202 289 | 11/2006 |
| EP | 1 113 455 | 6/2012 |
| JP | 08-194088 | 7/1996 |
| JP | 9-304570 | 11/1997 |
| JP | 2001-264478 | 9/2001 |
| JP | 2001-296382 | 10/2001 |
| JP | 2002-181977 | 6/2002 |
| JP | 2002-257973 | 9/2002 |
| JP | 2005-010140 | 1/2005 |
| JP | 2005-114724 | 4/2005 |
| JP | 2006-017717 | 1/2006 |
| JP | 2006-017718 | 1/2006 |
| JP | 2006-177962 | 7/2006 |
| JP | 2006-189438 | 7/2006 |
| JP | 2006-189439 | 7/2006 |
| JP | 2006-189442 | 7/2006 |

OTHER PUBLICATIONS

Zhian Li, Samuel H. Levine, "Autoload, an Automatic Optimal Pressurized Water Reactor Reload Design System with an Expert Module" Nuclear Science and Engineering: 118, 1994, pp. 67-78.

Han Gon Kim, Soon Heung Chang, Byung Ho Lee, "Optimal Fuel Loading Pattern Design Using an Artificial Neural Network and a Fuzzy Rule-Based System" Nuclear Science and Engineering: 115, 1993 pp. 152-163.

Lian Shin Lin, Chaung Lin, "A Rule-Based Expert System for Automatic Control Rod Pattern Generation for Boiling Water Reactors" Nuclear Technology vol. 95 Jul. 1991, pp. 1-8.

Zhian Li, Samuel H. Levine, "Autoload, an Automated Optimal Pressurized Water Reactor Reload Design with an Expert Module" Nuclear Science and Engineering: 118, 1994, pp. 67-78.

Han Gon Kim, Soon Heung Chang, Byung Ho Lee, "Optimal Fuel Loading Pattern Design Using Artificial Neural Netwrok and a Fuzzy Rule-based System" Nuclear Science and Engineering: 115, 1993 pp. 152-163.

European Search Report dated Sep. 27, 2010 for corresponding European Application No. 07123175.7.

Mexican Office Action dated Jan. 17, 2011 issued in corresponding Mexican Application No. MX/a/2007/013337.

Office Action and Search Report from corresponding Taiwan patent application No. 096146831 dated Mar. 26, 2013 (English translation).

Notice of Reasons for Refusal for corresponding Japanese patent application No. 2007-325495 dated Dec. 18, 2012 with English translation.

Office Action from corresponding Japanese patent application No. 2007-325495 dated Dec. 3, 2013 (with partial English translation).

* cited by examiner

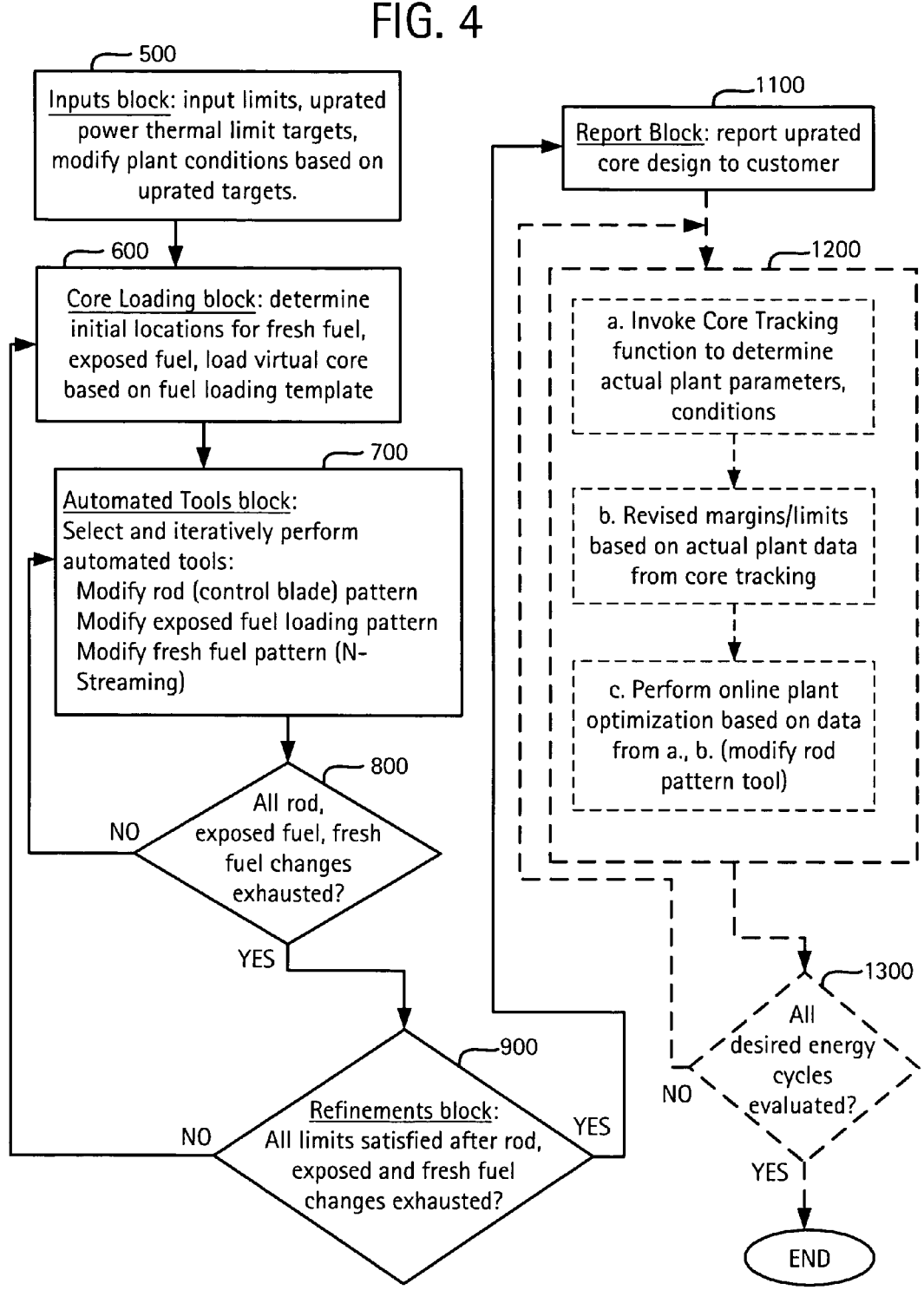

FIG. 5

| Constraint Description | Importance | Exposure Dependence | Design Value | Objective Add Funct. | Optimization Credits |
|---|---|---|---|---|---|
| Maximum MFLCPR | Nominal | ☐ Edit | 0.964 | ☐ | None |
| Maximum MFLPD | Nominal | ☐ Edit | 0.957 | ☐ | None |
| Maximum MAPLHGR | Nominal | ☐ Edit | 0.957 | ☐ | None |
| Minimum % Flow | Nominal | ☐ Edit | 85.0 | ☐ | None |
| Maximum % Flow | Nominal | ☐ Edit | 100.0 | ☐ | None |
| Eigenvalue Upper Tolerance (Δ Cycle) | None | ☐ Edit | 1.0E-4 | ☐ | None |
| Eigenvalue Lower Tolerance (Δ Cycle) | None | ☐ Edit | 1.0E-4 | ☐ | None |
| EOC Eigenvalue Upper Tolerance | None | | 0.0 | ☐ | None |
| EOC Eigenvalue Lower Tolerance | Nominal | | 0.0 | ☐ | Nominal |
| Minimum Cycle Length (MWD/st) | None | | 11500.0 | ☐ | None |
| Maximum Nodal Exposure Ratio (NEXRAT) | None | | 0.0 | ☐ | None |
| Maximum Bundle Average Exposure @ EOC | None | | 0.0 | ☐ | None |
| Minimum % Shutdown Margin | Nominal | ☐ Edit | 1.5 | ☐ | None |
| Maximum % Hot Excess | None | ☐ Edit | 0.0 | ☐ | None |
| Minimum % SLICS Margin | None | ☐ Edit | 0.0 | ☐ | None |
| Minimum % Hot Excess @ 200 | None | | 0.0 | ☐ | None |
| Maximum Hot Excess Slope (%/(MWD/st)) | None | | 0.0 | ☐ | None |
| Minimum Average Void Fraction | None | ☐ Edit | 0.0 | ☐ | None |
| Maximum Average Void Fraction | None | ☐ Edit | 0.0 | ☐ | None |
| Minimum Axial Void Tilt (AVT) | None | ☐ Edit | 0.0 | ☐ | None |
| Maximum Axial Void Tilt (AVT) | None | ☐ Edit | 0.0 | ☐ | None |
| Minimum Axial Power Tilt (APT) | None | ☐ Edit | 0.0 | ☐ | None |
| Maximum Axial Power Tilt (APT) | None | ☐ Edit | 0.0 | ☐ | None |
| Minimum Axial Peak | None | ☐ Edit | 0.0 | ☐ | None |
| Maximum Axial Peak | None | ☐ Edit | 0.0 | ☐ | None |
| Maximum Integrated Power | None | ☐ Edit | 0.0 | ☐ | None |

FIG. 9

| | Filter Burnt Fuel | | | ☒ |
|---|---|---|---|---|

- ☑ K∞  — 642
- ☑ Exposure
- ☑ Cycle

> 644, 646
- `> ▼`  `1.2`
- `< ▼`  `2000`
- 644, 646

| | Cycle |
|---|---|
| ☑ | 2 |
| ☐ | 3 |
| ☑ | 4 |
| ☐ | |
| ☐ | |

- ☑ Pedigree

| | Status |
|---|---|
| ☑ | RU |
| ☑ | RP |
| ☐ | DC |
| ☐ | DD |

- ☑ Product Line

| | Product |
|---|---|
| ☑ | GE 11 |
| ☑ | GE 12 |
| ☐ | GE 6 |
| ☐ | GE 8 |

[ OK ]

[ CANCEL ]

Fresh Bundle Type ~650

| BName | K∞ | Product Line | Avg Enrich... | Gad V |
|---|---|---|---|---|
| wxy01 | 0.9988 | | Ascending | 5.0 |
| wxy05 | 1.0 | | | 7.0 |
| wxy02 | 1.2302 | | Descending | 10.0 |
| wxy04 | 1.3999 | | GE 10test01 | 4.5 | 10.0 |
| wxy03 | 1.4 | | GE 11test01 | 1.2 | 3.0 |

630 →
632 ▶
634 ▲
636

Fresh Bundle Pool ~660

| # | BName | K∞ | Product Line | Avg Enrich... |
|---|---|---|---|---|
| 1 | | | | |
| 2 | | | | |
| 3 | | | | |

662

Total: 0   0 row(s) selected

FIG. 12

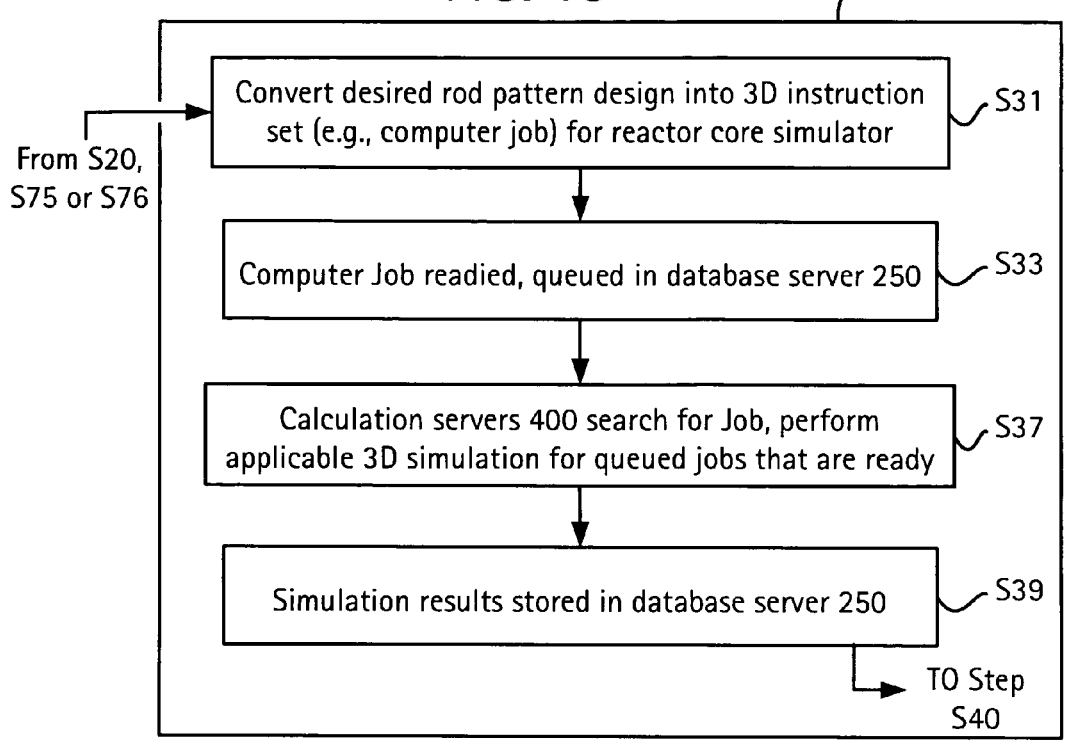
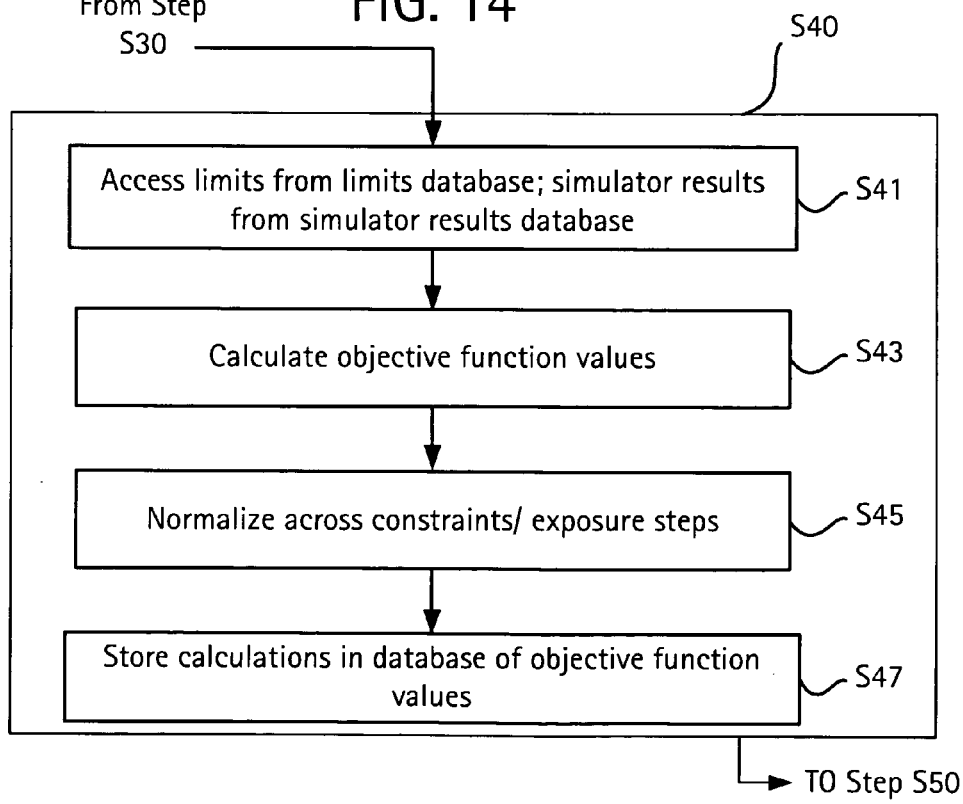

FIG. 15

| ePrometheus - Browns Ferry 2 - Cycle 11 - Version 1.0 Official Test Case (Do Not Modify) (Response Surface 1 Iteration 1) - CS ID: 846 | | | |
|---|---|---|---|
| WorkSpace Input Run View Reports Window Help | | | |

Summary

| Max MFLPD | 0.938 | Max MAPLHGR | 0.906 |
|---|---|---|---|
| Max MFLCPR | 0.832 | Max CSDM (%) | 1.553 |
| Max Flow (%) | 99.86 | Min Flow (%) | 85.26 |
| Max Eigenvalue Δ | 1.0E-4 | Min Eigenvalue Δ | -1.0E-4 |
| EOCk | 1.00129 | Cycle Length (MWD/st) | 14500.0 |
| Objective Function | 0.2180122 | | |

| | Constraint | Violated | Contribution | % Contribution |
|---|---|---|---|---|
| ☐ | Minimum Cycle Length | No | 0.0 | 0.00 |
| ☐ | Maximum Average MAPLHGR | No | 0.0 | 0.00 |
| ☐ | Maximum Average MFLPD | No | 0.0 | 0.00 |
| ☐ | Maximum Average MFLCPR | No | 0.0 | 0.00 |
| ☐ | Maximum Hot Excess Slope | No | 0.0 | 0.00 |
| ☐ | Minimum Hot Excess @ 200 | No | 0.0 | 0.00 |
| ☐ | EOC Eigenvalue Upper Tolerance | No | 0.0 | 0.00 |
| ☑ | EOC Eigenvalue Lower Tolerance | Yes | 0.17135143 | 78.24 |
| ☐ | Eigenvalue Upper Tolerance (Δ Cycle) | No | 0.0 | 0.00 |
| ☐ | Eigenvalue Lower Tolerance (Δ Cycle) | No | 0.0 | 0.00 |
| ☐ | Minimum % Flow | No | 0.0 | 0.00 |
| ☐ | Maximum % Flow | No | 0.0 | 0.00 |
| ☐ | Maximum % Hot Excess | No | 0.0 | 0.00 |
| ☐ | Minimum % SLCS Margin | No | 0.0 | 0.00 |
| ☐ | Minimum Average Void Fraction | No | 0.0 | 0.00 |
| ☐ | Maximum Average Void Fraction | No | 0.0 | 0.00 |
| ☐ | Minimum Axial Void Tilt (AVT) | No | 0.0 | 0.00 |
| ☐ | Maximum Axial Void Tilt (AVT) | No | 0.0 | 0.00 |
| ☐ | Minimum Axial Power Tilt (APT) | No | 0.0 | 0.00 |
| ☐ | Maximum Axial Power Tilt (APT) | No | 0.0 | 0.00 |
| ☐ | Minimum Axial Peak | No | 0.0 | 0.00 |
| ☐ | Maximum Axial Peak | No | 0.0 | 0.00 |
| ☐ | Minimum % Shutdown Margin | No | 0.0 | 0.00 |
| ☐ | Maximum Integrated Power | No | 0.0 | 0.00 |
| ☑ | Maximum MFLCPR | Yes | 0.006201509 | 2.83 |
| ☐ | Maximum MAPLHGR | No | 0.0 | 0.00 |
| ☑ | Maximum MFLPD | Yes | 0.041459266 | 18.93 |
| ☐ | Maximum Peak Nodal Exposure (NEXRAT) | No | 0.0 | 0.00 |
| ☐ | Maximum Bundle Average Exposure @ EOC | No | 0.0 | 0.00 |
| ☐ | Number of Pin Types | No | 0.0 | 0.00 |
| ☐ | U235 Efficiency | No | 0.0 | 0.00 |

Graph Selected | Select All | Deselect All

METHOD AND SYSTEM FOR DESIGNING A NUCLEAR REACTOR CORE FOR UPRATED POWER OPERATIONS

PRIORITY STATEMENT

This application is a continuation-in-part of, and claims domestic priority benefits under 35 U.S.C. §120 to, the following and commonly assigned U.S. patent applications: Ser. No. 10/321,441 to William Earl Russell, II, et al., filed Dec. 18, 2002 now U.S. Pat. No. 7,222,061 and entitled "Method and Arrangement for Developing Rod Patterns in Nuclear Reactors; Ser. No. 10/401,602 to William Earl Russell, II et al., filed Mar. 31, 2003 now U.S. Pat. No. 7,231,333 and entitled "Method and Arrangement for Developing Core Loading Patterns in Nuclear Reactors; and Ser. No. 10/325,831 to David J. Kropaczek et al., filed Dec. 23, 2002 now U.S. Pat. No. 7,200,541 and entitled "Method and Arrangement for Determining Nuclear Reactor Core Designs". The entire contents of each of these applications are hereby incorporated by reference herein.

BACKGROUND OF THE INVENTION

1. Field of the Invention

Example embodiment(s) of the present invention are related in general to a method and system for designing a nuclear reactor core for increased power operations.

2. Description of the Related Art

A core of a nuclear reactor such as boiling water reactor (BWR) or pressurized water reactor (PWR) has several hundred individual fuel bundles of fuel rods (BWR) or groups of fuel rods (PWR) that have different characteristics. These bundles (or fuel rod groups) are arranged so that interaction between rods within a fuel bundle, and between fuel bundles satisfies all regulatory and reactor design constraints, including governmental and customer-specified constraints. Additionally for a BWR, the control mechanisms, e.g. rod pattern design and core flow, must be determined so as to optimize core cycle energy. Core cycle energy is the amount of energy that a reactor core generates before the core needs to be refreshed with new fuel elements, such as is done at an outage.

In the case of a BWR, for example, the number of potential fuel bundle arrangements within the core and individual fuel rod types within a bundle may be in excess of several hundred factorials. From these many different possible configurations, only a small percentage of fuel bundle designs, defined by an arrangement of fuel rod types, may satisfy all applicable design constraints for a particular core of a nuclear reactor. Further, only a small percentage of these fuel bundle designs, which do satisfy all applicable design constraints, are economical.

Conventionally, a typical fuel bundle useable in a BWR core may include between about 10 to in excess of 30 different fuel rod types therein, and hence different fuel bundle assembly configurations. This is undesirable, in that the greater the number of different rod types, the greater the manufacturing complexities and cost, which may result in higher bundle costs to the consumer.

Traditionally, rod pattern, fuel bundle and/or core design determinations have been made on a trial and error basis. Specifically, and based on only the past experience of the engineer or designer, in designing a particular design an initial design was identified. The initially identified design, such as a particular fuel bundle design for a core, was then simulated in a virtual core by computer. If a particular design constraint was not satisfied, then the arrangement was modified and another computer simulation was run. Many weeks of resources typically were required before an appropriate design was identified using the above-described procedure.

For example, one conventional process being used is a stand-alone manual process that requires a designer to repeatedly enter reactor plant specific operational parameters into an ASCII text file, which may serve as an input file. Data entered into the input file may include the configuration of fresh and exposed fuel bundle placements, blade notch positions of control blades (if the evaluated reactor is a boiling water reactor (BWR)), soluble boric acid concentration (if a PWR, for example), core flow, core exposure (e.g., the amount of burn in a core energy cycle, measured in mega-watt days per short ton (MWD/st), etc.

A Nuclear Regulatory Commission (NRC) licensed core simulation program, which may be embodied as a software program running on a suitable computer, for example, reads the resulting input file and outputs the results of the simulation to a text or binary file. A designer then evaluates the simulation output to determine if the design criteria have been met, and also to verify that no violations of margins to thermal limits have occurred. Failure to meet design criteria (i.e., violations of one or more limits) requires a manual designer modification to the input file. Specifically, the designer would manually change one or more operational parameter(s) and rerun the core simulation program. This process may be repeated until a satisfactory design was achieved.

This process is time consuming. The required ASCII text files are laborious to construct, and often are error prone. The files are fixed-format and extremely long, sometimes exceeding five thousand or more lines of code. A single error in the file results in a crash of the simulator, or worse, results in a mildly errant result that may be hard to initially detect, but will profligate with time and iterations to perhaps reduce core cycle energy when placed in an actual operating nuclear reactor core. Additionally, no assistance is provided via the manual iterative process in order to guide a designer toward a more favorable solution. In the current process, the responsible designer or engineer's experience and intuition are the sole means of determining a design solution.

BRIEF DESCRIPTION OF THE INVENTION

An example embodiment is directed to a method of designing a nuclear reactor core for uprated power operations. In the method a set of constraints are inputted to be satisfied for uprated power operations, and a test reactor core design is generated based on the constraints. One or more automated tools may be selected from a set of automated tools to evaluate the test core design against the constraints. The selected tool may then be operated. Operation of the selected automated tool includes simulating reactor operation with the test core design, based on the constraints, to produce a plurality of outputs, comparing the outputs against the constraints, and providing data indicating constraints that were violated by the test core design during the simulation, based on the comparison. One or more of the automated tools are iterated until a test core design meets all constraints for uprated power operations, thereby representing an acceptable power uprate core design.

Another example embodiment is directed to a system for designing a core of a nuclear reactor for increased power output. The system includes a memory for storing a test reactor core design to be evaluated for a reactor plant of interest, an interface receiving a set of constraints to be satisfied for uprated power operations in the core of the plant of interest, and a processor iterating one or more automated tools useable to evaluate the test design against the constraints. The interface enables selection of one or more of the automated tools to simulate reactor operation of the test design, based on the constraints, to produce a plurality of outputs. The processor iterates the selected automated tool to compare the outputs against the constraints and to generate data via the interface indicating any constraints violated by the test core design during the simulation, based on the comparison.

Another example embodiment is directed to a core for a nuclear reactor plant which enables the plant to operate at greater than 100% of its currently-licensed power level for one or more energy cycles. The core has been loaded in accordance with a power uprate core design determined using a set of automated tools employing an optimization process to generate a core design for the plant which satisfies operating limits for operation at greater than 100% of its currently-licensed power level. The automated tools include a rod pattern design tool, a core loading pattern design tool and a fresh fuel bundle type design tool to generate the core design.

BRIEF DESCRIPTION OF THE DRAWINGS

Example embodiments of the present invention will become more apparent by describing, in detail, example embodiments thereof with reference to the attached drawings, wherein like elements are represented by like reference numerals, which are given by way of illustration only and thus do not limit the example embodiments of the present invention.

FIG. 4 is a process flow diagram for illustrating a method of designing a nuclear reactor core for power uprate operations in accordance with an example embodiment of the invention.

FIG. 5 is a screen shot to illustrate example client-inputted plant specific constraints

FIG. 9 is a screen shot illustrating the filter tool 632.

FIG. 10 is a screen shot to illustrate a load fresh window displayed by the loading map editor 600 for loading of fresh bundles into the fuel template.

FIG. 12 is a screen shot illustrating how a control blade sequence may be entered.

FIG. 13 is a flow chart illustrating simulation Step S30 in further detail.

FIG. 14 is a flow diagram illustrating the comparing step of FIG. 11 in further detail.

FIG. 15 is a screen shot to illustrate exemplary graphical data available to the user for review after completion of the objective function calculations.

FIG. 21 illustrates a screen shot of an exemplary optimization constraints page listing optimization constraints associated with an optimization problem of boiler water reactor core design.

DETAILED DESCRIPTION OF EXAMPLE EMBODIMENTS

As will be described in more detail below, the example embodiments are directed to a method and system for designing a nuclear reactor core for increased power operations. The system may include a graphical user interface (GUI) and a processing medium (e.g., software-driven program, processor, application(s), etc.) to enable a user of the program to virtually simulate a test initial reactor core design in an uprated power environment.

Via the GUI, the user inputs constraints or limits related to requirements for operating a reactor core above 100% of its currently-licensed power level, and generates an initial test reactor core design. The user then may select one or more automated design tools to modify the test reactor core design in order to satisfy the input constraints.

Each automated design tool may be embodied as a software-driven application or program to develop and/or optimize certain core features or parameters, including, but not limited to, an automated tool to modify the rod pattern (control blade pattern) for the core to meet uprated power requirements; an automated tool to modify a core loading pattern in the core to meet uprated power requirements, and an automated core design tool to optimize and/or determine desired unique fresh fuel bundle types and placement in the core, etc. For each tool, the user may initiate a reactor simulation (e.g., 3D simulation using simulation codes licensed by the NRC) of the modified core design, and view outputs from the simulation.

Each automated tool utilizes an objective function to determine how closely a simulated modified core design meets the constraints. The objective function is a mathematical equation that incorporates the constraints or limits and quantifies the core design's adherence to the limits. The GUI presents a graphic illustration of which outputs violate which constraints, as determined by the objective function. Via the GUI, the user may then modify the core design. This may constitute a change in bundle design, control rod placement, exposed or fresh fuel placement, etc., and repeating the simulation to evaluating if there is any performance improvement in the modified design. The modifying, simulating and evaluating simulation outputs against the constraints may be iteratively repeated until a core design satisfies all limits (inclusive of limits for uprated power operations) so as to operate a reactor loaded based on the acceptable power uprate core design at increased power, or within a margin to given limits(s) that are acceptable to the user and/or customer.

Figure 1:
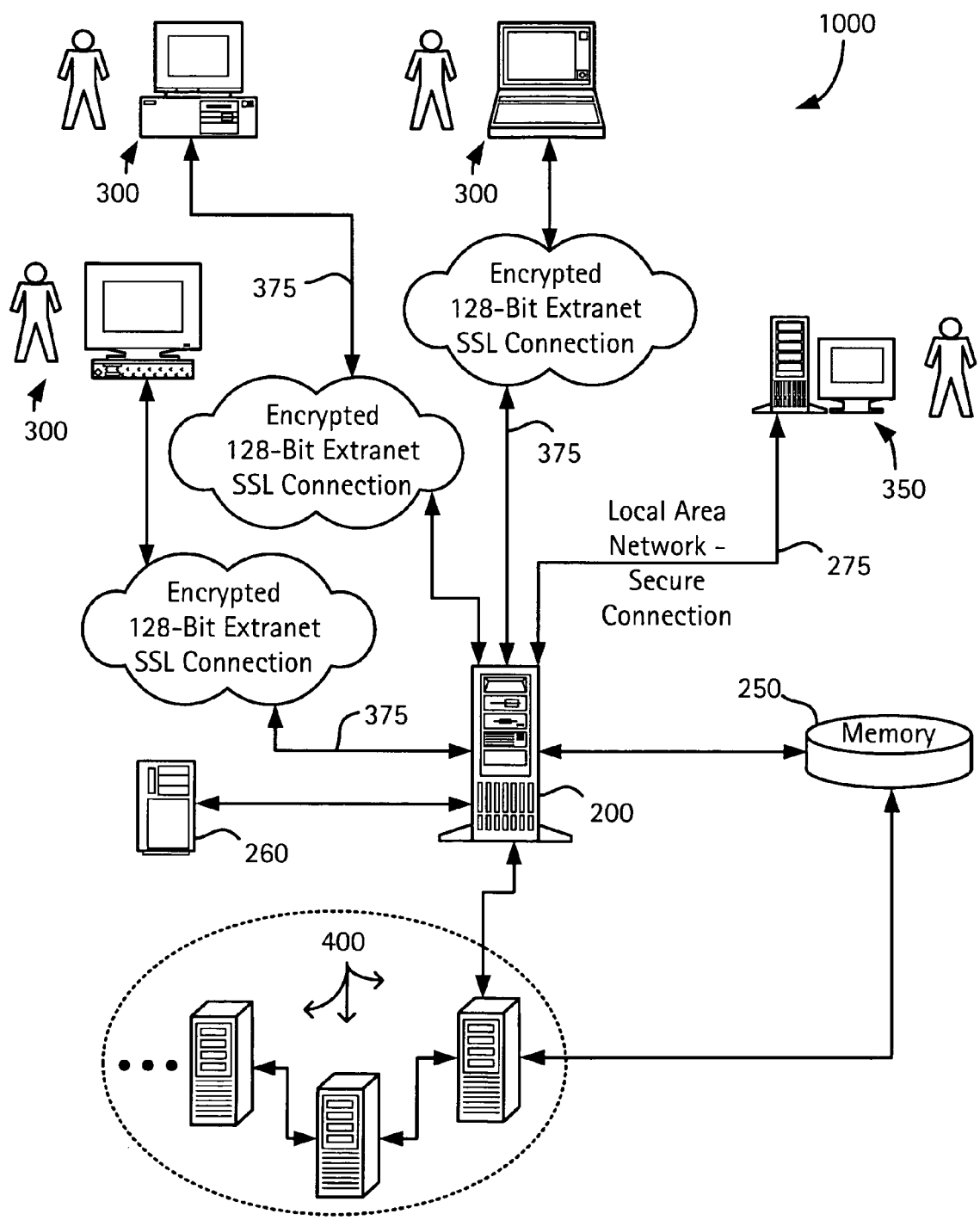
FIG. 1 illustrates an arrangement for implementing a method of designing a nuclear reactor core for uprated power operations in accordance with an example embodiment of the invention.

FIG. 1 illustrates a system for implementing the example method in accordance with an exemplary embodiment of the invention. Referring to FIG. 1, system 1000 may include an application server 200, which may serve as a central nexus of an accessible website, for example. The application server 200 may be embodied as any known application server software, such as Citrix MetaFrame Presentation server, for example. Application server 200 may be operatively connected to a plurality of calculation servers 400, a cryptographic server 260 and to a memory 250. Memory 250 may be embodied as a relational database server, for example.

A plurality of external users 300 may communicate with application server 200 over a suitable encrypted medium such as an encrypted 128-bit secure socket layer (SSL) connection 375, although the present invention is not limited to this encrypted communication medium. An external user 300 may connect to the application server 200 over the Internet or from any one of a personal computer, laptop, and personal digital assistant (PDA), etc., using a suitable interface such as a web-based Internet browser. Further, application server 200 is accessible to internal users 350 via a suitable local area network connection (LAN 275), so that internal users 350 have access over an intranet for example. Hereafter for reasons of brevity, 'user' is employed generically to denote any of an external user 300, internal user 350 or other designer accessing system 1000. For example, the user may be any of a representative of a nuclear reactor plant accessing the website to determine a desired core design for his or her nuclear reactor, and/or a vendor hired by a reactor plant site to develop an uprated core design for their plant by using the example method and system of the present invention.

The application server 200 provides a centralized location for users to access an application. Essentially, each user application session may be running on the server but displayed locally to the user access device (e.g., PC) allowing the user to interact with the application. However, this means of deployment is provided as an exemplary embodiment, and does not limit a given user from running the application locally on their access device. The application is responsible for directing all calculations and accessing of data in order to calculate objective function values, and for the creation of suitable graphical representations of various features of a core design that a user may desire to review. The graphical information is communicated over the 128-bit SSL connection 375 or LAN 275, to be displayed on a suitable display device of the user.

Figure 2:
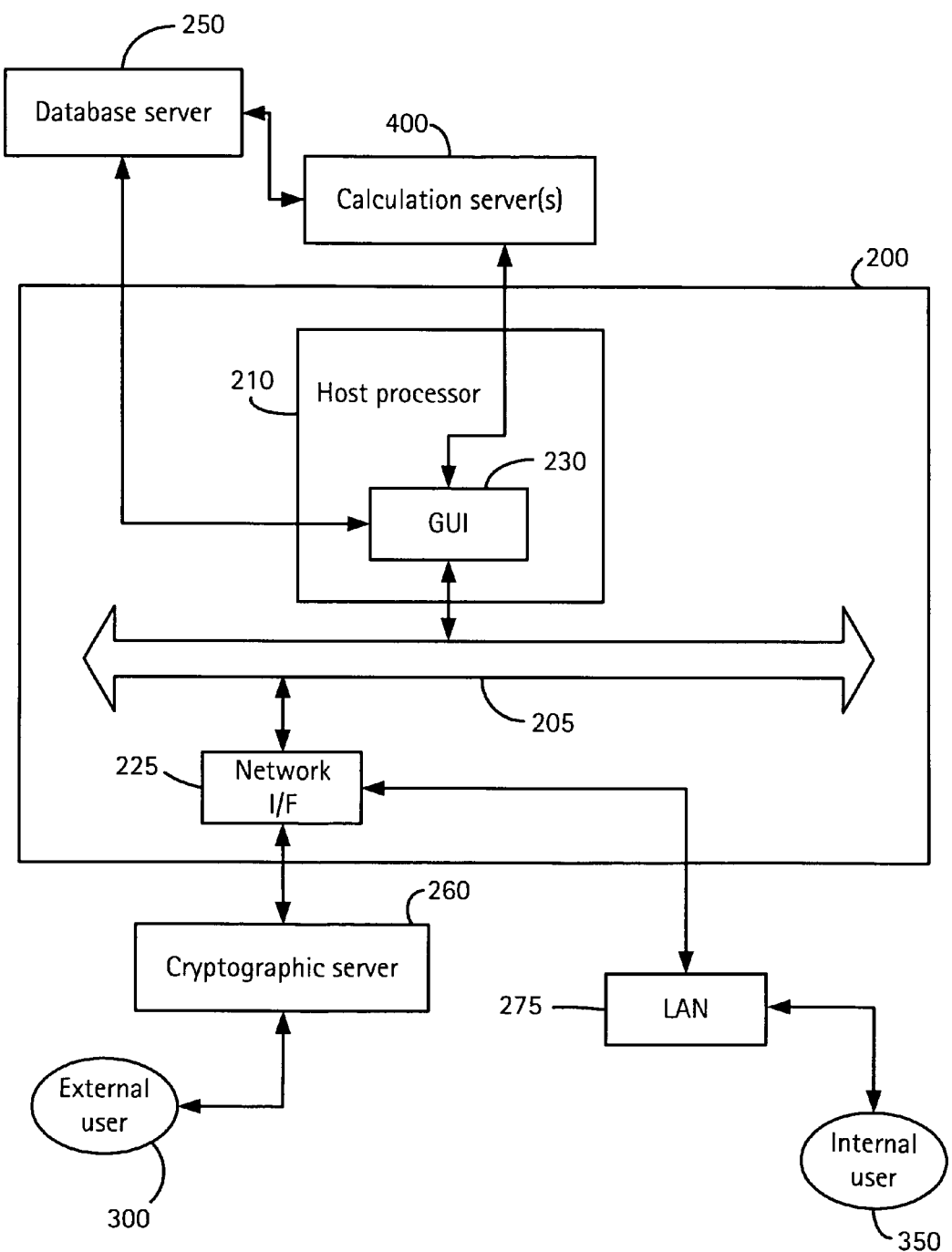
FIG. 2 illustrates an application server of the arrangement shown in FIG. 1.

FIG. 2 illustrates an application server 200 associated with the system of FIG. 1. Referring to FIG. 2, application server 200 utilizes a bus 205 to connect various components and to provide a pathway for data received from the users. Bus 205 may be implemented with conventional bus architectures such as peripheral components interconnect (PCI) bus that is standard in many computer architectures. Alternative bus architectures such as VMEBUS, NUBUS, address data bus, RDRAM, DDR (double data rate) bus, etc. could of course be utilized to implement bus 205. Users communicate information to application server 200 over a suitable connection (LAN 275 and/or via network interface 225) to communicate with application server 200.

Application server 200 may also include a host processor 210, which may be constructed with conventional microprocessors such as currently available PENTIUM processors. Host processor 210 represents a central nexus from which all real time and non-real functions in application server 200 are performed, such as graphical-user interface (GUI) and browser functions, directing security functions, directing calculations such as calculation of the objective functions for various limits, etc., for display and review by the user. Accordingly, host processor 210 may include a GUI 230 which may be accessed through the use of a browser. Browsers are software devices which present an interface to, and interact with, users of the system 1000. In the example embodiment, a browser in conjunction with a Citrix ICA client (part of the commercially available Citrix MetaFrame Access Suite software) may be responsible for formatting and displaying the GUI 230.

Browsers are typically controlled and commanded by the standard hypertext mark-up language (HTML). However, the application being presented or "served" to the user which allows the user to control decisions about calculations, displayed data, etc. may be implemented using C#, Java or Visual Fortran or any combination thereof. In addition, other well-known high-level languages maybe incorporated in the applications implementation (e.g., C, C++, etc.). All of these languages may be customized or adapted for the specific details of a given application or implementation, and images may be displayed in the browser using well known JPG, GIF, TIFF and other standardized compression schemes, other non-standardized languages and compression schemes may be used for the GUI 230, such as XML, ASP.NET, "homebrew" languages or other known non-standardized languages and schemes. Application server 200 through Network I/F 225 may be operatively connected to a cryptographic server 260. Accordingly, application server 200 implements all security functions by using the cryptographic server 260, so as to establish a firewall to protect the system 1000 from outside security breaches. Further, cryptographic server 260 secures external access to all personal information of registered users.

Application server 200 may be also operatively connected to a plurality of calculation servers 400. The calculation servers 400 may perform some or all the calculations required to process user entered data, direct simulation of a core design, calculate values for comparison as to be described in further detail below, and to provide results which may be displayed via, the GUI 230, and presented by the application server 200.

The calculation servers 400 may be embodied as WINDOWS 2000 servers, for example, although other hardware (e.g., Alpha, IA-64) and platforms (e.g., Linux, Unix) are possible. More particularly, the calculation servers 400 may be configured to perform a multitude of complex computations which may include, but are not limited to, configuring the objective function and computing objective function values, executing a 3D simulator program to simulate reactor core operation on a particular core design to be evaluated, and to generate outputs from the simulation, providing results data for access and display by a user via GUI 230, and iterating an optimization routine as to be described in further detail below.

Figure 3:
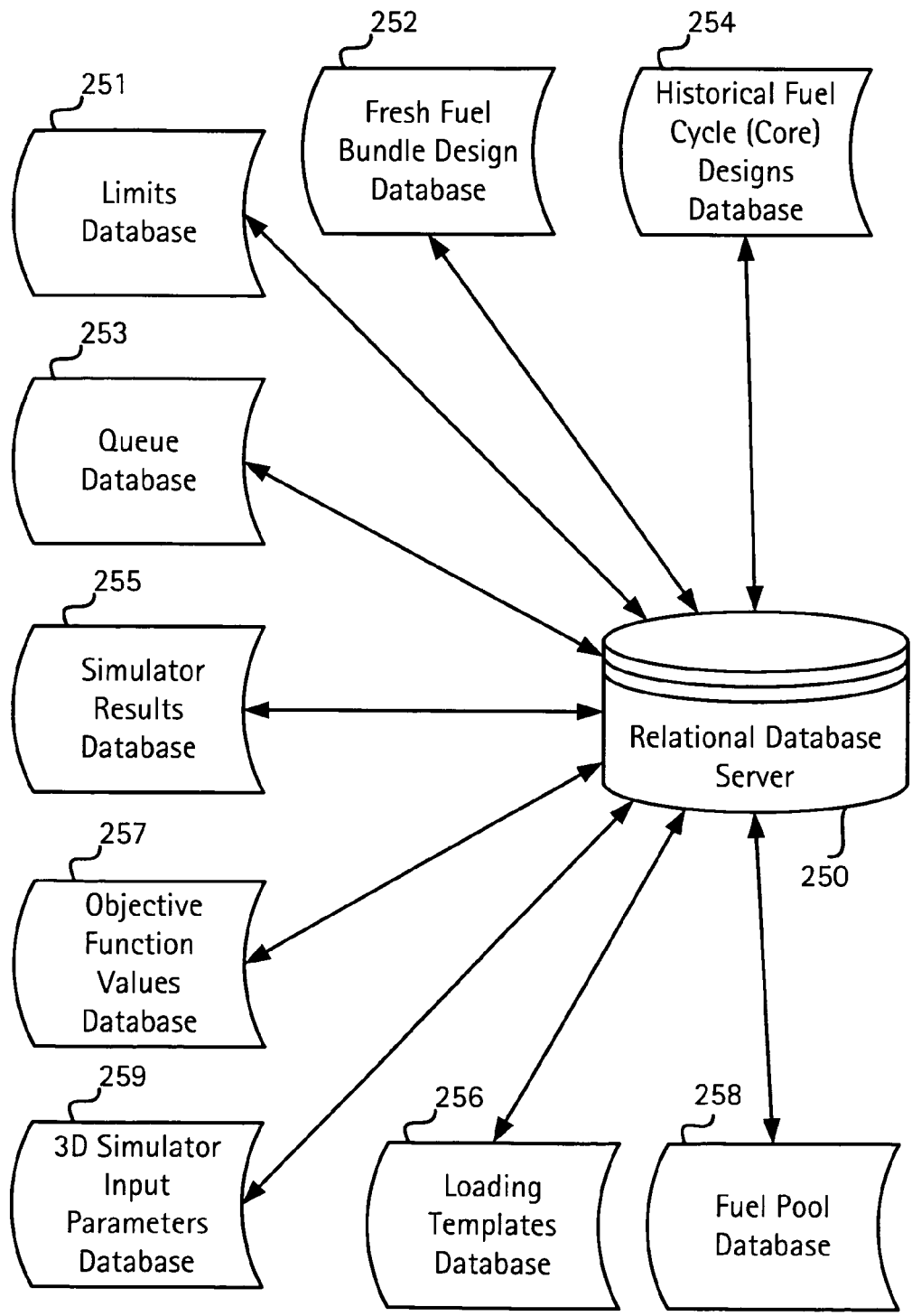
FIG. 3 illustrates the memory shown in FIG. 1 in more detail as a relational database with subordinate databases, in accordance with an example embodiment of the invention.

FIG. 3 illustrates an exemplary database server 250 in accordance with an exemplary embodiment of the invention. Memory or database server 250 may be a relational database such as an Oracle relational database. Relational database server 250 may contain a number of subordinate databases that handle all the necessary data and results in order to implement the method of the present invention. For example, relational database server 250 may include storage areas which contain subordinate databases such as limits database 251, which is a database that stores all the user input limits and/or design constraints for all core designs that are evaluated for a particular nuclear reactor. There may also be a fresh fuel bundle design database 252 which may include a palette or plurality of different fresh fuel bundle designs that have been previously created, modeled and stored therein.

Additionally, relational database server 250 may include a queue database 253, which stores parameters for a core design that are to be simulated in the 3D simulator, and a historical core design database 254, which includes historical reactor core loading pattern designs that may be selected in generating a reference core design that is most consistent with defined user-input limits. Further, relational database 250 may include a loading templates database 256, which may store a plurality of different loading templates for fresh and/or exposed fuel bundles, and a fuel pool database 258 which may store a plurality of different exposed and/or fresh fuel bundle metrics for each of a plurality of different exposed and/or fresh fuel bundles, for example.

Simulator results may be stored in simulator results database 255. The simulator results database 255 (and limits database 251) may be accessed by the calculation servers 400 in order to calculate a number of objective function values that are applicable to a particular core design. The objective function values may be ranked for a particular core design (due to modification of one or more of the rod (control blade) pattern, core loading pattern and/or N unique fresh fuel bundle types to be used in the eventual acceptable core design) that has been inserted into a virtual core to be simulated, so as to determine whether or not the given design meets certain user-input limits or constraints, for example. These objective function values may be stored in an objective function values database 257 within relational database server 250.

A 3D simulator input parameters database 259 may also be included within relational database server 250. Database 259 may include the positions of control blades and reactor operating parameters for all exposure steps. As the calculation servers 400 is operatively connected to, and may communicate with, relational database server 250, each of the subordinate databases described in FIG. 3 may be accessible to one or more calculation servers 400.

FIG. 4 is a process flow diagram for illustrating a method of designing a nuclear reactor core for uprated power operations in accordance with an example embodiment of the invention. Referring to FIG. 4, each of the blocks 500 through 1100 describe processing functions of an example method of designing a nuclear reactor core for uprated power operations, beginning with an inputs block 500. A given block may represent a number of functions and/or software-driven processes that may be performed by system 1000, such as directly from input by the user via GUI 230, automatically by the host processor 210 and/or calculation servers 400, and/or under control of the host processor 210 in the application server 200 based on commands or selections made by the user.

The functions performed at inputs block 500 enable a set of constraints (referred to herein also as "limits") that need to be satisfied for uprated power operations to be inputted into the evaluation for determining an acceptable power uprate core design. These limits, including margins to thermal limits and an uprate power limits flow window which sets higher reactor power, power density and mass flow rate limits than what is rated for the plant being evaluated, may be stored in limits database 251.

Core loading block 600 generates a test reactor core design based on the limits (constraints) input at block 500. As will be seen in more detail below, the functions performed by system 1000 as indicated in the core loading block 600 include determining the number of fresh fuel bundles to be used in the test core design, selecting a desired fuel loading template from the loading templates database 256, and populating the selected template with fresh fuel bundles for loading and exposed fuel for reloading so as to arrive at a 'virtual nuclear reactor core' that is loaded in accordance with the core loading block 600.

Automated tools block 700 includes processing functionality to enable the user 300 to select and iteratively run one or more automated tools on the initial test core design generated in block 600. These automated tools include a modify rod (control blade) pattern tool, a modify core loading pattern tool, and a unique fresh fuel bundle type design tool (also known as an "N-streaming") tool. Each of the rod pattern, core loading pattern and unique fresh fuel bundle type design tools may be iterated sequentially and/or together by the user and may provide feedback to one or both of the other tools, until all rod (control blade), exposed fuel and/or fresh fuel changes have been exhausted in the test core design and/or a given "candidate" modified test core design satisfies each of the limits or constraints set for uprated power operations.

For each automated tool, operation or iteration of the selected automated tool to evaluate the test core design against the input limits or constraints includes, at a minimum, performing a simulation of reactor operation with the test core design, based on the constraints, in order to produce a plurality of simulation results (also referred to as "outputs"). The outputs are compared against the constraints. Data may be provided to the user 300 which indicates constraints that were violated by the test core design during the simulation, based on the comparison. One, some or all of the automated tools are implemented and iteratively repeated until a test core design is determined which meets all constraints for uprated power operations. This design thus represents an acceptable power uprate core design.

In an example, and as to be explained in more detail below, the comparison noted above may include configuring an objective function to evaluate the outputs. By configuring an objective function to evaluate the outputs, objective function values may be generated for each output using the objective function. The objective function values representing the outputs may then be evaluated based on the constraints to determine which of the outputs violate a limit.

Each automated tool thus utilizes an objective function to determine how closely a simulated test core design meets the limits or constraints. As previously discussed, the objective function is a mathematical equation that incorporates the constraints or limits and quantifies the test core design's adherence to the limits. The GUI 230 presents a graphic illustration of which outputs violate which constraints, as determined by the objective function. Via the GUI 230, the user may then modify the test core design, to create what is also known herein as a modified or 'derivative reactor core design'. This may constitute a change in rod pattern design including control rod placement, exposed fuel placement, fresh fuel bundle placement, etc., and repeating core simulation to evaluate if there is any performance improvement in a given derivative test core design.

In an example, and based on which particular constraints or limits were violated by a particular derivative core design, a specific automated tool may be selected by the user for a subsequent iteration. The modifying, simulating and comparing functions (i.e., evaluating simulation outputs against the constraints) may be iteratively repeated within a given automated tool process until a given derivative test core design satisfies all limits to operate the reactor at uprated power.

Data related to the acceptable reactor core design may be reported to the user at 1100. In an example, this data may be presented in graphical format via GUI 230 to illustrate to a user how to load and run the selected reactor plant so as to satisfy the constraints and operate at the increased uprated power level.

Referring again to FIG. 4, after all rod (control blade), exposed fuel and fresh fuel changes have been exhausted (output of 800 in FIG. 4 is 'YES'), if all the limits have been satisfied (output of Refinements block 900 is 'YES'), no further refinements need to be made to the selected exposed fuel or fresh fuel bundles the user has chosen for the test core design; this design is then reported at report block 1100 as the acceptable power uprate core design.

However, if after all rod (control blade), exposed fuel and fresh fuel bundle changes have been exhausted and one or more limits from block 500 are still not satisfied, the user may be directed back to checking whether or not all exposed fuel bundles in the inventory have been used and if not, which returns the processing back to functions performed in core loading block 600, with a recommendation to modify the exposed fuel selection in the loading template. If all exposed fuel bundles from the inventory have been used and one or more limits from block 500 are still not satisfied, the user may be directed back to the processes in core loading block 600 with a recommendation to modify the fuel loading template in order to change the locations in the template for insertion of fresh fuel bundles. Once these changes have been made, a modified or derivative core design may be re-evaluated using one, some or all of the automated tools of block 700 until all limits have been satisfied and/or are within an acceptable margin thereto.

Of note, the processing described in blocks 700 and 900 may be done using one or more optimization techniques to optimize certain parameters such as rod (control blade) positions, exposed and fresh fuel bundle positions or placement, core flow, and/or where to make sequence changes, so that the iterative simulation, evaluation, modification of core design including the possibility of making additional fresh and exposed fuel locations changes in the loading template may be done automatically.

Once the user has received the data and design parameters corresponding to the acceptable power uprate core design at block 1100, the user or designer may optionally iterate several processes which are described in an implementation block 1200. The dotted lines of block 1200 indicate that the processes invoked by the user using system 1000 may be optional.

Implementation Block

As shown in block 1200 of FIG. 4, optionally for each desired energy cycle in a given reactor plant being evaluated, the user may access updated exposure accounting data ("core tracking") directly from the reactor plant of interest for a given cycle. This may be done via an interface between system 1000 that is in communication with a process computer of the plant of interest (plant being modeled), with data being stored in database 250. This exposure accounting process is referred to as a core tracking function in 1200a.

This almost real-time, actual plant data may be parsed to retrieve the desired data needed by the user or designer in order to determine whether any limits and/or margins to such limits or constraints for the power uprate operation need to be changed based on actual plant data (comparing the actual plant data to estimated data in order to determine any standard deviation (sigma) and/or bias to apply to the estimated margins to existing limits and/or to the limits themselves. Accordingly, at 1200b the user may revise thermal and/or reactivity limits, and/or margins to these limits, based on updated exposure accounting data to determine new limits for the given cycle being evaluated.

Using current actual plant conditions from (1200a) and any new or revised limits or margins to limits determined from (1200b), the customer, user or designer may (1200c) perform an "online" plant optimization. This would entail setting limits and operating conditions for the power uprate core design based on (1200a) and (1200b) above, then iterating the automated rod pattern tool for the selected uprated core design reported at 1100.

This iteration of the automated rod pattern tool may include optimizing rod positions, core flow, and where to make sequence changes, based on the update actual plant conditions from (1200a) and based on the new or revised limits calculated from (1200b).

As discussed in block 700, the rod pattern tool may be repeatedly iterated in (1200c), inclusive of repetitive simulation, comparison and modification of the power uprate core design, to determine a modified power uprate core design which satisfies the limits for the cycle being evaluated. Once all desired energy cycles have been evaluated (output of 1300 is 'YES'), the processes described in the optional implementation block 1200 may be terminated.

In an example, data presented to the user resulting from the simulation and comparison of outputs to limits in any of the automated tools performed as described in block 700 or 1200 may include procedural recommendations. For example, such procedural recommendations may be provided as feedback to the user as an output of the modify rod pattern tool process at block 1200c, for example. As to be seen below, each automated tool may provide associated procedural recommendations to assist the user or designer with any modifications that need to be made to the test core design in order to achieve a desired core design for uprated power.

Although the individual modifications may be left to the desires of the user, these procedural recommendations may be provided in the form of a pull down menu, for example, and may divided into categories such as energy beneficial moves, energy detrimental moves, and converting excessive margin (to thermal limits) into additional energy. One technique may be to address problems with meeting limits using energy beneficial moves rather than energy detrimental moves. Even if the power uprate core design meets all of the limits (client-inputted plant specific constraints, design limits, thermal limits, etc.) the user may verify that any excessive margin to a particular limit could be converted into additional energy.

An overview of the example methodologies having been described, various processes within the blocks in FIG. 4 are now described in more detail.

Inputs Block 500

Initially, the designer or user selects a reactor plant for evaluation from a suitable drop down menu of plants and defines a set of limits or constraints to be satisfied by the selected plant in order to operate at uprated power, i.e. a power in excess of rated capacity, such as 3600 megawatts (uprated power) for a plant that is rated at 3400 MW. In other words, limits or constraints are defined which are to be satisfied in determining an acceptable reactor core design to be used in the selected plant for uprated power operations. For example, the user may be prompted to enter uprate power thermal limits and a flow window for uprated power operations. These will be used to modify the plant operational conditions for determining the power uprate core design.

These limits may be related to key aspects of the design of the particular reactor being evaluated for uprated power operations and design constraints of that reactor. The limits may be applicable to variables that are to be input for performing a simulation of a test reactor core design that is to be generated, and/or may include limits or constraints applicable only to the results of the simulation. For example, the input limits may be related to client-inputted reactor plant specific constraints and core performance criteria for uprated power operations. Limits applicable to the simulation results may be related to one or more of operational parameter limits used for reactor operation, core safety limits, margins to these to these operational and safety limits and the other client-inputted reactor plant specific constraints.

FIG. 5 is a screen shot to illustrate example client-inputted plant specific constraints. These may be understood as limits or constraints on input variables to a simulation and limits or constraints on the simulation results. Referring to FIG. 5, there is listed a plurality of client-inputted plant specific constraints as indicated generally by the arrow 505. For each constraint, it is possible to assign a design value limit, as indicated by column 510. Although not shown in FIG. 5, the limits or constraints include margins to thermal limits and an uprate power limits flow window which sets higher reactor power, power density and mass flow rate limits for the plant being evaluated.

Core Loading Block 600

The process of selecting a fuel loading template, selecting the fresh fuel for loading and selecting the exposed fuel to reload is described in detail in co-pending and commonly assigned U.S. patent application Ser. No. 10/678,170 to David J. Kropaczek et al., filed Oct. 6, 2003 and entitled "Method and Apparatus for Facilitating Recovery of Nuclear Fuel from a Fuel Pool". The relevant portions describing these processes as described below in FIGS. 7-10 are incorporated in their entirety herein. However, prior to selecting the fuel loading template, a fresh fuel bundle count is determined for the initial test reactor core design.

Figure 6:
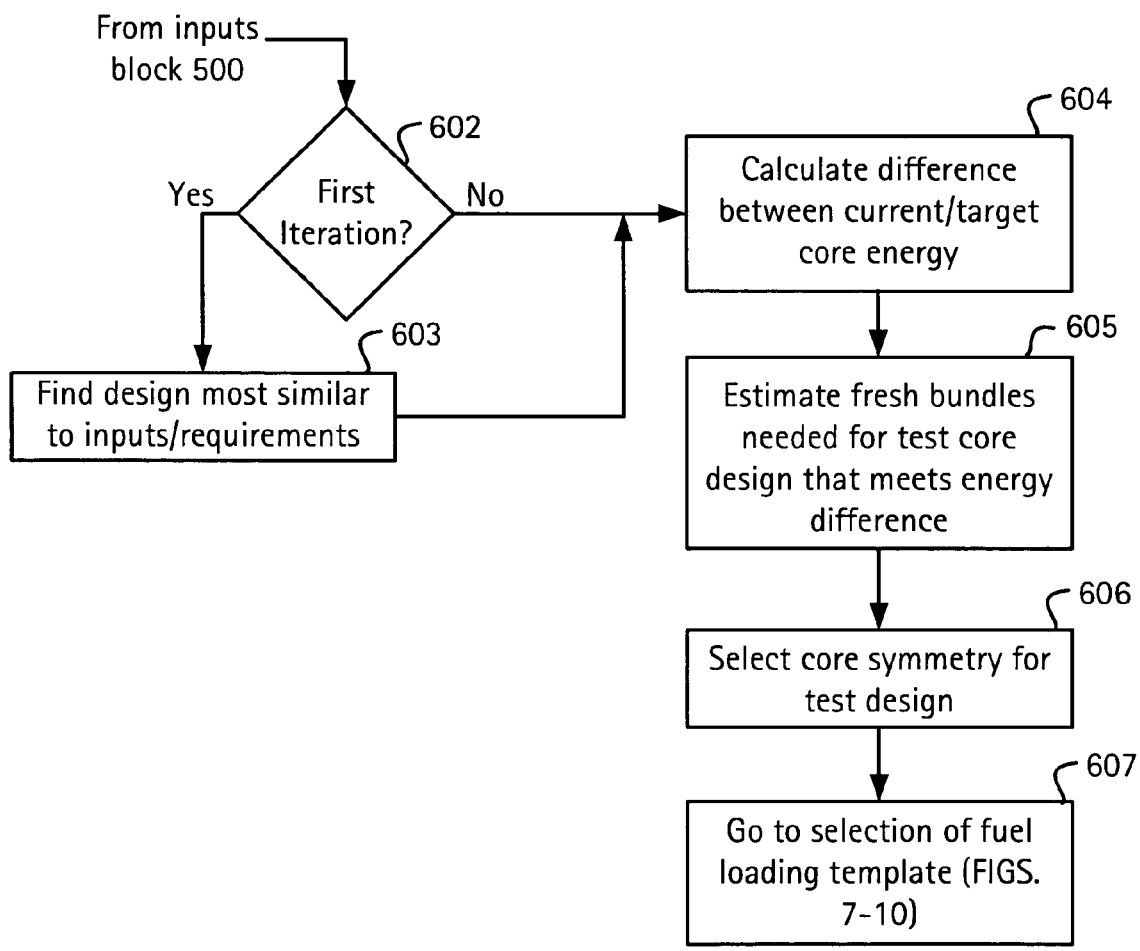
FIG. 6 is a flowchart describing the determination of a fresh fuel bundle count for the initial test reactor core design in accordance with an exemplary embodiment of the invention.

FIG. 6 is a flowchart describing the determination of a fresh fuel bundle count for the initial test reactor core design in accordance with an exemplary embodiment of the invention.

The selection of a fresh fuel bundle count is done prior to the selection of the fuel loading template so as to provide the inventory of fresh fuel bundles to be used in designing a reactor core design for uprated power operations. Initially, a check is performed (602) to establish whether prior iterations on a test fresh fuel loading pattern have occurred. If this is a first iteration, e.g., no previous test fresh fuel loading pattern has been analyzed, information on past cycles or similar plants may be used to provide a basis for an initial test fresh fuel loading pattern (603). For example, an initial test fresh fuel loading pattern may be selected from a core loading pattern design used for a similar core in a previous simulation, selected based on a core loading pattern design from a reactor that is similar to the reactor being evaluated, and/or from an actual core loading pattern design used in an earlier core energy cycle in the reactor plant being evaluated, for example. These designs may be accessed from the historical fuel cycle designs database 254, for example.

If past iterations have been performed (the output of 602 is "NO") the total energy content of the core, using an established core loading pattern that conforms to the input limits, may be calculated, and a difference from a desired/required energy content may be defined (604). This may also be done using a fresh fuel loading pattern from 603, also accounting for the inputted limits, if this is the first iteration. This energy "delta" is the difference in the required energy for the next, future cycle as compared to the most recent End-of-Cycle (EOC). For additional iterations, the delta may be reduced as the difference between the actual energy and desired energy is reduced. Furthermore, negative delta energies imply that the resulting energy is greater than the desired energy and is desirable.

The difference in energy should be supplied by the fresh fuel assemblies, which would also be part of the fresh fuel loading pattern for loading the core of the reactor, to be loaded at a next scheduled outage, for example. Typical rules of thumb exist that can help select the number of additional bundles needed (or number of bundles that must be removed) in order to obtain the desired target energy. For example, in a BWR reactor with 764 bundles, it is commonly believed that four (4) bundles are worth approximately 100 MWD/st of cycle length. Therefore, if the resulting energy is over 100 MWD/st longer than the desired energy, four fresh bundles could be removed. Similarly, if the resulting energy more than 100 MWD/st shorter than the desired energy, four additional fresh bundles should be added.

The user should select (605) the number of fresh fuel bundles needed to make up for the energy difference. This may be done by accessing a "palette" of previously modeled and stored fresh fuel bundle designs from fresh fuel bundle design database 252, or the user may create specific fresh fuel bundles from a database of bundle types, for example.

After the number or count of fresh bundles to be used in the test core design is determined, core loading symmetry is identified (606). Some plants may require quadrant loading symmetry or half-core loading symmetry, for example. GUI 230 may be used to access a plant configuration webpage, which may enable the user to select a "model size", e.g., quarter core, half core, or full core, for evaluation in a subsequent simulation. Additionally, a user may select a core symmetry option (e.g., octant, quadrant, no symmetry) for the selected model size, by clicking on a suitable drop down menu and the like.

By selecting "octant symmetry", the user can model the reactor assuming that all eight (8) octants (where an octant is a group of fuel bundles for example) are similar to the modeled octant. Consequently, simulator time may be generally decreased by a factor of eight. Similarly, by selecting "quadrant symmetry", the user can model the reactor assuming each of the four (4) quadrants is similar to the modeled quadrant. Hence, the simulator time may be generally decreased by a factor of four. If asymmetries in bundle properties prevent octant or quadrant symmetry, the user can also specify no symmetry.

Figure 7:
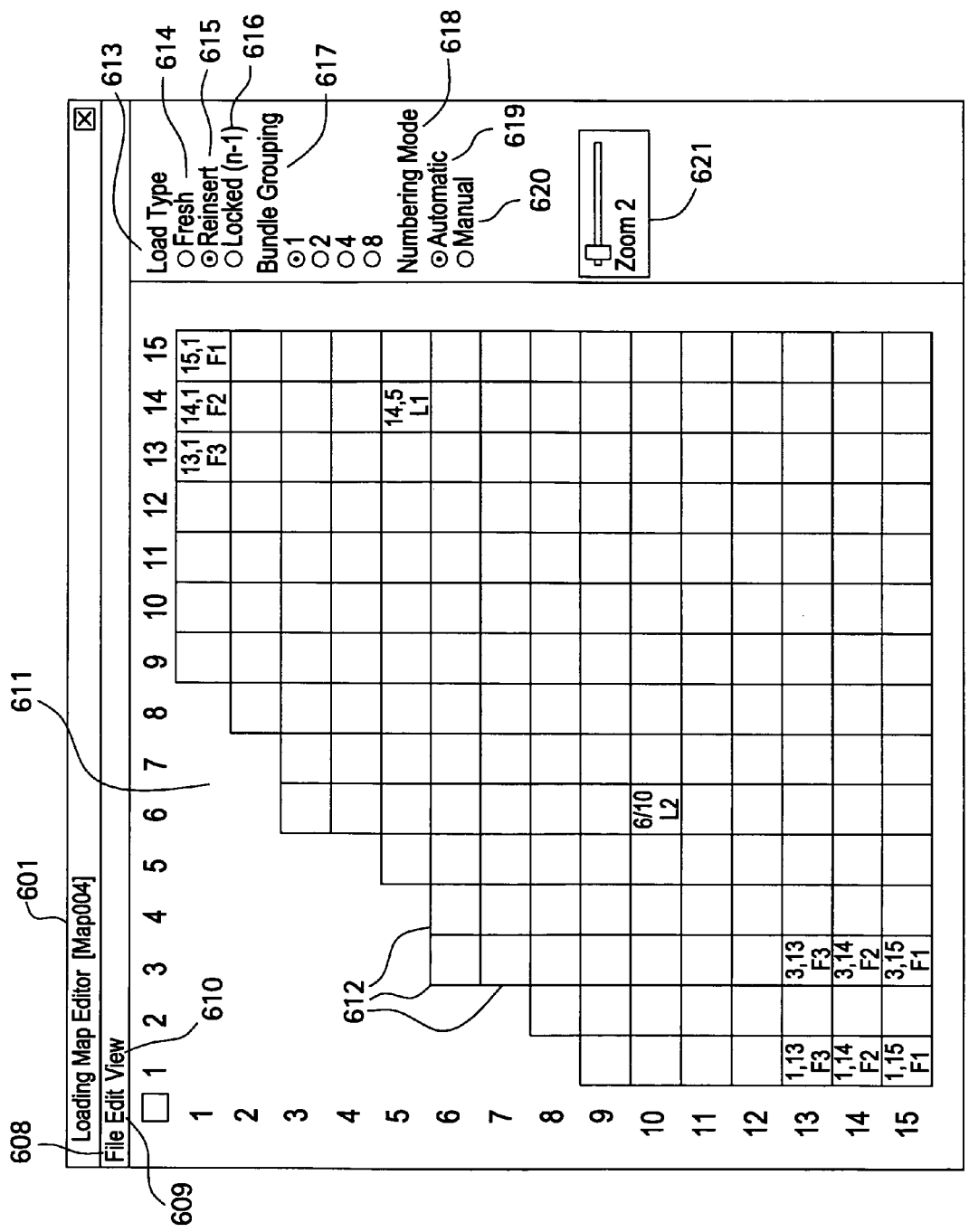
FIG. 7 illustrates a quarter-core screen shot of a partially completed loading template using a loading map editor 600 of the present invention.

Once the fresh fuel bundle count and symmetry is determined, the user may access a desired fuel loading template 607 from the loading templates database 256. FIG. 7 illustrates a quarter-core screen shot of a partially completed loading template using a loading map editor 601 of the present invention.

When the loading map editor is initially run, the user has the option via a file menu 608 to access a previously created template (from loading templates database 256) or to begin a new template. In an example, the loading map editor 601 requests the user to identify the reactor for which the template is being created. The loading map editor 601 retrieves the geometry of the identified nuclear reactor from the relational database 250 (such as loading templates database 256, and displays fuel bundle field 611 of the appropriate size based on the retrieved plant characteristics with the rows and columns numbered (such as with the fuel bundle position Row 6, Column 3 in FIG. 7).

Within the fuel bundle field 611, the user may then, for example, using a suitable input device (i.e., mouse, touch pad, etc.) via his computer, GUI 230 and application processor 200 to click on the fuel bundle positions 612 in the array of possible fuel bundle positions to identify the type (fresh, reinsert (exposed fuel), or locked) and grouping of the actual fuel bundle in that position. As shown on the right side of FIG. 7, the loading map editor 601 provides several tools for performing this assignment task, including Load Type 613, Bundle Grouping 617 and Numbering Mode 618 tools.

Under the Load Type 613 tool, the loading map editor 601 includes a Fresh button 614, a Reinsert button 615 and a Locked button 616. The Fresh, Reinsert and Locked buttons 614, 615 and 616 correspond to fresh, reinsert and locked fuel bundle categories. The user, for example, clicks on the desired button to choose the desired category and then clicks on the fuel bundle position 612 in the fuel bundle field 611 to assign that category to the fuel bundle position 612. The fresh fuel bundle category indicates to insert fresh fuel bundles, i.e., bundles that have not been exposed. The loading map editor then displays "F" and a number "N" at the bottom of the fuel bundle position 612. The "F" indicates the fresh fuel bundle category, and the number "N" indicates the Nth fresh bundle type 612. The loading map editor 601 maintains a count of the number of fuel bundle types assigned to the core. Multiple bundle positions can be assigned the same bundle type by specifying the same "F" and "N" value for each position.

The locked fuel bundle category indicates that a fuel bundle currently occupying an associated fuel bundle position in an actual nuclear reactor core is to remain in that position in creating a nuclear reactor core loading map. The loading map editor 601 displays "L" and a number "N" in the fuel bundle position 612 when the locked fuel bundle category is assigned. The "L" indicates the locked fuel bundle category, and the number "N" indicates the Nth locked bundle group.

The reinsert fuel bundle category indicates where to insert an exposed fuel bundle. The loading map editor displays only a number "N" in the fuel bundle position 612 when the reinsert fuel bundle category is assigned. The number indicates a priority of the fuel bundle position 612.

In an example, the loading map editor may display the fuel bundle positions 612 in a color associated with the assigned category. For example, fresh bundles are displayed in blue, locked are displayed in yellow, and reinserted exposed fuel bundles are displayed in violet.

Under the Bundle Grouping 617 heading, the loading map editor includes symmetry buttons "1", "2", "4" and "8". As noted above in FIG. 6, the user may have already selected a desired core symmetry option (e.g., octant, quadrant, no symmetry, etc.) for the selected reactor, by clicking on a suitable drop down menu and the like. However, the bundle grouping tool 617 allows the user to select the symmetry for given bundle positions 612, i.e., on a fuel bundle position 612 basis.

The Numbering Mode tool 618 includes an Automatic button 619 and a Manual button 620. Choosing between an automatic numbering and a manual numbering is only permitted when the Reinsert button 615 or Fresh button 616 has been selected, and is generally inapplicable if the Locked button 616 is selected.

With the Automatic button 619 selected, the loading map editor 601 maintains a count of exposed fuel bundles and assigns the count plus one to the next fuel bundle position 612 assigned the reinsert fuel bundle category. The assigned number is displayed at the bottom of the fuel bundle position 612. The loading map editor 601 maintains a count of the fresh bundle types as well; thus when a fuel bundle position 612 is assigned a fresh bundle category count plus one, referred to above as N, is assigned to that position. "F" and the value of N are displayed at the bottom of the fresh fuel bundle position.

When the Manual button 620 is selected, the loading map editor maintains the count of the number of fuel bundle positions 612 assigned the reinsert fuel bundle category, but does not assign numbers to the fuel bundle positions 612. Instead, the user may position a cursor in the fuel bundle position 612 and enter the number manually.

The assigned numbers in each bundle position 612 represent assigned priorities indicating an order for loading exposed fuel bundles based on an attribute of the exposed fuel bundles. The attributes include, but are not limited to, K infinity (which is a well-known measure of the energy content of the fuel bundle, exposure of the bundle (which is accumulated mega-watt days per metric ton of uranium in the bundle), residence time of the bundle (which is how long the bundle has been resident in the nuclear reactor core), etc. In one exemplary embodiment, the shade of the color associated with the reinserted fuel bundle positions varies (lighter or darker) in association with the assigned priority.

The loading map editor 600 also provides several viewing options via a view menu 610 and a zoom slide button 621. Adjusting the zoom slide button 621 by clicking and dragging the zoom slide button 621 to the left and the right decreases and increases the size of the displayed fuel bundle field 611. Under the view menu 610, the user has the option to view a single quadrant of the template, or a full core view of the template. Additionally, the user can control whether certain template attributes are displayed. Specifically, the view menu 610 includes the options of displaying the following in the loading template: control blades, bundle coordinates, core coordinates, etc.

As discussed above, instead of creating a new template, a previously created template may be viewed and, optionally, edited using edit button 609. Using the file menu 608, the user selects an "open" option. The loading map editor 600 then displays the accessible templates stored in fuel loading templates database 256. The user then selects an accessible template, for example, by clicking on one of the accessible templates. The loading map editor 600 will then display the chosen template.

The user may then edit the selected template. For example, for a given selected template, the user may select the fresh fuel and exposed fuel bundles desired for the template in order to generate the test reactor core design. The loading map editor 600 thus allows the user the option of reloading both fresh and exposed fuel bundles currently residing in one or more fuel pools. One or more of these exposed fuel bundles residing in the available fuel pool inventory may be accessed by the user from fuel pool database 258, for example, and one or more of the fresh fuel bundles may be accessed from fresh fuel bundle design database 252.

After accessing, creating and/or editing a fuel loading template using the loading map editor 600 as discussed above, the user may then create a loading map using the template. From the file menu 608, the user chooses a "load" option. The loading map editor 600 then displays a loading screen that includes a template access window, template information window, reload window and a load fresh window. The template access window provides a user with a drop down menu for selecting a loading template stored in the loading templates database 256. The template information window displays summary information for the selected loading template, such as the number of fresh bundle types, the number of reinserted (exposed) fuel bundle positions and the number of locked bundle positions in the loading template. The summary information may also indicate the number of fresh bundle types and number of reinserted (exposed fuel) bundles currently added in creating the loading map.

Figure 8:
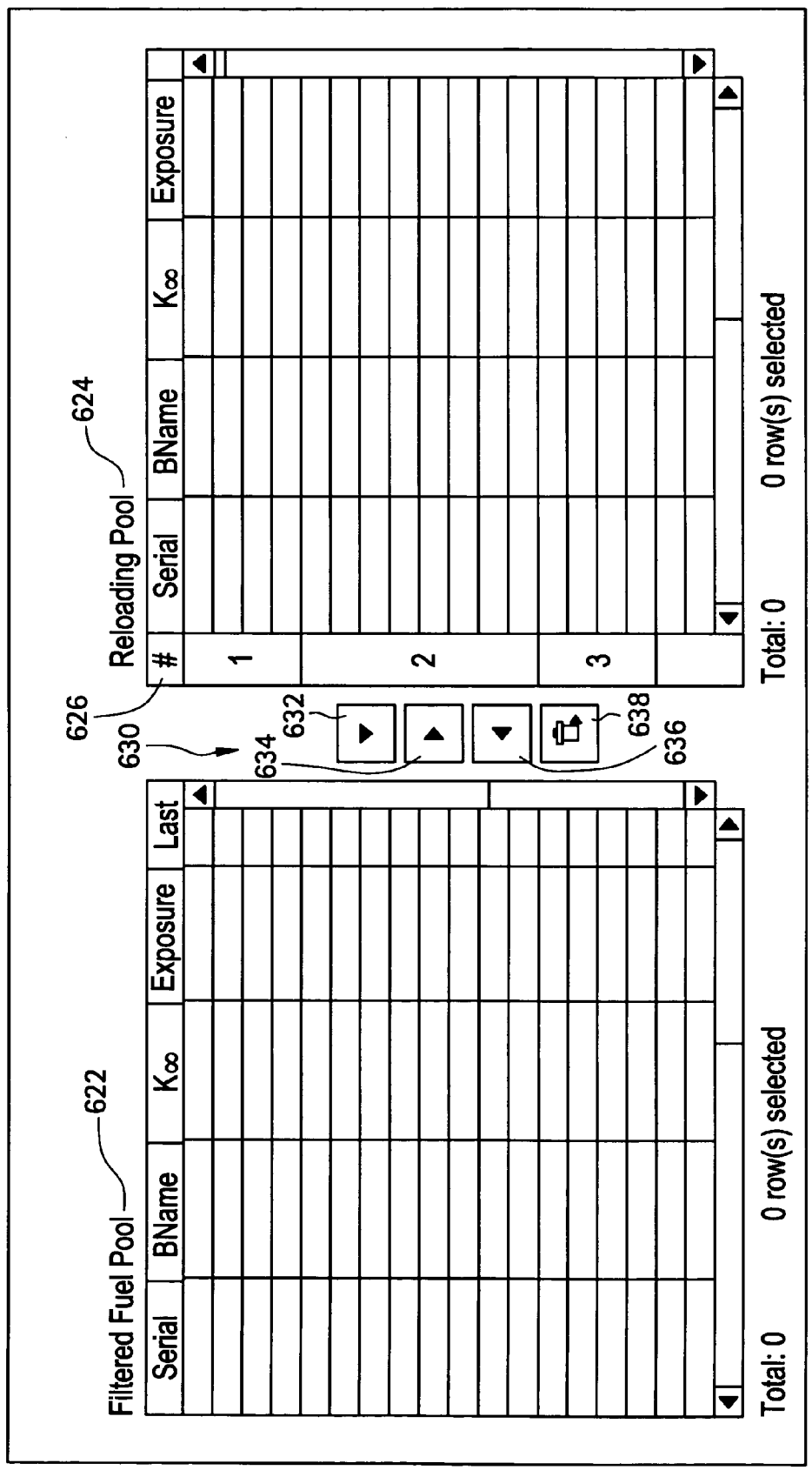
FIG. 8 is a screen shot to illustrate the reload window displayed by the loading map editor 600.

FIG. 8 is a screen shot to illustrate the reload window displayed by the loading map editor 600. The window is divided into a filtered fuel pool table 622 and a reloading pool table 624. The filtered fuel pool table 622 lists (1) the exposed fuel bundles currently in the fuel template of the nuclear reactor being evaluated, except for those fuel bundles in locked fuel bundle positions 612, and (2) the fuel bundle inventory in one or more fuel pools for this and other nuclear reactors. As is well-known, exposed fuel bundles removed from a nuclear reactor are stored in what is known as a fuel pool. Fuel bundles from two or more nuclear reactor cores located at a same site may be stored in the same fuel pool.

The filtered fuel pool table 622 lists each exposed fuel bundle by its serial number and bundle name (BName). Each fuel bundle is assigned a unique serial number, used to assure traceability of the bundle from a quality assurance perspective. The bundle name is a character string identifier used to identify the fuel bundle product line as well as nuclear characteristics, such as uranium and gadolinia loading. The filtered fuel pool table 622 also lists one or more attributes of each exposed fuel bundle listed, such as K infinity, exposure, and the last fuel cycle number for which the bundle was resident in the core. Additional attributes for an exposed fuel bundle may include: 1) bundle product line, 2) initial uranium loading, 3) initial gadolinium loading, 4) number of axial zones, 5) historical fuel cycle numbers previous to the most recent for which the bundle was resident in the core, 6) the corresponding reactor in which the fuel bundle was resident for each of the historical fuel cycles, 7) accumulated residence time, and 8) fuel bundle pedigree, a parameter that reflects the usability of the bundle for continued reactor operation.

The fuel bundle pedigree is determined from a number of factors the foremost being an inspection of the fuel, either visually or by some other non-destructive test procedure, which is designed to detect a current failed fuel bundle or the vulnerability of the bundle to future failure. Failure mechanisms include such items as corrosion, debris impact, and mechanical bowing of the fuel bundle. Another factor affecting pedigree is possible reconstitution of a fuel bundle, which is a repair process involving the replacement of damaged fuel rods with replacement rods that may be a uranium containing fuel rod or alternatively, a non-uranium containing rod (e.g. stainless steel), henceforth referred to as a 'phantom' rod. A pedigree attribute might be 'RU' and 'RP' for reconstituted with uranium and phantom rods, respectively, and 'DC', 'DD' and 'DB' for damaged by corrosion, debris, and bow, respectively. A 'blank' pedigree attribute designates a bundle that was undamaged and useable.

The reloading fuel pool table 624 provides the same information for each fuel bundle as provided by the filtered fuel pool table 622. Additionally, the reloading fuel pool table 624 indicates the priority number 626 for each fuel bundle group as set forth in the loading template. FIG. 8 shows that the highest priority (1) reinserted fuel bundle position(s) are a group of four fuel bundles, and the next highest priority (2) reinserted fuel bundle(s) are a group of eight fuel bundles.

The reloading fuel pool table 624 is populated by moving fuel bundles from the filtered fuel pool table 622 into the reloading fuel pool table 624. The reload window further includes a set of tools 630 for aiding the user in selecting and moving fuel bundles from the filtered fuel pool table 622 to the reload fuel pool table 624. The set of tools 630 may include a filter tool 632, a move right tool 634, a move left tool 636 and a delete tool 638. Tools 634, 636 and 638 enable to user to move fuel bundles between the filtered fuel pool table 622 and reload fuel pool table 624, such as by highlighting one or more bundles to and then clicking on the move right tool 634 (or left tool 636), which causes the selected fuel bundles to populate the highest priority unpopulated fuel bundle positions in the reload fuel pool table 624 (or filtered fuel pool table 622). The delete tool 638 enables the user to select one or more fuel bundles in one of the tables 622, 624, and then to click the delete tool 638 to delete the selected fuel bundles from the table.

FIG. 9 is a screen shot illustrating the filter tool 632. A user clicks on the filter tool 632 to open a filter window 640 as shown in FIG. 9. The filter window lists the same attributes listed in the filtered fuel pool table 622, and allows the user to indicate to filter based on the attribute by clicking in the selection box 642 associated with the attribute. When an attribute has been selected, a check is displayed in the associated selection box 642. The user may also unselect an attribute by again clicking in the associated selection box. In this case, the check mark will be removed. It is of note that exposed bundles stored in available fuel pools may be accessed from the fuel pool database 258 by the user to populate the appropriate tables in FIG. 8 for eventual filtering by the filter tool 632.

For each attribute, the filter window 640 may display one or more filter characteristics associated with the attribute. For the K infinity attribute, the user may select a filter operator 644 of greater than, less than, or equal to and enter in a filter amount 646 associated with the filter operator 644. As shown in FIG. 9, a user has selected to filter based on K infinity, chosen the greater than filter operator, and entered the filter amount of 1.2.

As a result, the loading map editor 600 will filter the fuel bundles in the filtered fuel pool table 622 to display only those fuel bundles having a K infinity greater than 1.2. As another example, the exposure attribute in box 642 also has an associated filter operator and filter amount.

For the cycle attribute, the filter window provides a drop down menu for selecting the cycle number. FIG. 9 shows cycles 2 and 4 selected from the drop down menu for the cycle attribute. As a result, the loading map editor filters the filtered fuel pool table 622 to display only those fuel bundles whose most recent residence was in cycle 2 or cycle 4.

Similarly, the user may elect to filter bundles based on their pedigree, product line, etc. Once the attributes for filtering on have been selected and the filter characteristics have been entered, the user causes the loading map editor 600 to filter the filtered fuel pool table 622 based on this information by clicking on the OK selection box. Alternatively, the user may cancel the filter operation by clicking on the CANCEL selection box.

The filtered fuel pool table 622 also provides a filtering mechanism for filtering the fuel bundles listed therein. A user may sort the filtered fuel pool table 622 in ascending or descending order of an attribute by clicking on the attribute heading in the filtered fuel pool table 622. Once the user clicks on the attribute, the loading map editor displays a popup menu with the options "Sort Ascending" and "Sort Descending". The filtered fuel pool table 622 is then filtered in ascending or descending order of the attribute based on the option clicked on by the user.

FIG. 10 is a screen shot to illustrate a load fresh window displayed by the loading map editor 600 for loading of fresh bundles into the fuel template. The window is divided into a fresh bundle types table 650 and a fresh bundle pool table 660. The fresh bundle types table 650 lists the available fresh fuel bundle types, listing each fresh fuel bundle type by its bundle name. The bundle name is a character string identifier used to identify the fuel bundle product line as well as nuclear characteristics, such as uranium and gadolinia loading.

The fresh fuel bundle types table 650 also lists one or more attributes of each fresh fuel bundle type listed, such as K infinity, fuel bundle product line, average uranium-235 enrichment, percent (as a function of total fuel weight) of gadolinia burnable poison contained in the fuel bundle, number of gadolinia-containing fuel rods, and number of axial zones (an axial zone is defined by a cross-sectional slice of the bundle that is homogeneous along the axial direction). Other attributes of the fresh bundle may include parameters for predicted thermal behavior, such as R-factors and local peaking, calculated for various bundle exposure values. R-factors are used as inputs to the critical power ratio (CPR) and are determined from a weighted axial integration of fuel rod powers. Local peaking is a measure of the fuel rod peak pellet and clad temperature.

The fresh bundle pool table 660 provides the same information for each fuel bundle as provided by the fresh bundle types table 650. Additionally, the fresh bundle pool table 660 indicates the type number 662 for each type of fresh bundle in the loading template and then number of fresh fuel bundles of that type in the loading template. FIG. 10 shows that the first type of fresh fuel bundle position(s) are a group of four fuel bundles, and the next type of fresh fuel bundle(s) are a group of eight fuel bundles.

Similar to FIG. 8, the fresh bundle pool table 660 may be continually populated and/or updated by moving fuel bundles from the fresh bundle types table 650 into the fresh bundle pool table 660, and includes the tools 630 described in FIG. 8; the filter tool 632 (which may filter out fresh fuel bundles accessed from fresh fuel bundle design database 252), move right tool 634 and delete tool 638 for aiding the user in selecting and moving fuel bundles from the fresh bundle types table 650 to the fresh bundle pool table 660, as described above. The loading map editor 600 also provides for filtering the fresh bundle types table 650 in ascending or descending order of an attribute in the same manner that the filtered fuel pool table 622 may be sorted.

Once the reinserted (exposed fuel) and fresh fuel bundle positions 612 are filled using the tools described in detail above, the user may click on a "populate" button displayed in the loading screen to have the loading map displayed. The user may then save the created loading map by using the "Save" or "Save As" options in the file menu 608.

At this point, the user has now generated an initial test core design to be evaluated using a plurality of automated tools in order to determine an uprated core design that satisfies all constraints or limits that have been set in an effort to achieve a core design suitable uprated power operations. To load the test core design for evaluation using the automated tools, the user simply clicks a load button and enters ID prefixes for the fresh fuel types; the test core design is ready for evaluation.

Block 700-Automated Tools

For the initial test core design, the user may modify one or more of the rod pattern, core loading pattern and/or unique fresh fuel bundle types in the test core design until a reactor core design is determined that satisfies all limits and/or constraints for uprated power. As will be explained below, each automated tool may provide associated procedural recommendations to assist the user or designer with any modifications that need to be made to the test core design in order to achieve a desired core design for uprated power.

For each automated tool, a simulation of the test core design with one of a selected or modified rod pattern design (for the modify rod pattern tool option), a selected or modified core loading pattern (core loading design tool), and selected unique subset of fresh fuel bundle types (N-Streaming tool) is to be performed. In other words, each tool will establish a respective desired initial test rod pattern design, core loading pattern design, and/or unique fresh fuel bundle type of placement in the test core design output from the functions of block 600. For each of the automated tools, the plant to be evaluated has already been selected and the limits set (at inputs block 500). As the initial test core design has been loaded at the output of block 600, each of the automated tools may be invoked as to be described in more detail below.

For each automated tool, based on the corresponding given test rod pattern, core loading pattern or unique fresh fuel bundle types set for the test core design, the simulation results are compared to the limits and data related to the comparison is provided to the user in the form of one or more graphical or text pages; this data may indicate those limits that were violated during simulation and may also be used with procedural recommendations to provide feedback to the user as to what to modify with regard to the rod pattern, the core loading pattern and or the unique fresh fuel bundle types used in the core design.

As previously discussed, these tools may be invoked sequentially (i.e., the modify core pattern tool may be iterated with acceptable rod pattern and fresh fuel bundle designs input thereto from the rod pattern and unique fresh fuel type tools, and vice versa), or the tools in another example may be iterated independently from one another, and the best design (as indicative by the objective function values) may serve as a derivative core design resulting there from may be evaluated by the other two tools, sequentially or again independently, to refine the design for uprate power operations.

The Modify Rod Pattern Tool

The initial test core design generated above in block 600 may not have the desired rod pattern design (e.g., notch positions and sequences for control blade patterns in BWRs, or group sequences for control rod patterns in PWRs, etc.) for uprated power operations. This may be determined by evaluating the results of simulation of the given test reactor core design that has been loaded with a test rod pattern design (e.g., notch positions and sequences for control blade patterns for BWRs, group sequences for control rod patterns for PWRs, etc.) and then simulated using core simulation software to generate simulation results for comparison against the limits (inclusive of those limits for uprated power operations) set in the inputs block 500. Accordingly, a simulation of the given test reactor core design from block 600, but which includes an initial test rod pattern design, will need to be performed.

The implementation of the rod pattern tool and routine for modifying rod patterns in the test core design is described in detail in co-pending and commonly assigned U.S. patent application Ser. No. 10/321,441 to Russell, II et al. In general, a user implements the modify rod pattern tool via the GUI 230 and through processing power (the local computer at user, the application server 200 and/or calculation servers 400, etc.) to virtually modify rod pattern designs (e.g., notch positions and sequences for control blade patterns for BWRs, group sequences for control rod patterns for PWRs, etc.) for review on a suitable display device by the user. The iteration of the modify rod pattern subroutine may also provide feedback and/or procedural recommendations to the user, based on how closely a proposed rod pattern design solution meets the user input limits or constraints that need to be satisfied for the test reactor core design to meet the requirements for uprated power operations.

It is of note that many of the steps and figures describing the modify rod pattern tool are similar for the core loading pattern and unique fresh fuel bundle type tools. Accordingly, several of the figures describing the modify rod pattern tool will be referenced in the discussion of the core loading pattern and unique fresh fuel bundle type tools, with only the differences noted for purposes of brevity.

Figure 11:
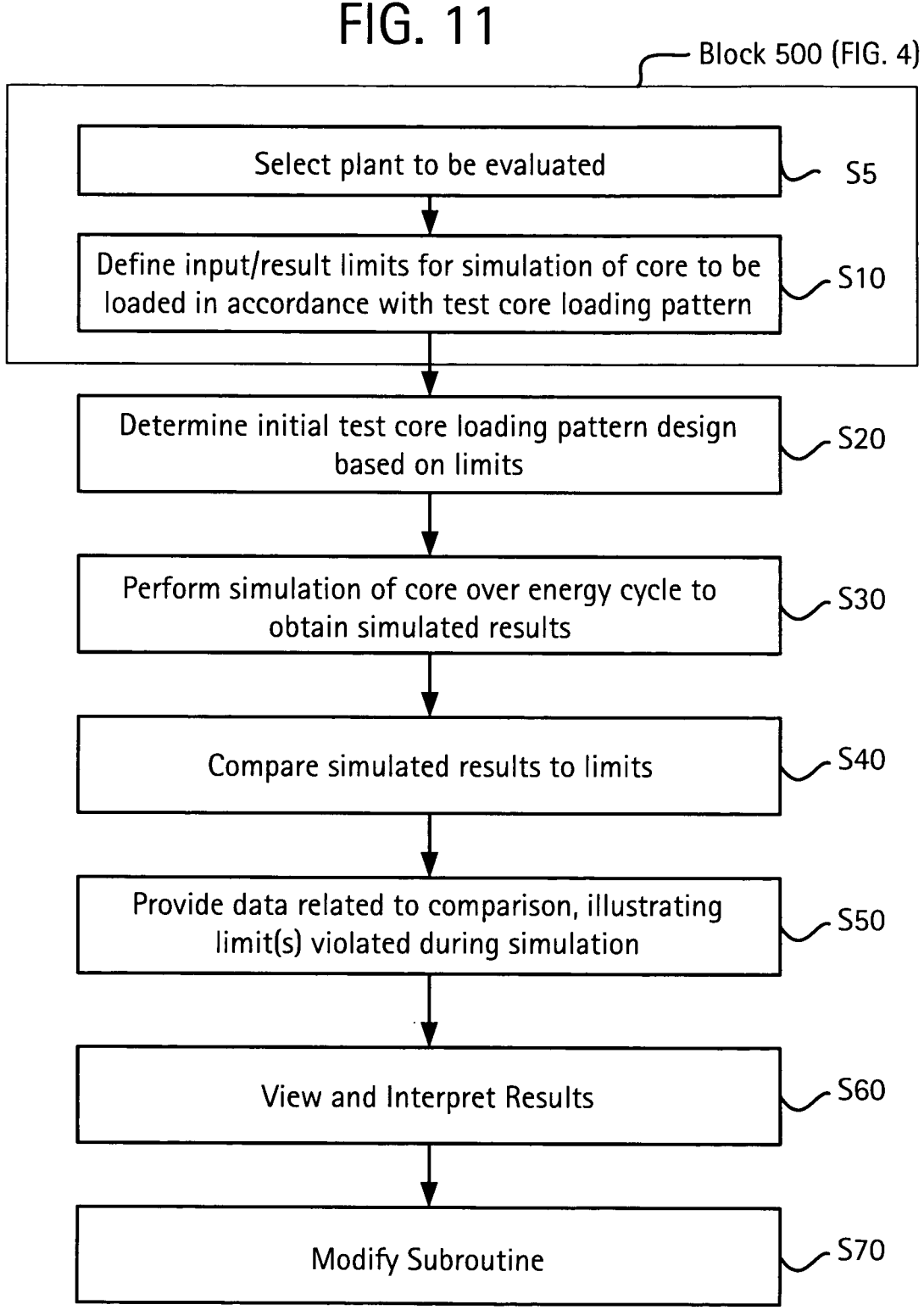
FIG. 11 is a flow chart illustrating implementation of the modify rod pattern tool in accordance with an exemplary embodiment of the invention.

FIG. 11 is a flow chart illustrating implementation of the modify rod pattern tool in accordance with an exemplary embodiment of the invention. FIG. 11 is described in terms of determining a rod pattern design for an exemplary boiling water reactor, it being understood that the method may be applicable to PWRs, gas-cooled reactors and heavy-water reactors.

Referring to FIG. 11, a reactor plant is selected for evaluation in Step S5 and limits which are used in a simulation for a test rod pattern design of the selected plant are defined (Step S10). These steps have previously been performed by the functions in input block 500, but are reiterated herein for clarity. Based on the limits, a sequence strategy (initial rod pattern design) for control mechanism movement (e.g., control blade notch positions, control rod positions, etc.) is established (Step S20). Reactor operation may be simulated (Step S30) on the entire test core design with the selected rod pattern design, or focused on a subset of the test rod pattern design, which may be a subset of fuel bundles in a reactor core for example, in order to produce a plurality of simulated results.

The simulated results are compared to the limits (Step S40), and based on the comparison, data is provided illustrating whether any limits have been violated (Step S50). The data also provides the user with an indication of which location in a simulated core were the largest violators or largest contributors to a limit violation. Each of these steps is now described in further detail below.

Once the plant is selected, an initial rod pattern design may be selected by entering a previous test rod pattern (sequence strategy) using GUI 230 to access a plant configuration webpage. For example, the webpage may enable to user to select a "model size", e.g., quarter core, half core, or full core, for evaluation in a subsequent simulation. Additionally, a user may select a core symmetry option (e.g., octant, quadrant, no symmetry) for the selected model size, by clicking on a suitable drop down menu and the like. In an example, this core symmetry option has already been performed as evident in FIG. 6 for example.

As previously shown in FIG. 5, the client-inputted plant specific constraints, which may be configured as limits on input variables to the simulation and limits on the simulation results have already been set for the simulation. A sequence strategy (test rod pattern design for the test reactor core design output from block 600) for positioning one or more subsets of a test rod pattern design is established (Step S20) based on the limits. In an embodiment where the reactor being evaluated is a boiling water reactor, for example, the limits help to establish allowable control blade positions and durations.

Control blade themes are defined together with allowable blade symmetry to aid the user in determining an initial sequence strategy. In typical BWR operation, for example, the control blades may be divided into four groups of blades ("A1", "A2", "B1", and "B2"). By apportioning blades into these blade groups, the user may easily identify only the permissible blades within a given sequence. Consequently, undesirable blades are prevented from being used, which would result in an undesirable solution. Because control blade themes are identified for each exposure, satisfactory blade definitions may be forced.

By defining control blade themes and blade symmetry, the user need only identify a single blade position within the control blade theme, and the other symmetric control blades will accordingly follow. Thus, the graphical area is not cluttered by redundant control blade location information. Further, automating a sequence strategy prevents illegal control blade position errors from occurring.

Figure 12:
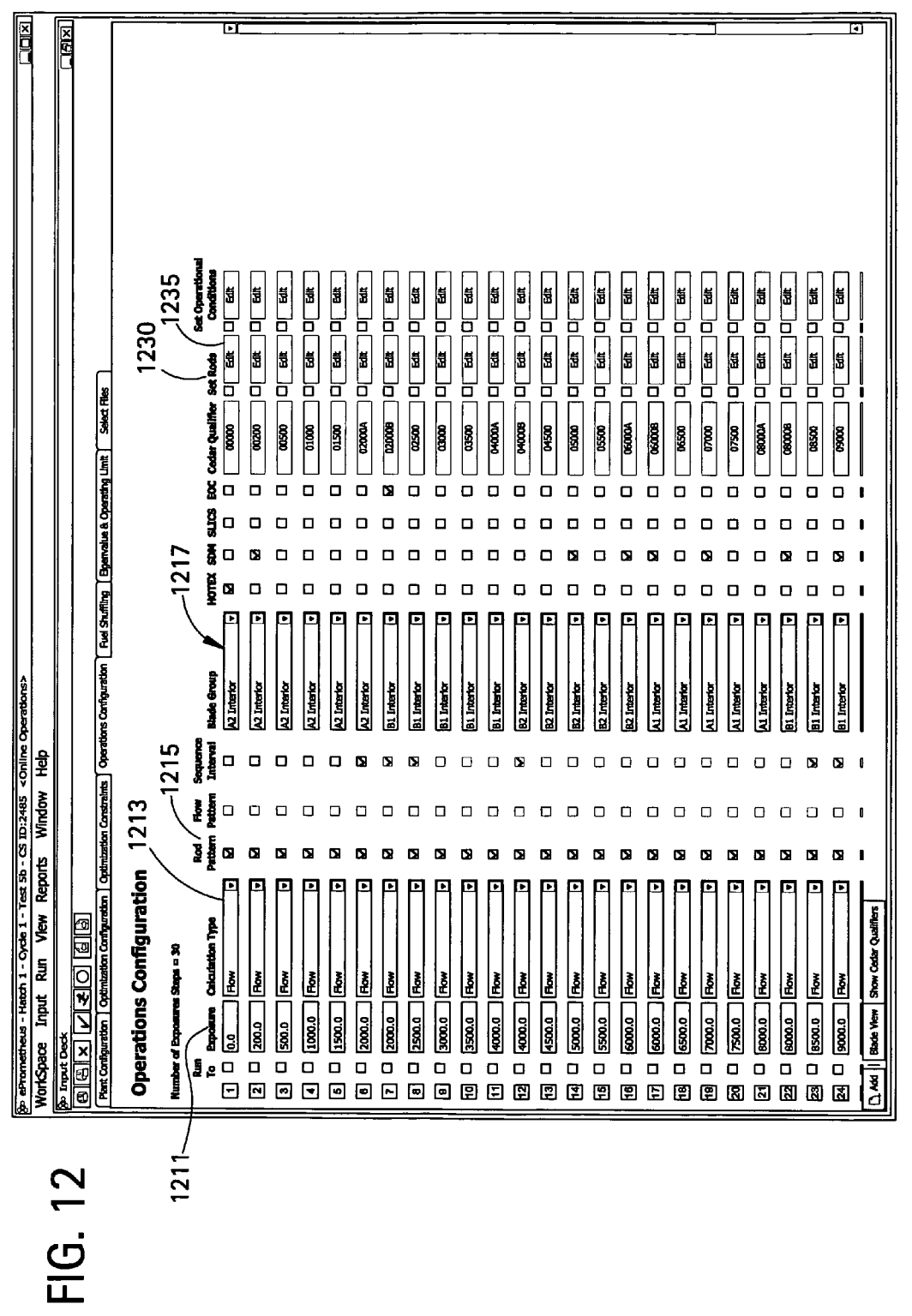

The user proceeds to identifying all sequences and the initial rod pattern determination from a beginning of cycle (BOC) to end of cycle (EOC). FIG. 12 is a screen shot illustrating how a control blade sequence may be entered. The column entitled blade group at 1217 enables the user to adjust or set the sequence strategy based on what user constraints have already been entered, for example. In FIG. 12, the user has set the exposure steps at 1211, calculation type at 1213, detailed rod pattern at 1215, blade groups at 1217 and any appropriate operation parameters.

With the limits having been defined and the sequence strategy (initial test rod pattern for the test reactor core design) having been established, a simulation is initiated (Step S30). The simulation may be executed by calculation servers 400; however, the simulation may be a 3D simulation process that is run external to the arrangement 1000. The user may employ well-known executable 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

The user may initiate a 3D simulation at any time using GUI 230, and may have a number and different means to initiate a simulation. For example, the user may select a "run simulation" from a window drop down menu, or could click on a "RUN" icon on a webpage task bar, as is known. Additionally, the user may receive graphical updates or status of the simulation. Data related to the simulation may be queued in queue database 253 within relational database server 250. Once the simulation is queued, the user may have an audio and/or visual indication as to when the simulation is complete, as is known.

Once the user initiates simulation, many automation steps follow. FIG. 13 is a flow chart illustrating simulation Step S30 in further detail. Initially, all definitions for the test core design with the selected rod pattern design problem are converted into a 3D instruction set (e.g., a computer job) for the 3D reactor core simulator (Step S31). This enables the user to have a choice of several types of simulators, such those described above. Selection of a particular simulator may be dependant on the plant criteria entered by the user (e.g. the limits). The computer job is readied for queuing in the queue database 253 of each relational database server 250 (Step S33). The storing of the data for a particular simulation enables any potential simulation iteration to start from the last or previous iteration. By storing and retrieving this data, future simulation iterations to a rod pattern design take only minutes or seconds to perform.

Concurrently, a program running on each of the available calculation servers 400 scans every few seconds to look for available jobs to run (Step S37). If a job is ready to run, one or more of the calculation servers 400 obtains the data from the queue database 253 and runs the appropriate 3D simulator. As described above, one or more status messages may be displayed to the user. Upon completion of the simulation, all results of interest may be stored in one or more subordinate databases within the relational database server 250 (e.g., simulation results database 255). Accordingly, the relational database server 250 may be accessed in order to calculate the objective function values for the test rod pattern design.

FIG. 14 is a flow diagram illustrating the comparing step of FIG. 11 in further detail. The objective function may be stored in relational database server 250 for access by calculation servers 400. Objective function calculations, which provide objective functions values, may also be stored in the relational database server 250, such as in a subordinate objective function value database 257. Referring to FIG. 14, inputs to the objective function calculation include the limits from the limits database 251 and the simulator results from the simulator results database 255. Accordingly, one or more calculation servers 400 access this data from relational database server 250 (Step S41).

Although the example embodiments of the present invention envision any number of objection function formats that could be utilized, one example includes an objective function having three components: (a) the limit for a particular constraint parameter (e.g., design constraint for reactor plant parameter), represented as "CONS"; the simulation result from the 3D simulator for that particular constraint parameter, represented as "RESULT", and a multiplier for the constraint parameter, represented by "MULT". A set of predefined MULTs may be empirically determined from a large collection of BWR plant configurations, for example. These multipliers may be set at values that enable reactor energy, reactivity limits, and thermal limits to be determined in an appropriate order. Accordingly, the method of the present invention utilizes a generic set of empirically-determined multipliers, which may be applied to over thirty different core designs. However, GUI 230 permits manual changing of the multipliers, which is significant in that user preference may desire certain constraints to be "penalized" with greater multipliers than the multipliers identified by the pre-set defaults.

An objective function value may be calculated for each individual constraint parameter, and for all constraint parameters as a whole, where all constraint parameters represent the entity of what is being evaluated in a particular test rod pattern of the test reactor core design (or as will be discussed below, a particular core loading pattern or one or more (N) unique fresh fuel bundle types for the test core design). An individual constraint component of the objective function may be calculated as described in Equation (1):

$$OBJ_{par} = MULT_{par} * (RESULT_{par} - CONS_{par}); \quad (1)$$

where "par" may be any of the client-inputted constraints listed in FIG. 5. These parameters are not the only parameters that could be possible candidates for evaluation, but are parameters which are commonly used in order to determine a suitable core configuration for a nuclear reactor. The total objective function may be a summation of all constraint parameters, or $$OBJ_{TOT} = SUM(par=1,31)\{OBJ_{par}\} \quad (2)$$

Referring to Equation 1, if RESULT is less than CONS (e.g. there is no violation of a constraint), the difference is reset to zero and the objective function will be zero. Accordingly, objective function values of zero indicate that a particular constraint has not been violated. Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, the rod pattern (or core loading pattern or unique fresh fuel bundle type pattern) is modified only at the identified exposure step.

In addition, objective function values may be calculated as a function of each exposure step, and totaled for the entire design problem (Step S43). The objective function values calculated for each constraint, and the objective function values per exposure step, may be further examined by normalizing each objective function value to provide a percentage contribution of a given constraint to a total objective function value (Step S45). Each result or value of an objective function calculation is stored (Step S47) in a subordinate objective function value database 257 within relational database server 250.

The objective function values may be utilized in the manual determination of the desired rod pattern for the test core design. For example, the values of the objective function calculations may be viewed graphically by the user in order to determine parameters that violate limits. Additionally, any change in objective function values over successful iterations of rod pattern design changes in the test core design provides the user with a gauge to estimate both improvement and detriment in their proposed design.

Increases in an objective function value over several iterations indicate that the user's changes are creating a rod pattern design (and hence power uprate core design) that is moving away from a desired solution, while successive iterations of lesser objective functions values (e.g., the objective function value decreasing from a positive value towards zero) may indicate improvements in the iterative design. The objective function values, limits and simulation results over successive iterations may be stored in various subordinate databases within relational database server 250. Therefore, designs from past iterations may be quickly retrieved, should later modifications prove unhelpful.

FIG. 15 is a screen shot to illustrate exemplary graphical data available to the user for review after completion of the objective function calculations. Upon completion of the objective function calculation, the user may be provided with data related to the objective function calculations, which may include limits that have been violated during the simulation of the test reactor core design configured with the evaluated test rod pattern.

Referring to FIG. 15, there is displayed a list of constraint parameters which may represent the input limits, and the values of each of objective function value calculation on a per constraint basis. FIG. 15 illustrates limits which have been violated with a check in a box, as indicated by checked box 1505 for example. Additionally, for each limit violation, its contribution and percent (%) contribution (based on the calculations and the normalization routines described with respect to FIG. 14), are displayed. Accordingly, based on this data, the user may be provided with a recommendation as to what modifications need to be made to the rod pattern design for a subsequent iteration.

Although the individual rod pattern modifications may alternatively be left to the desires of the user, procedural recommendations may be provided in the form of a pull down menu, for example. These recommendations may be divided into four categories: energy beneficial moves, reactivity control, energy detrimental moves, and converting excessive margin (from thermal limit) into additional energy. As discussed above, one technique is to address problems using energy beneficial moves rather than energy detrimental moves. Even if the rod pattern design meets all of the limits (client-inputted plant specific constraints, design limits, thermal limits, etc.) the user may verify that any excessive margin to a particular limit is converted into additional energy. Accordingly, the following logic statements may represent the above procedural recommendations modifying the rod pattern:

Energy Beneficial Moves
    If peaking off top of blade, insert blade deeper
    If NEXRAT (e.g., a thermal margin constraint) problem at EOC, insert blade deeper earlier in cycle
    If kW/ft peaking during mid cycle, drive deeper rods deeper earlier in cycle
Reactivity Control
    If flow too high during sequence, pull deep rods
    If flow too low during sequence, drive rods deeper
Energy Detrimental Moves
    If peaking at bottom of core during sequence, insert shallow blade in local area
Converting Excessive Margin Into Additional Energy
    If extra MFLCPR margin at EOC, drive blades deeper earlier in cycle
    If extra kW/ft margin EOC, drive blades deeper earlier in cycle
    If extra MFLCPR margin in center of core at EOC, drive center rods deeper earlier in cycle Based on the location, and on the time exposure of limit violations, as indicated by the objective function, a user may easily follow one or more of the above recommendations to address and fix constraint violations.

The data resulting from the objective function calculations may be interpreted on a suitable display device. For example, this data may be displayed as a list of constraints with denoted violators, as described with respect to FIG. 15. However, the user may access a number of different "result" display screens that may configurable as 2- or 3-dimensional views, for example. The following Table 1 lists some of the exemplary views available to the user.

TABLE 1

GRAPHICAL VIEWS AVAILABLE TO USER

Objective function results - listing
Graph of max core value vs. exposure
Graph of nodal maximum value vs. exposure
Graph of location of max core value vs. exposure
Graph of pin value vs. exposure
Graph of bundle maximum value vs. exposure
View 3D rotational diagram
Report performance relative to previous iteration
Report improvement rates of various designers TABLE 1-continued

GRAPHICAL VIEWS AVAILABLE TO USER

Display of server status
Display of queue status
Display system recommendations

Figure 16:
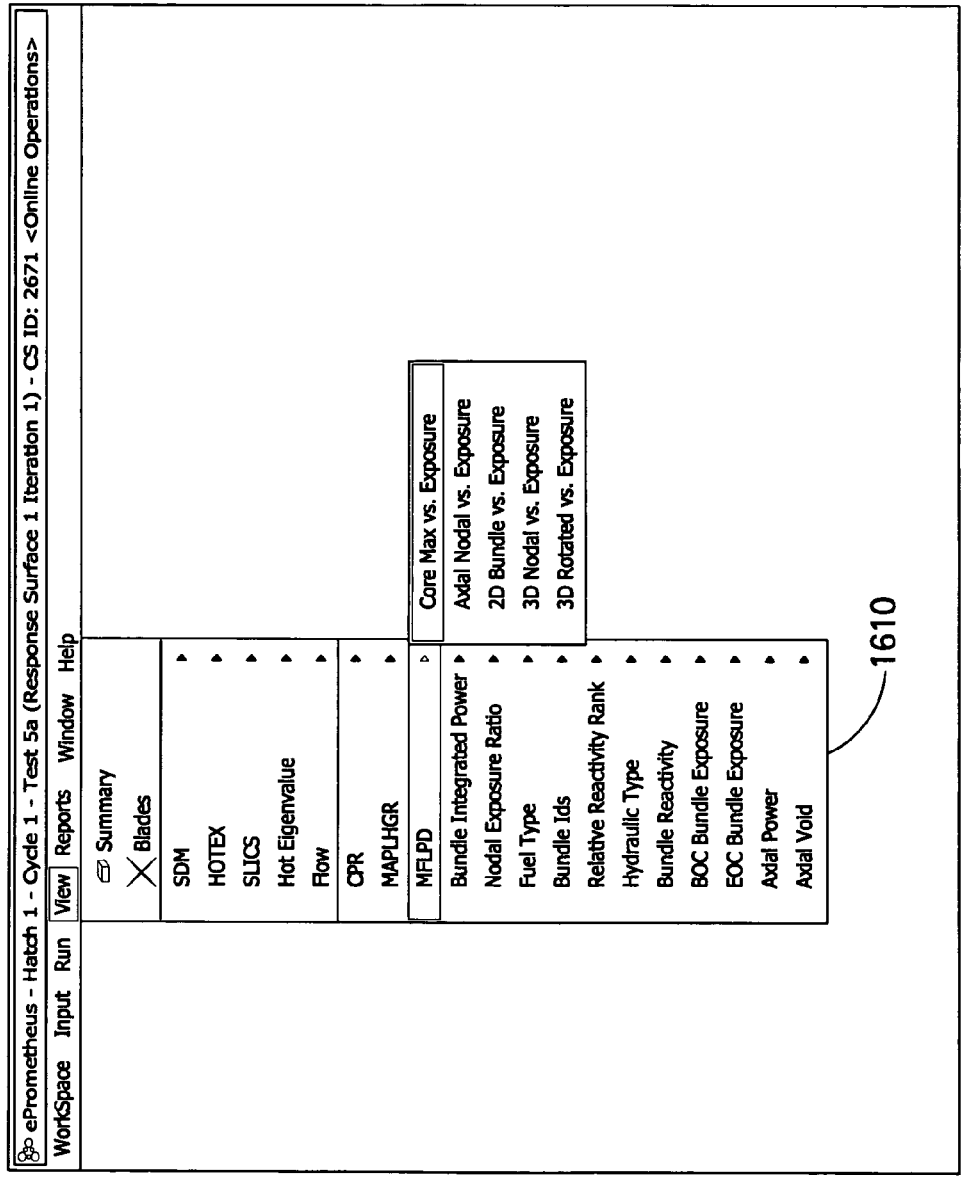
FIGS. 16, 17A and 17B are screen shots to illustrate graphical data available to the user to review the status of given constraints or limits subsequent to simulation and the objective function analysis, in accordance with the invention.
Figure 17A:
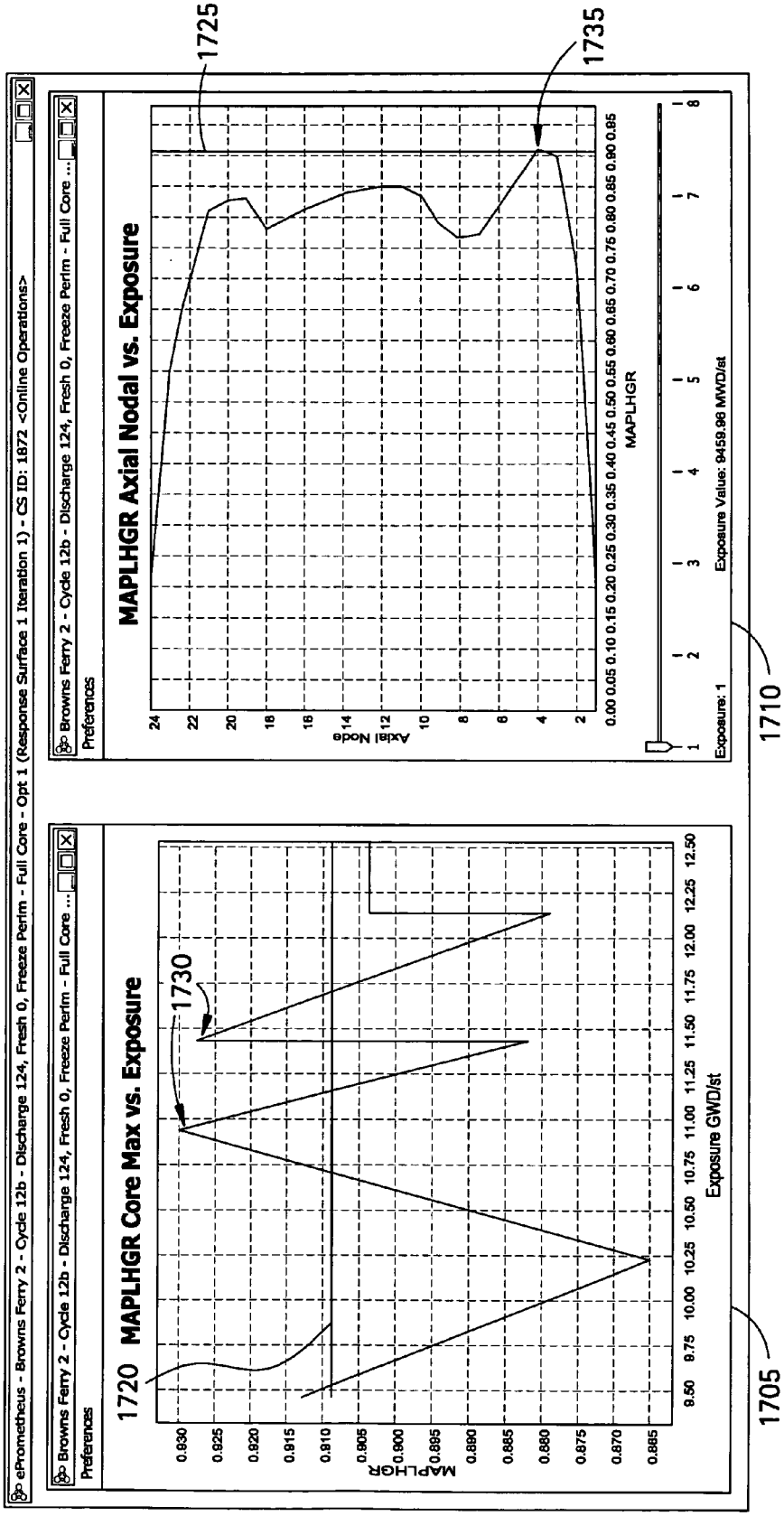
Figure 17B:
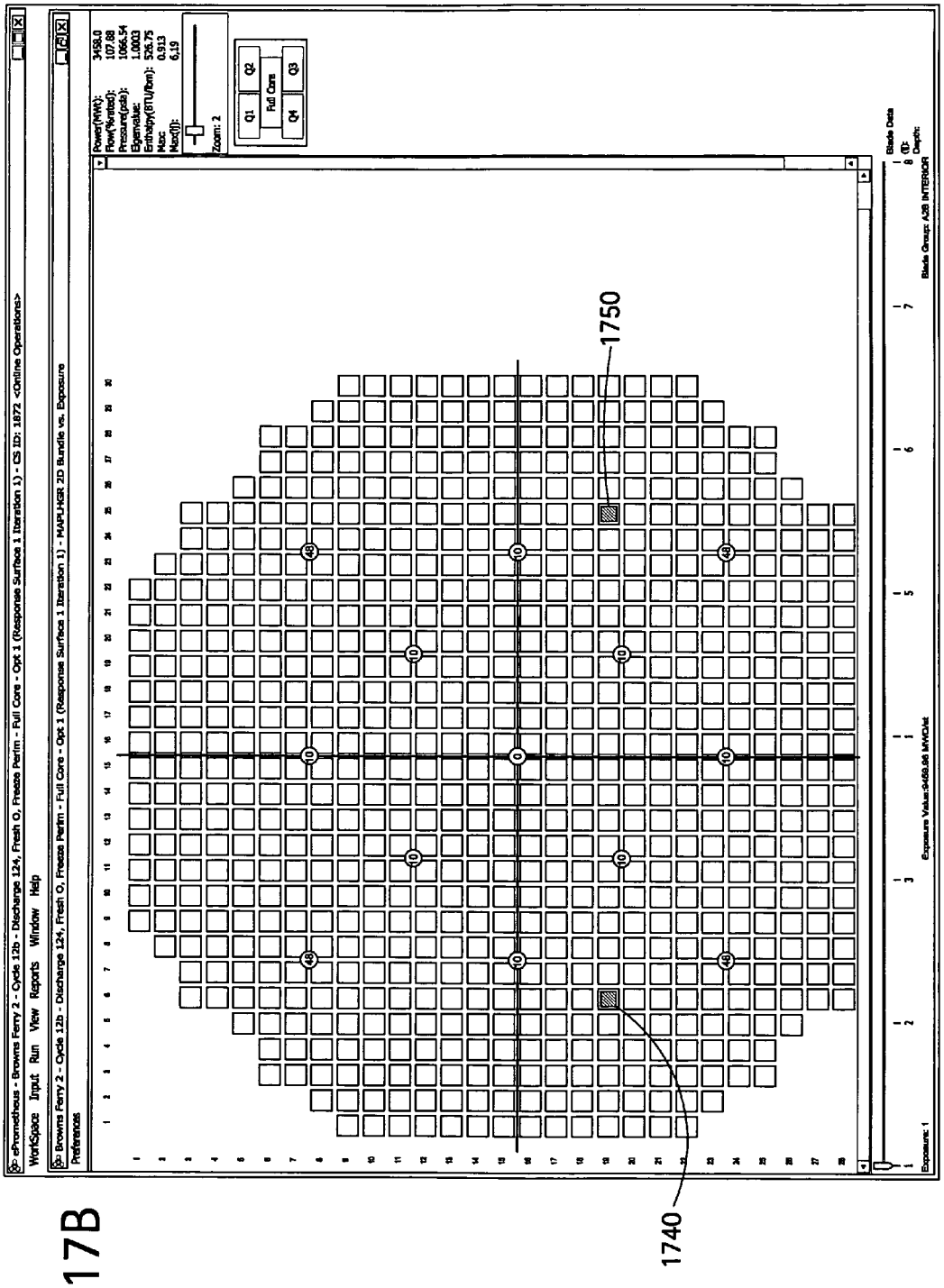

FIGS. 16, 17A and 17B are screen shots to illustrate graphical data available to the user to review the status of given constraints or limits subsequent to simulation and the objective function analysis, in accordance with the invention. Referring to FIG. 16, a user may pull down a suitable drop down menu from a "view" icon on a task bar in order to display views of certain constraints or parameters. As illustrated in FIG. 16, a user has selected a Maximum Fractional Limiting Power Density (MFLPD) constraint parameter. There are a number of different graphical views available to the user, as indicated by pull-down menu 1610. The user simply selects the desired view and may then access a page such as is illustrated in FIG. 17A or 17B.

FIG. 17A illustrates two different 2-dimensional graphs of particular constraints, as seen at 1705 and 1710. For example, the user can determine where violations of Maximum Average Planar Heat Generation Rate (MAPLHGR) occur (in a core maximum vs. exposure graph 1705, and an axial values of MFLPD vs. exposure graph 1710) for a particular exposure in a core cycle. The limits for these constraints are shown by lines 1720 and 1725, with violations shown generally at 1730 and 1735 in FIG. 17A.

FIG. 17B illustrates another view, in this case a two dimensional view of an entire cross section of a core, in order to see where the biggest violation contributors for MAPLHGR vs. exposure are located. As can be seen at 1740 and 1750, the encircled squares represent the fuel bundles that are the largest violation contributors to MAPLHGR in the core (e.g., 1740 and 1750 pointing to bundles violating MAPLHGR). This gives the user an indication of which fuel bundles in the rod pattern design may need modification.

Figure 18A:
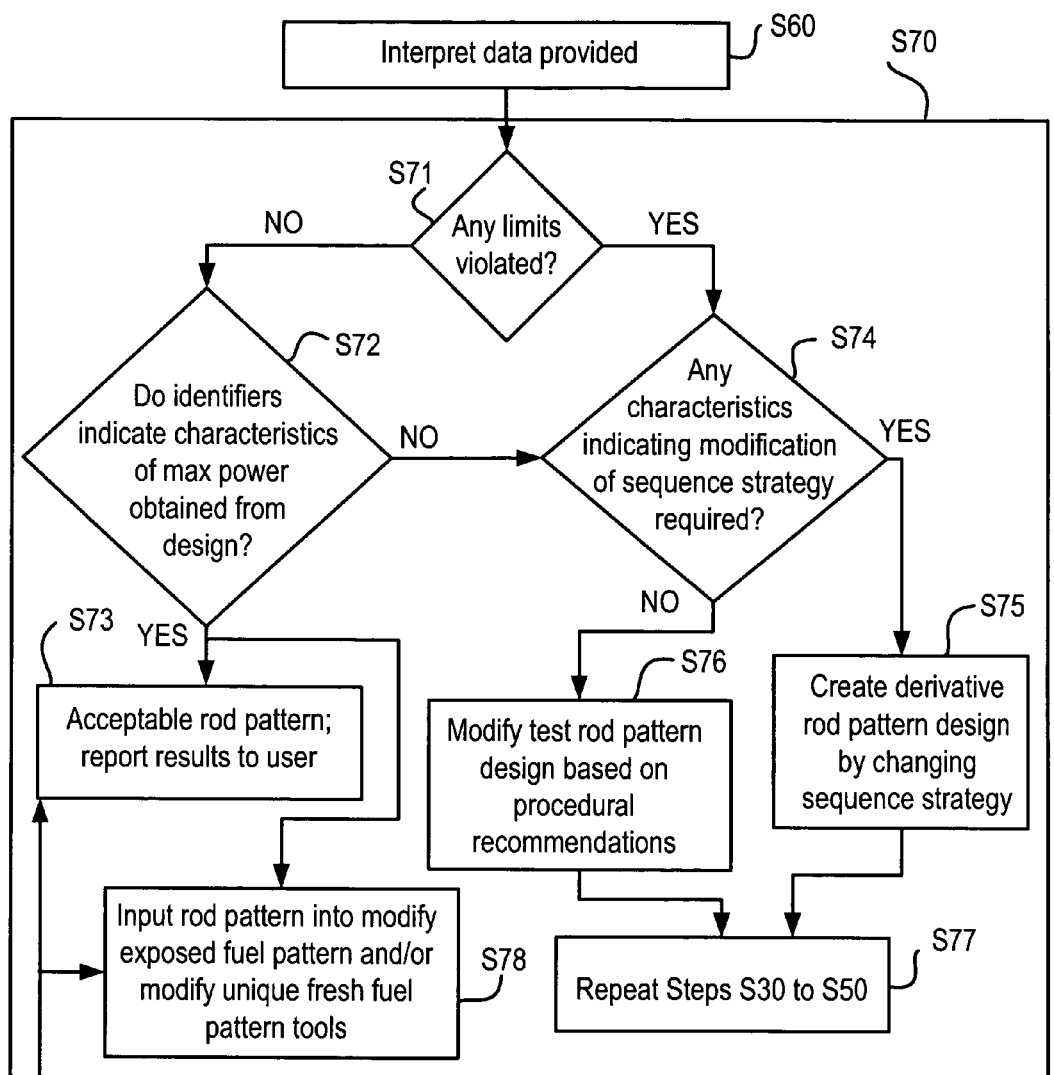
FIGS. 18A and 18B are flow diagrams describing rod pattern modification and iteration processing steps in accordance with the example modify rod pattern tool, in accordance with the invention.
Figure 18B:
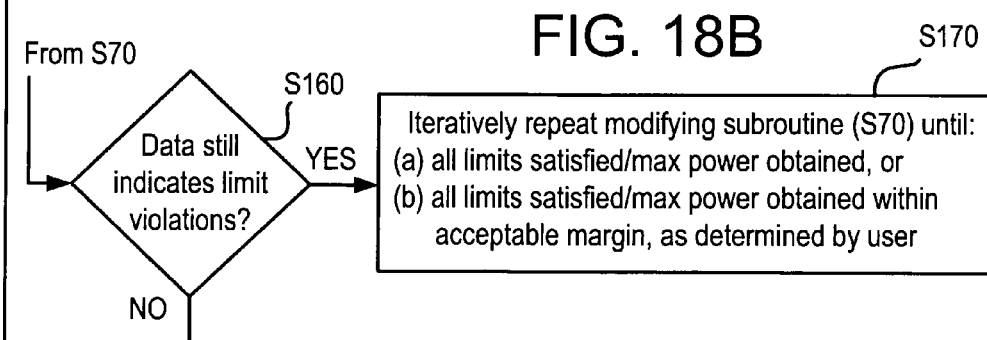

FIGS. 18A and 18B are flow diagrams describing rod pattern modification and iteration processing steps in accordance with the example modify rod pattern tool, in accordance with the invention. Referring to FIG. 18A, by interpreting the data at Step S60 (such as the data shown and described in FIGS. 15 through 17B, for example), the user may be inclined to initiate a modifying subroutine (Step S70). In all practicality, the test reactor core design with the initial test rod pattern will not be an acceptable design, and the modifying subroutine likely will be required.

In one embodiment, the user can manually direct this modifying subroutine, with the help of the graphical user GUI 230. In another embodiment, the subroutine may be performed within the bounds of an optimization algorithm that automatically iterates simulation, calculation of objective function and evaluation of the results or values of the objective function calculations for a number of rod pattern design iterations.

The user determines, based on the displayed data, whether any limits are violated (Step S71). If no limits are violated, the user determines if any identifiers indicate that characteristics of maximum power (for uprated power operations) are obtained from the test reactor core design with selected test rod pattern. For example, these identifiers may include an indication of good thermal margin utilization (such as margins on MFLCPR and LHGR) by driving rods deeper into the core to maximize plutonium generation for cycle extension. Power requirements may be shown to be met when the minimum EOC eigenvalue is obtained for the cycle design (eigenvalue search) or the desired cycle length is determined at a fixed EOC eigenvalue. If there is an indication that max power has been obtained from the test reactor core design with selected test rod pattern (the output of Step S72 is YES), an acceptable test rod pattern for the test reactor core design has been determined, and the user may access a report of the results related to the rod pattern design (Step S73) and/or use the selected rod pattern in the modify core and/or unique fresh fuel bundle type design tools (Step S78).

If limits are violated (the output of Step S71 is YES) or limits are not violated but there is an indication that max power has not been obtained from the rod pattern design (the output Step S72 is NO) then the user determines whether any characteristics indicate that modification of the sequence strategy is required (Step S74). Characteristics that indicate a need to modify the sequence strategy may include excessive control blade (control rod) history, excessive MFLCPR at EOC in local areas and inability to contain MFLCPR at individual exposures. Additionally, if several iterations of rod pattern design changes have been attempted and there has been no real improvement to the objective function, this is a further indication that an alternative rod pattern sequence might need to be explored.

Figure 19:
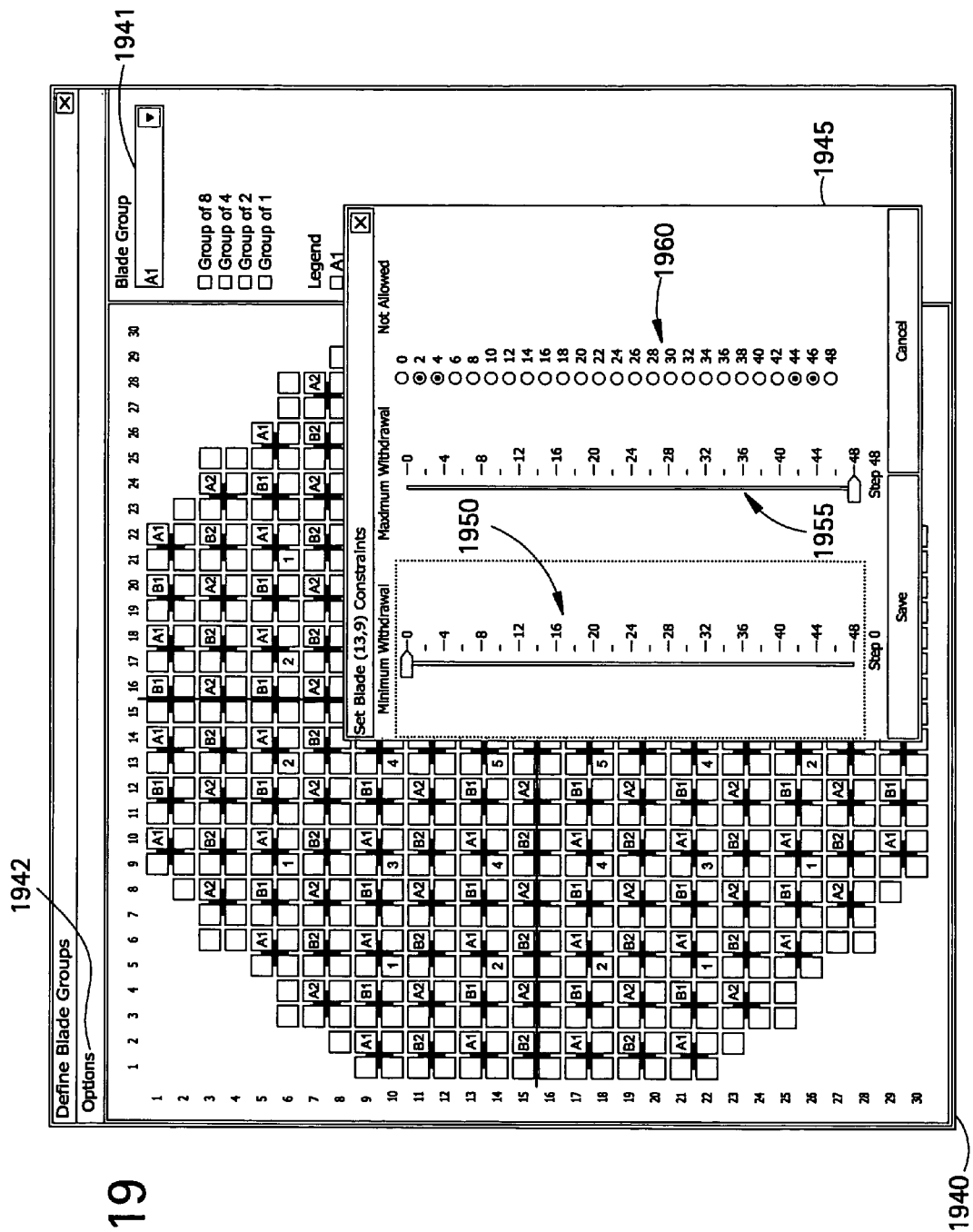
FIG. 19 is a screenshot for defining blade groups for modifying the rod pattern.

FIG. 19 is a screenshot for defining blade groups in order to modify the rod pattern. Accordingly, if the sequence strategy requires modification (the output of Step S74 is YES), the user creates a derivative rod pattern design by changing the sequence strategy (Step S75). For example, and referring to FIGS. 12 and 19, the user may select an edit option on the operations configuration page to change the blade groupings (see 1217 in FIG. 12).

If there are no characteristics indicating that the sequence strategy needs to be modified (the output of Step S74 is NO) the user may modify the test rod pattern design to create a derivative rod pattern (and hence a derivative reactor core design) by changing positions of control blades or control rods. Referring to FIG. 12, the user checks a "set rods" box 1230 for a particular exposure and selects edit icon 1235. As shown in FIG. 19, these operations may bring up another display that enables the user to manually alter the notch positions of the control blades in a particular group. In FIG. 19, there is shown a "Define Blade Groups" screenshot 1940, which illustrates a core cross section with a blade group Interior A1 selected at cell 1941. By selecting options pull down menu 1942, the user may display another window called a "Set Blade Constraints" window 1945. The minimum withdrawal column 1950 identifies how far a blade is allowed into the core. The maximum withdrawal column 1955 identifies how far the blade is allowed out of the core, and the Not Allowed column 1960 identifies blade locations that are not allowed for this particular rod pattern design. The example are not limited to changing control blade notch positions for boiling water reactors, but also to changing rod position of control rods in pressurized water reactors, as well as control rod positions in other types of reactors (e.g., gas cooled reactor, heavy water reactors, etc.).

Regardless of whether the test rod pattern was modified by changing rod positions or modified by changing sequence strategy, Steps S30-S50 are repeated to determine if the derivative rod pattern (and hence the derivative reactor core design) meets all limits (Step S77). This may become an iterative process.

FIG. 18B illustrates the iterative process in accordance with an example embodiment of the invention. For each derivative rod pattern design that has been simulated, the user determines whether any data that is related to the comparison between simulated results and limits (e.g., the calculated objective function values) still indicates that there are limit violations. If not, the user has developed an acceptable rod pattern design that may be used in a particular reactor, and may access graphical results related to the acceptable rod pattern design (Step S73) and/or use the selected rod pattern in the modify core and/or unique fresh fuel bundle type design tools (Step S78).

If an iteration still indicates that limits are violated (the output of Step S160 is YES) then the modifying subroutine in Step S70 is iteratively repeated until all limits are satisfied, or until all limits are satisfied within a margin that is acceptable, as determined by the user (Step S170). The iterative process is beneficial in that it enables the user to fine tune a rod pattern design, and to perhaps extract even more energy out of an acceptable rod pattern design than was previously possible of doing with the conventional, manual iterative process. Further, incorporation of the relational database server 250 and a number of calculation servers 400 expedite calculations. The iterative process as described in FIG. 18B may be done in an extremely short period of time, as compared to a number of weeks using the prior art manual iterative process of changing one parameter at a time, and then running a reactor core simulation.

To this point, the modify rod pattern tool been described in terms of a user or designer interpreting data via GUI 230 and modifying the test rod pattern (and hence test reactor core design) iteratively, by hand, based on displayed feedback (the data from the objective finction) in order to get a desired design. However, the aforementioned steps of FIGS. 18A and 18B may also be effectuated by way of an optimization process. Such an optimization process is equally applicable to the modify core loading pattern tool and unique fresh fuel bundle type design tool to be explained hereafter. The optimization process iterates the steps in FIGS. 18A and 18B over a number of different rod pattern designs, constantly improving on violated limits in order to achieve an optimal rod pattern design to be used in a nuclear reactor core.

Figure 20:
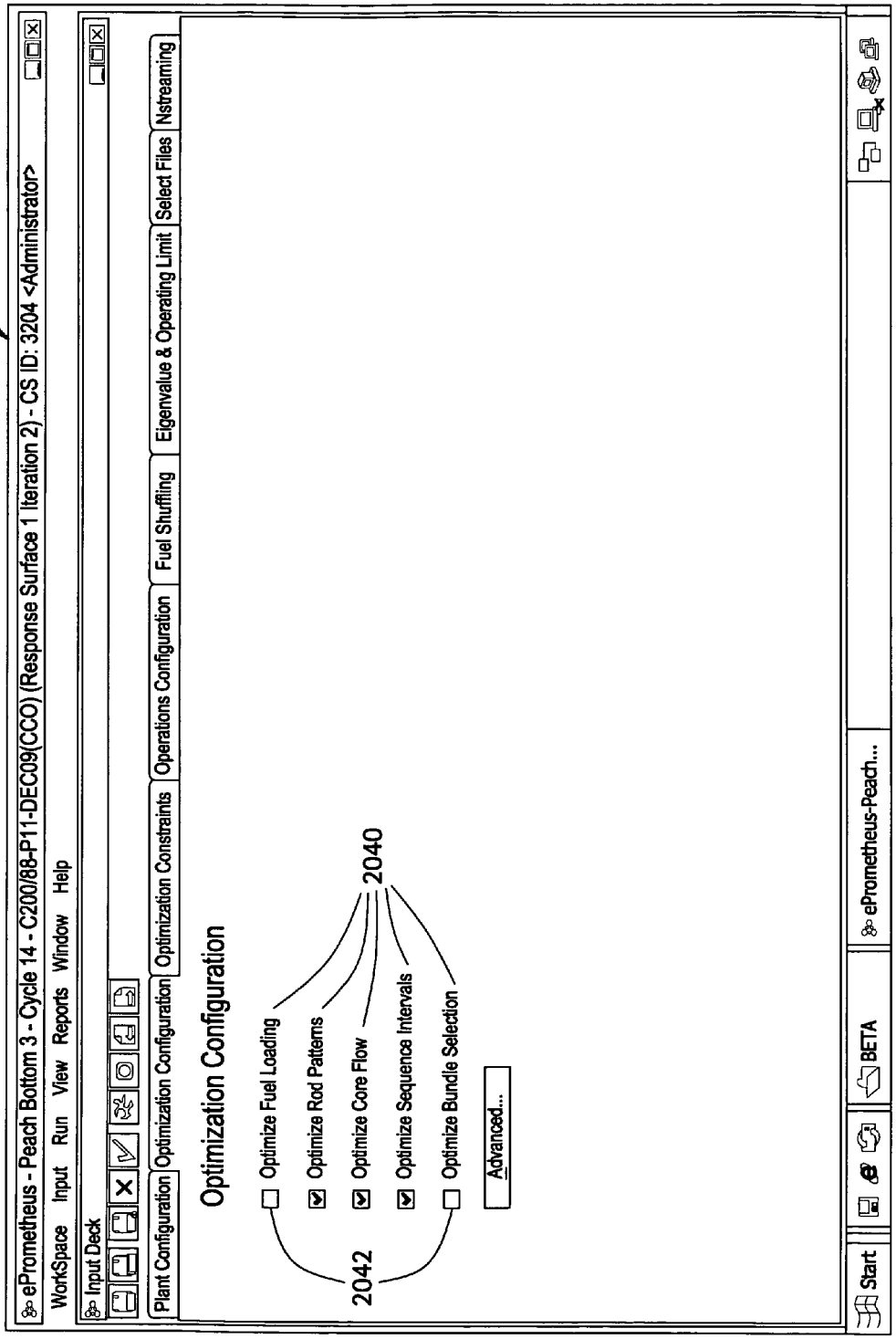
FIG. 20 is a screen shot to illustrate configuring an optimization process.

FIG. 20 illustrates a screen shot to initiate such a process. For example, after selecting the plant and the test rod pattern, the user may display an optimization configuration screen 2005. The user may select optimization parameters 2040 of optimize rod patterns, optimize core flow, and optimize sequence intervals, for example. Optimize rod patterns means making an optimal determination of individual rod (control blades in BWRs) positions within a control rod grouping (called a sequence), for the duration of time during the operating cycle when the given sequence is being used to control the reactor. Rod positions affect the local power as well as the nuclear reaction rate.

Optimize core flow means making an optimal determination of reactor coolant flow rate through the reactor as a function of time during the operating cycle. Flow rate affects global reactor power as well as the nuclear reaction rate. Optimize sequence intervals means making an optimal determination of the time duration a given sequence (i.e., control rod grouping) is used to control the reactor during the operating cycle. Sequence intervals affect local power as well as the nuclear reaction rate.

Using a suitable input device (e.g., keyboard, mouse, touch display, etc.), the user may select, via GUI 230, one or more of the optimization parameters by clicking in the selection box 2042 associated with a given optimization parameter 2040. When selected, a check appears in the selection box 2042 of the selected optimization parameter. Clicking in the selection box 2042 again de-selects the optimization parameter. As shown in FIG. 20, to optimize the iterative modify rod pattern design process, the user would select boxes 2042 for optimize rod patterns, optimize core flow and optimize sequence intervals.

Memory (relational database server) 250 may also store constraint parameters associated with the optimization problem. These may be stored in limits database 251 for example. The constraint parameters are parameters of the optimization problem that must or should satisfy a constraint or constraints, where a constraint may be analogous to the limits described above.

Figure 21:
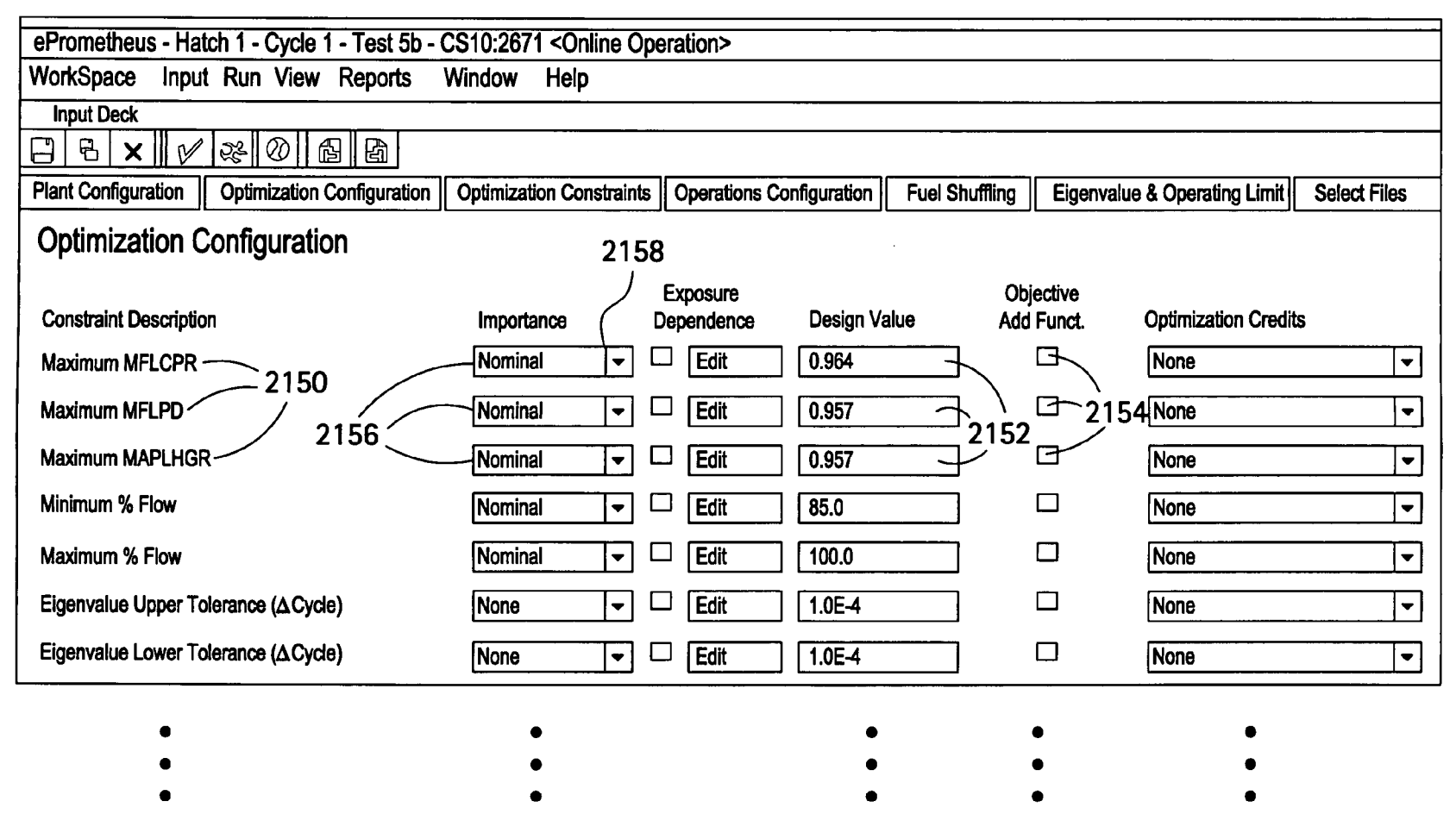

FIG. 21 illustrates a screen shot of an exemplary optimization constraints page listing optimization constraints associated with an optimization problem of boiler water reactor core design. As shown, each optimization constraint 2150 has a design value 2152 associated therewith. Each optimization constraint must fall below the specified design value. The user has the ability to select optimization parameters for consideration in configuring the objective function. The user selects an optimization constraint by clicking in the selection box 2154 associated with an optimization constraint 2150. When selected, a check appears in the selection box 2154 of the selected optimization constraint 2150. Clicking in the selection box 2154 again de-selects the optimization constraint.

Each optimization parameter may have a predetermined credit term and credit weight associated therewith stored in relational database server 250. Similarly, each optimization constraint has a predetermined penalty term and penalty weight associated therewith, which may be stored in relational database server 250, such as in limits database 251 and/or objective function values database 257. As seen in FIG. 21, the penalty term incorporates the design value, and the user can change (i.e., configure) this value as desired.

Additionally, the embodiment of FIG. 21 allows the user to set an importance 2156 for each optimization constraint 2150. In the importance field 2158 for an optimization constraint, the user may have pull down options of minute, low, nominal, high and extreme. Each option correlates to an empirically predetermined penalty weight such that the greater the importance, the greater the predetermined penalty weight. In this manner, the user selects from among a set of predetermined penalty weights.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

Additionally, this embodiment provides for the user to select a method of handling the credit and penalty weights. For example, the user is supplied with the possible methodologies of static, death penalty, dynamic, and adaptive for the penalty weights; is supplied with the possible methodologies of static, dynamic and adaptive for the credit weights; and the methodology of relative adaptive for both the penalty and credit weights. The well-known static methodology maintains the weights at their initially set values. The well-known death methodology sets each penalty weight to infinity. The well-known dynamic methodology adjusts the initial weight value during the course of the objective function's use in an optimization search based on a mathematical expression that determines the amount and/or frequency of the weight change. The well-known adaptive methodology is also applied during the course of an optimization search. In this method, penalty weight values are adjusted periodically for each constraint parameter that violates the design value. The relative adaptive methodology is disclosed in U.S. patent application Ser. No. 10/246,718, entitled METHOD AND APPARATUS FOR ADAPTIVELY DETERMINING WEIGHT FACTORS WITHIN THE CONTEXT OF AN OBJECTIVE FUNCTION, by the inventors of the subject application, filed on Sep. 19, 2002.

Optimization Using the Objective Function

Figure 22:
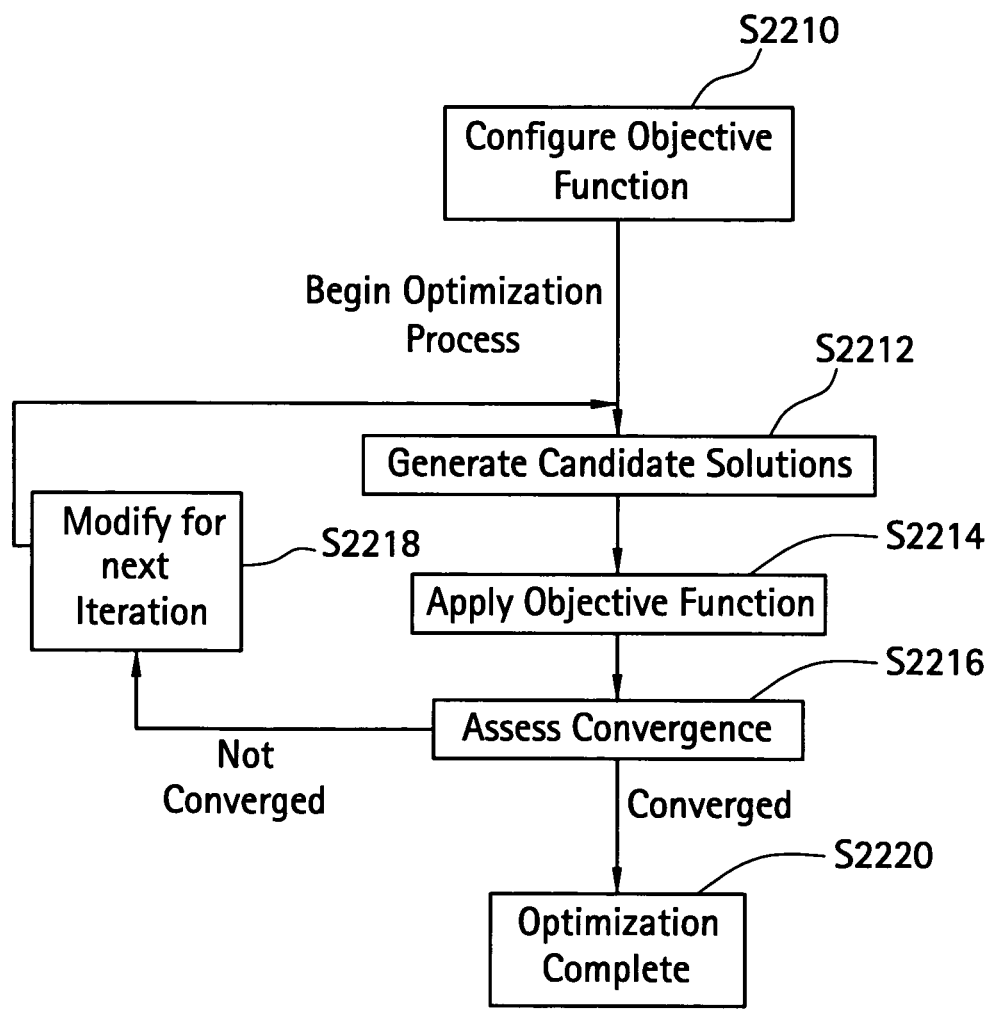
FIG. 22 illustrates a flow chart of an optimization process employing the objective function in accordance with an exemplary embodiment of the present invention.

FIG. 22 illustrates a flow chart of an optimization process employing the objective function in accordance with an exemplary embodiment of the present invention. This optimization process is disclosed in co-pending and commonly assigned U.S. patent application Ser. No. 10/246,716, entitled METHOD AND APPARATUS FOR EVALUATING A PROPOSED SOLUTION TO A CONSTRAINT PROBLEM, filed on Sep. 19, 2002. The relevant portions of the '716 describing the optimization process are hereby incorporated in its entirety by reference herein.

For the purposes of explanation only, the optimization process in FIG. 22 is described as being implemented by the architecture illustrated in FIG. 1. As shown, in Step S2210 the objective function is configured as discussed above in the preceding section, then the optimization process begins. In Step S2212, the calculation processors 400 retrieve system inputs from relational database 250, or generate one or more sets of values for input parameters (i.e., system inputs) of the optimization problem based on the optimization algorithm in use. For example, these input parameters may be related to determining rod patterns bundles in the test reactor core so as to meet the constraint or limit criteria for uprated power operations, but may also be related to the other automated tools, i.e., for determining an core loading pattern and/or a unique fresh fuel bundle types for placement in the test reactor core so as to meet the constraint or limit criteria for uprated power operations. However, optimization is not limited to using these parameters, as other input parameters in addition to placement of fresh and exposed fuel bundles within the reactor, selection of the rod groups (sequences) and/or placement of the control rod positions within the groups as a function of time during the cycle can be used, such as parameters directed to core flow as a function of time during a cycle, reactor coolant inlet pressure, etc.

Each input parameter set of values is a candidate solution of the optimization problem. The core simulator as described above runs a simulated operation and generates a simulation result for each input parameter set of values. The simulation result includes values (i.e., system outputs) for the optimization parameters and optimization constraints. These values, or a subset of these values, are values of the variables in the mathematical expressions of the objective function.

Then, in step S2214, a calculation processor 400 uses the objective function and the system outputs to generate an objective function value for each candidate solution. In step S2216, the calculation processor 400 assesses whether the optimization process has converged upon a solution using the objective function values generated in step S2214. If no convergence is reached, then in step S2218, the input parameter sets are modified, the optimization iteration count is increased and processing returns to step S2212.

The generation, convergence assessment and modification operations of steps S2212, S2216 and S2218 are performed according to any well-known optimization algorithm such as Genetic Algorithms, Simulated Annealing, and Tabu Search. When the optimization is utilized to determine an acceptable rod pattern design (and/or an acceptable core loading pattern design or unique fresh fuel bundle types for placement in the core), the optimization is run until convergence (e.g., acceptable results as in steps S73/S173 of FIGS. 18A and 18B) is obtained.

The Modify Core Loading Pattern Tool

The modify core loading pattern tool is described in detail in co-pending and commonly-assigned U.S. application Ser. No. 10/401,602 to William Earl Russell, II et al., filed Mar. 31, 2003 and entitled "Method and Arrangement for Developing Core Loading Patterns in Nuclear Reactors. The user may implement to core loading pattern tool in conjunction with an accepted rod pattern design determined for the test reactor core, or the tool may be iterated on the existing test reactor core design determined in block 600. As described with the rod pattern tool, the test reactor core design (loaded in accordance with the limits identified in FIG. 5 and supporting disclosure, with the desired inventory of fresh fuel bundles from FIG. 6, with a desired initial test core loading pattern determined as described in FIGS. 8 and 9 and fresh fuel loading pattern as described in FIG. 10, the test reactor design is simulated. As per the simulation, the only difference in FIG. 13 is that in step S31 the desired core loading pattern, instead of (or in addition to) the rod pattern (control blade sequence) for the test core design is converted into a 3D instruction set. Thus, a desired control blade sequence (rod pattern) determined from iteration of the modify rod pattern tool may be set for the desired core loading pattern (and incorporated as well into the 3D instruction set) for the test core design to be simulated.

Similarly as described in FIG. 14, inputs to the objective function calculations from the limits database 251 and the simulator results from the simulator results database 255 are accessed by one or more calculation servers 400 (Step S41), and the objective function values are calculated as a function of each exposure step, and totaled for the entire design problem (Step S43). The calculated objective function values calculated for each constraint, and the objective function values per exposure step are normalized to provide a percentage contribution of a given constraint to a total objective function value (Step S45). Each result or value of an objective function calculation is stored (Step S47) in a subordinate objective function value database 251 within relational database server 250.

As shown in FIG. 15, the user may be provided with data indicating those limits that may have been violated during the simulation. Accordingly, based on this data, the user may be provided with recommendation(s) as to what modifications may need to be made to the selected core loading pattern of the test core design for a subsequent iteration.

As discussed above with the modify rod pattern tool, while individual core loading pattern modifications may alternatively be left to the desires of the user, procedural recommendations as energy beneficial moves, energy detrimental moves, and converting excessive margin (from thermal to limit) into additional energy may be accessible by the user. Even if the test core design with the desired core loading pattern meets all of the limits (client-inputted plant specific constraints, design limits, thermal limits, etc.) the user may verify that any excessive margin to a particular limit is converted into additional energy. Accordingly, the following logic statements may illustrate the above procedural recommendations for modifying the core loading pattern:

Energy Beneficial Moves
    If Critical Power Ratio (CPR) margin too low towards core perimeter, move more reactive (less exposed) fuel toward core center
    If MFLPD (e.g., a thermal margin constraint) problem at EOC, move more reactive fuel towards problem location
    If shutdown margin (SDM) problem at core perimeter at BOC, place less reactive fuel toward core perimeter Energy Detrimental Moves
    If Minimum Critical Power Ratio (MCPR) margin too low at EOC, move less reactive (more exposed) fuel into problem location(s)
    If KW/ft margin (MAPLHGR) too low at EOC, move less reactive fuel into problem location(s)

Converting Excessive Margin Into Additional Energy
    If extra MCPR margin in center of core at EOC, move more reactive fuel from core perimeter location to core center The data resulting from the objective function calculations may be displayed as a list of constraints with denoted violators, as shown in FIG. 15 and Table 1. The user may again be presented with graphical displays as shown in FIGS. 16 to 17B to see the effect of the core design on certain constraints or parameters. For example, in FIG. 17B at 1740 and 1750, the encircled squares represent the fuel bundles that are the largest violation contributors to MAPLHGR in the core (e.g., 1740 and 1750 pointing to bundles violating MAPLHGR). This gives the user an indication of fresh and/or exposed fuel locations in the test core design that may need modification.

Figure 23A:
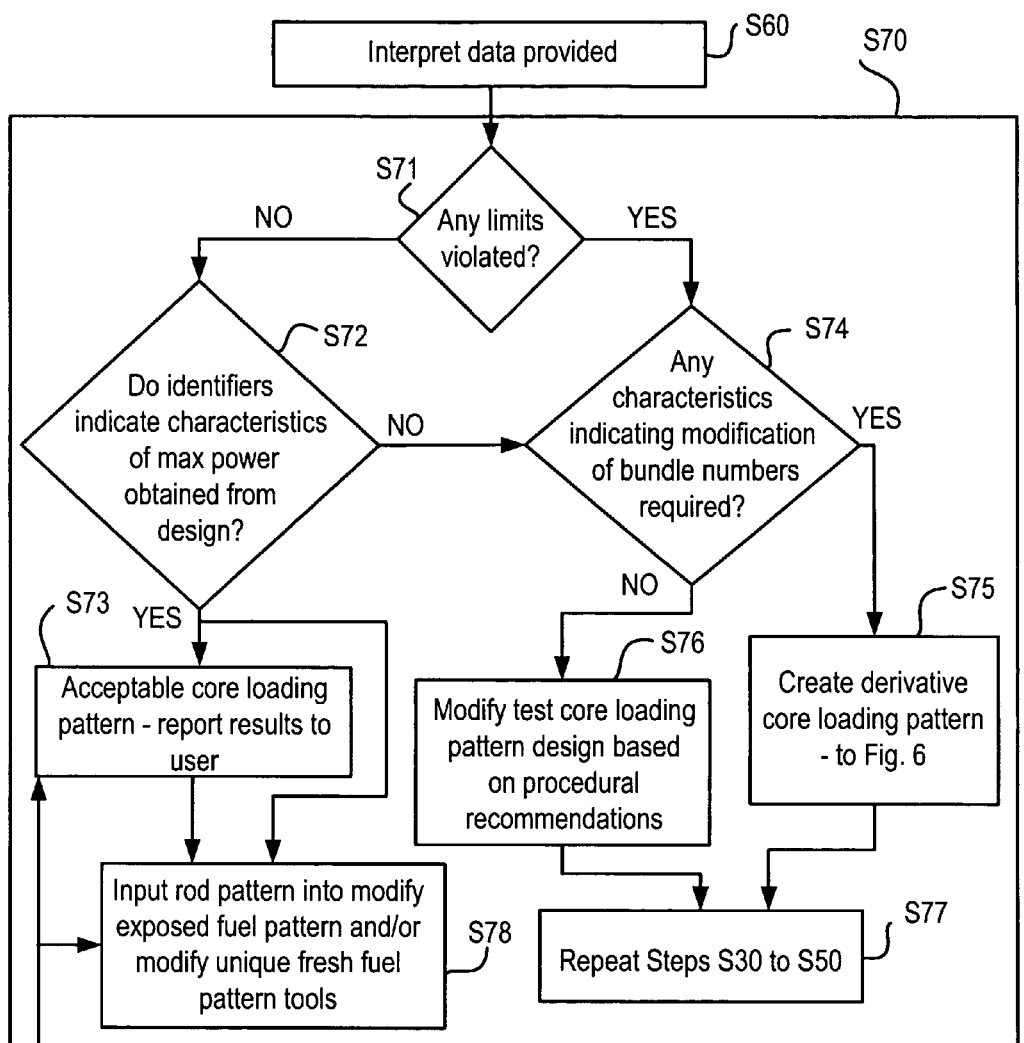
FIGS. 23A and 23B are flow diagrams describing core loading pattern modification and iteration processing steps in accordance with the example modify core loading pattern tool, in accordance with the invention.
Figure 23B:
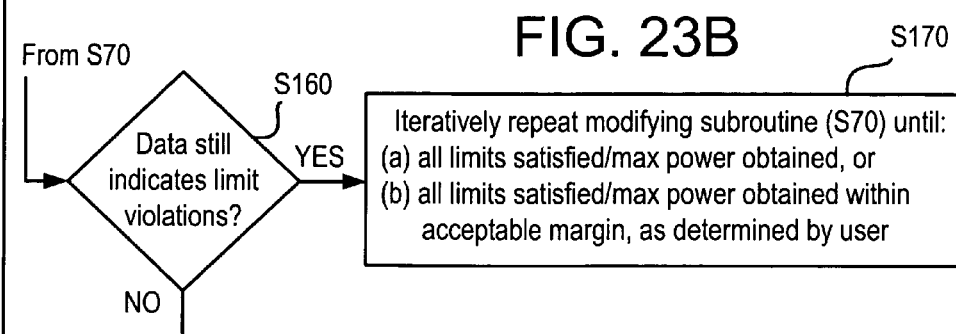

FIGS. 23A and 23B are flow diagrams describing core loading pattern modification and iteration processing steps in accordance with the example modify core loading pattern tool, in accordance with the invention. The functions described in these figures are similar to FIGS. 18A and 18B, and thus similar notation has been used for clarity with the differences discussed in more detail below.

As with the modify rod pattern tool, the user may direct each iteration of this modifying subroutine, with the help of the graphical user GUI 230, or the modifying subroutine may be performed within the bounds of an optimization algorithm that automatically iterates simulation, calculation of objective function and evaluation of the results or values of the objective function calculations for a number of core loading pattern design iterations.

The user determines whether any limits are violated (Step S71), and if none, determines if any identifiers indicate that characteristics of maximum power are obtained from the selected core loading pattern for the test core design. If there is an indication that maximum power has been obtained from the test core design with the selected core loading pattern (the output of Step S72 is YES), an acceptable core loading pattern design has been determined, and the user may access a report of results and data related to the accepted design (Step S73) and/or use the selected core loading pattern in the modify unique fresh fuel bundle type design tool and/or as an input back to the modify rod pattern tool (Step S78).

If limits are violated (the output of Step S71 is YES) or limits are not violated but there is an indication that maximum power has not been obtained from the core loading pattern design (the output Step S72 is NO) the user determines whether any characteristics indicate that modification of fresh fuel bundle numbers is required (Step S74). Characteristics that indicate a need to modify the fresh fuel bundle number may include an energy shortfall, a margin shortfall with acceptable energy, and/or a loss of reactivity due to outage date changes. Additionally, if several iterations of core loading pattern design changes have been attempted and there has been no real improvement to the objective function, this is a further indication that an alternative core loading pattern design might need to be explored.

Accordingly, if the output of Step S74 is YES, the user may create a modified or derivative core loading pattern design by re-estimating the number of fresh fuel bundles needed, rounding bundle numbers down as required for core symmetry and loading the core according to the revised or derivative test core loading pattern (Step S75). Step S75 generally corresponds to steps 604 through 607 in FIG. 6.

If there are no characteristics indicating a need to modify the fresh fuel bundle number (the output of Step S74 is NO) the user may modify the test core design (Step S76) to create a derivative core design. In making a modification to the test core loading pattern based on the procedural recommendations described above, the user may alter the core loading pattern via the GUI 230.

For example, and using a suitable input device (mouse, keyboard, touch screen, voice command, etc) and GUI 230, a designer may identify the core symmetry option for any exposed (or fresh) fuel bundle(s) in the core design that the user desires to move, may select these "target" exposed fuel bundle(s), and may select the "destination" exposed (or fresh) fuel bundles in the core design for replacement by the target exposed (or fresh) fuel bundle(s). The target and destination bundles may be "shuffled" according to the required symmetry (mirror, rotational, etc.). This process may be repeated for any exposed (or fresh) fuel bundle shuffle that is required to re-load modified or derivative test core design in the desired manner.

Figure 24:
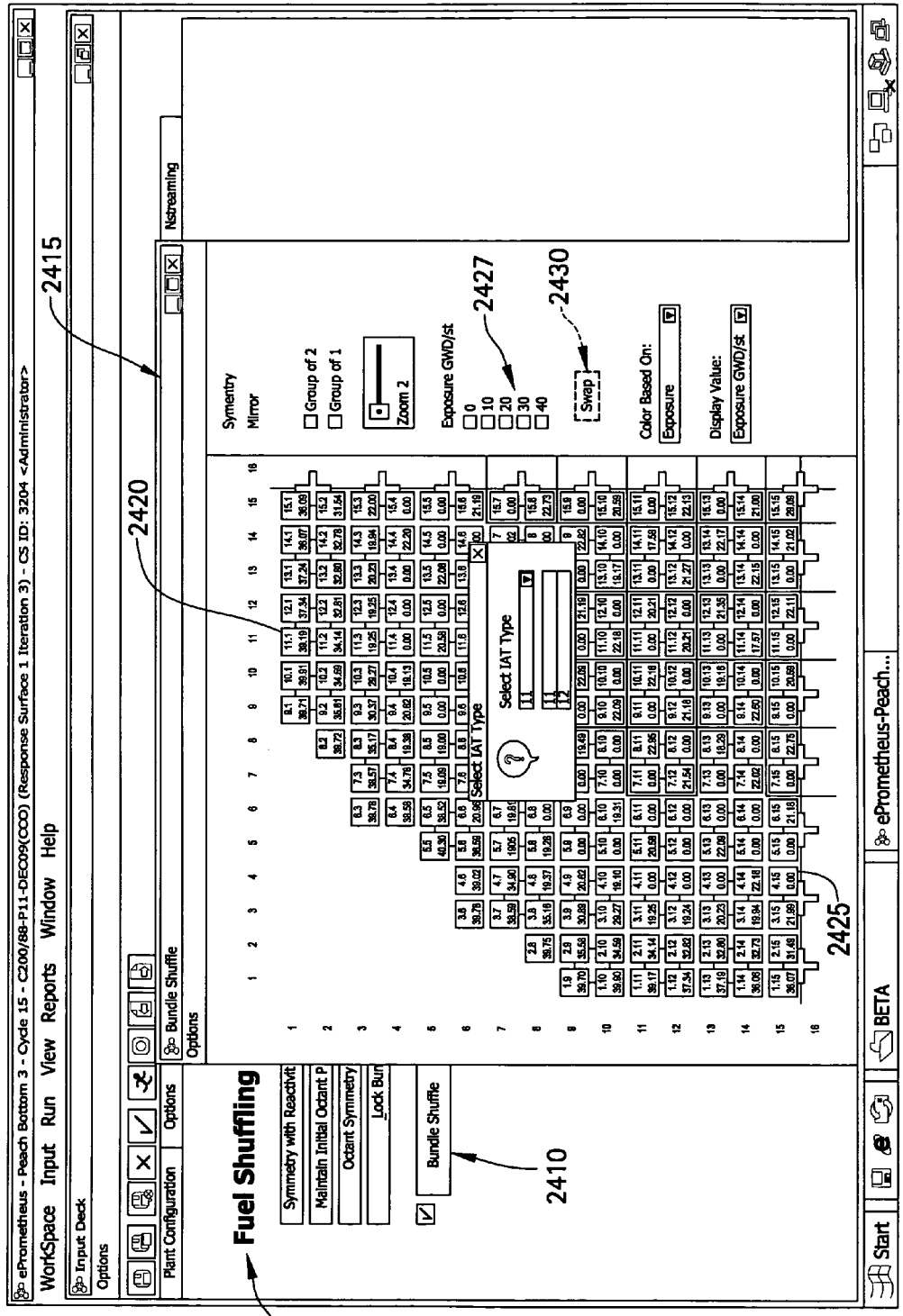
FIG. 24 is a screen shot illustrating the modifying Step S76 of FIG. 23A in further detail in accordance with an exemplary embodiment of the invention.

FIG. 24 is a screen shot illustrating the modifying Step S76 of FIG. 23A in further detail in accordance with an exemplary embodiment of the invention. FIG. 24 illustrates the functionality available to the user so as make swift design modifications to the core loading pattern of the test core design. A user may select a fuel shuffling page 2405 and may select a "bundle shuffle" taskbar 2410 in order to display a screen 2415 of a portion of a core design. In FIG. 13, an exposed fuel bundle designated at 2420 is being changed from one fuel bundle type (IAT type 11) to another (IAT type 12). In an example, an exposed fuel bundle may be swapped with a fresh fuel bundle by selecting a fresh fuel bundle in the core design, the exposed fuel bundle, and selecting the "SWAP" button 2430. The portion of the core shown in screen 2425 may be color coded to show the various exposures (GWD/st) of each of the exposed and fresh fuel bundles. A corresponding color coded key may be displayed as indicated at 2427 for example. Selection of items in FIG. 24 may be possible via a suitable input device, such as a mouse, keyboard, touch screen, voice-activated command, etc.

These core loading pattern design modifications may be saved in relational database 250, such as in 3D Simulator input parameters database 259, for example. Referring again to FIG. 23A, regardless of whether the test core loading pattern was modified as described in Steps S75 or S76, Steps S30-S50 may be repeated to determine if the derivative core design which meets all limits (Step S77). This may become an iterative process.

FIG. 23B illustrates an iterative process in accordance with an exemplary embodiment of the invention. For each derivative core loading pattern design from Step S70 that has been simulated, the user determines whether any data that is related to the comparison between simulated results and limits (e.g., the calculated objective function values) still indicates that there are limit violations (Step S160). If not, (output of Step S160 is NO) the user has developed an acceptable derivative core loading pattern design that may be used in a particular reactor, and may access graphical results related to the acceptable core loading pattern design (Step S73) and/or use the selected derivative core loading pattern in the modify unique fresh fuel bundle type design tool and/or as an input back to the modify rod pattern tool (Step S78).

If an iteration still indicates that limits are violated (the output of Step S160 is YES) then the modifying subroutine in Step S70 may be iteratively repeated until all limits are satisfied/maximum power obtained, or until all limits are satisfied/maximum power obtained within a margin thereto that is acceptable, as determined by the user (Step S170). The iterative process may be beneficial in that it enables the user to fine tune a core loading pattern design, and to perhaps extract even more energy out of an acceptable core loading pattern design than was previously possible of doing with the conventional, manual iterative process. Further, incorporation of the relational database server 250 and a number of calculation servers 400 expedite calculations. The iterative process as described in FIG. 23B may be done in an extremely short period of time, as compared to a number of weeks using the prior art manual iterative process of changing one parameter at a time, and then running a reactor core simulation.

As described with the modify rod pattern tool in FIGS. 18A and 18B, the functions of FIGS. 23A and 23B may also be iterated over N different core loading pattern designs, in an effort to consistently improve toward a desired core loading pattern design that satisfies all user limits and constraints, for use in a nuclear reactor core.

Referring again to FIG. 20, for optimizing the iterative core loading pattern process, the user would check box 2042 for the optimize fuel loading parameter. Optimize fuel loading selection means making an optimal determination of the once and twice burnt fuel.

As shown in FIG. 21, the user may select desired optimization constraints (box 2152) associated with a given optimization constraint 2150, and may set the importance 2156 for each optimization constraint 2150 as described above (minute, low, nominal, high and extreme), correlating to empirically predetermined penalty weights such that the greater the importance, the greater the predetermined penalty weight.

Once the above selections have been completed, a calculation server 400 retrieves the selections above from relational database server 250 and configures the objective function according to the generic definition discussed above and the selections made during the selection process. The resulting configured objective function equals the sum of credit components associated with the selected optimization parameters plus the sum of penalty components associated with the selected optimization constraints.

As previously described, the user may select possible methodologies of static, death penalty, dynamic, and adaptive for the penalty weights; is supplied with the possible methodologies of static, dynamic and adaptive for the credit weights; and the methodology of relative adaptive for both the penalty and credit weights, as disclosed in the '718 application above. Accordingly, the optimization process of FIG. 22 may then proceed to determine an acceptable derivative core loading pattern design.

Unique Fresh Fuel Bundle Type Design Tool (N-Streaming)

Based on one or both of an accepted core loading pattern from the modify core loading design tool and an accepted rod pattern from the modify rod pattern design tool, the unique fresh fuel bundle type design tool may be iterated to determine the different types and/or locations of fresh fuel bundles (available from the fresh fuel bundle inventory) that may be used for the desired power uprate core design. Alternatively, the user may implement this tool using the original test core design determined in block 600, in order to determine the placement and makeup of fresh fuel bundle types in the design, and output this design to one or both of the modify core loading pattern and/or modify rod pattern tools.

The unique fresh fuel bundle type design tool, hereafter "N-Streaming tool" for convenience is described in detail in co-pending and commonly-assigned U.S. application Ser. No. 10/325,831 to David J. Kropaczek et al., filed Dec. 23, 2002 and entitled "Method and Arrangement for Determining Nuclear Reactor Core Designs". This tool is adapted to determine N unique fresh fuel bundle types for the power uprate core design. Although the sequence of operations to generating the test core design for N-streaming is a slight modification from that described in FIGS. 5-11, the test core design is simulated as per FIG. 13 and objective function values calculated as per FIG. 14.

As to the simulation, the difference in FIG. 13 is that in step S31 the test core design incorporates a certain unique subset of fresh fuel bundle types that is converted into a 3D instruction set. Moreover, a desired control blade sequence (rod pattern) determined from iteration of the modify rod pattern tool (and base core loading pattern (the placement and make-up of once and twice burnt fuel bundles, and fresh fuel bundles other than the unique subset being evaluated) may be set for the test reactor core design (and incorporated as well into the 3D instruction set) for the test core design to be simulated.

Figure 25:
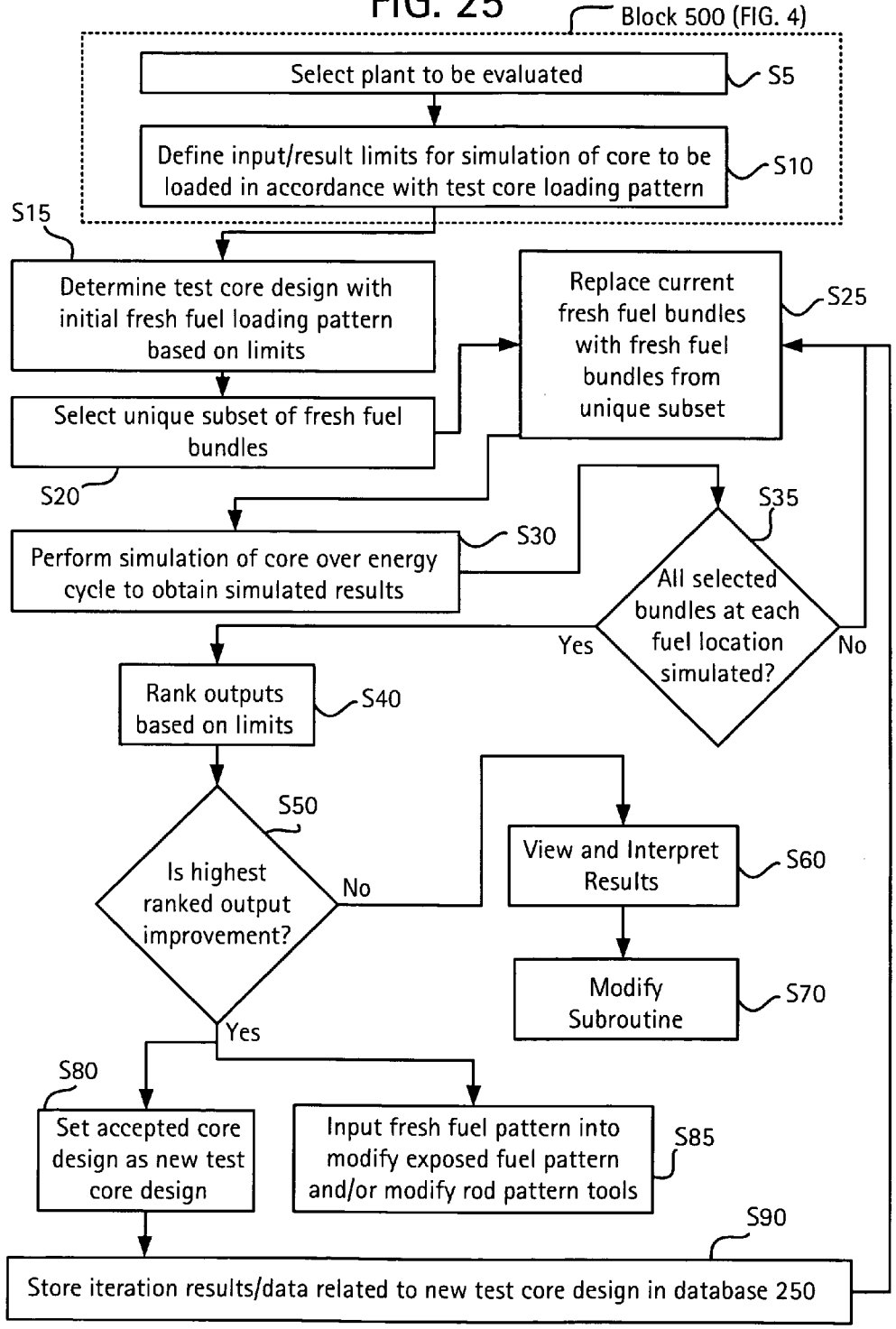
FIG. 25 is a flow chart illustrating the functionality of the N-Streaming tool in accordance with an exemplary embodiment of the invention.

FIG. 25 is a flow chart illustrating the functionality of the N-Streaming tool in accordance with an exemplary embodiment of the invention. As described in FIG. 11, a reactor plant is selected for evaluation in Step S5 and limits which are used in a simulation for a test rod pattern design of the selected plant are defined (Step S10). These steps have previously been performed by the functions in input block 500, but are reiterated herein for clarity. As previously shown in FIG. 5, the client-inputted plant specific constraints, which may be configured as limits on input variables to the simulation and limits on the simulation results are set for the simulation.

A test core design with an initial fresh fuel loading pattern is then generated (Step S15) for the selected reactor. For example, historical core loading pattern design database 254 may be accessed to find a historical reactor core design most consistent with the defined limits. A historical core design may be consistent if it is of a similar core size and power output rating, has similar cycle energy, and has similar operational performance characteristics to the core design being developed for the selected reactor plant.

Using the similar historical design as a basis, and similar to as described in FIG. 6, the total energy content of the historical core may be calculated and a difference from the required energy content (e.g., the desired energy output from the determined core design, as based on customer requirements for example) defined. The difference in energy between historical core the energy content desired should be supplied by the loading of fresh fuel assemblies.

Thus, to generate the reference core design, the user should select (Step S20) fresh fuel bundle type(s) for the reference core design that can best meet the energy requirement(s) (which may be included in the limits) for the reactor core design to be developed. The bundles designs may be selected from the fresh fuel bundle design database 252, which provides a wide variety of fresh fuel bundle designs (or N streams) that have been previously created and modeled.

Figure 26:
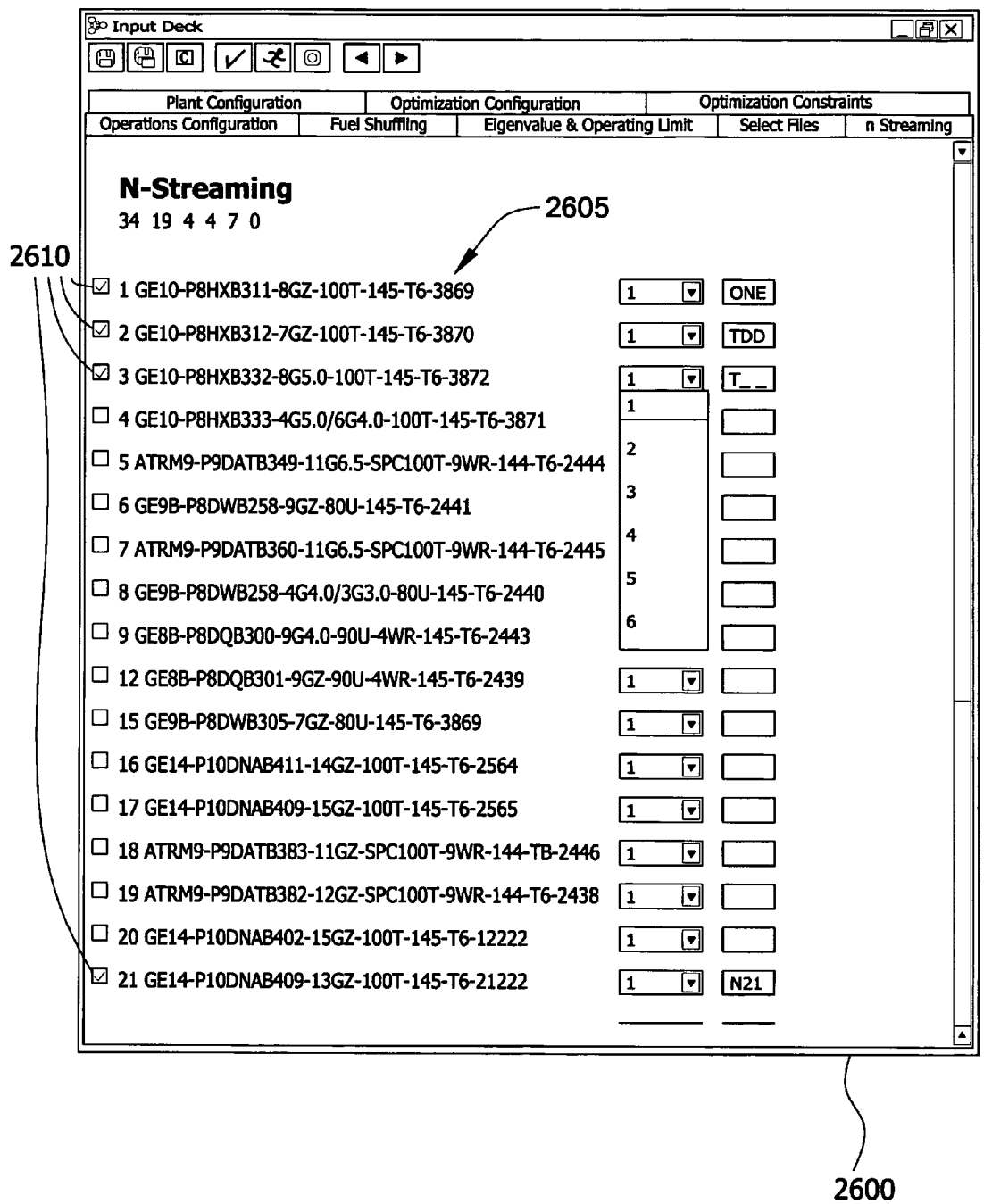
FIG. 26 illustrates a screen shot of a bundle selection web page.

FIG. 26 illustrates a screen shot of a bundle selection web page 2600. Entitled "N-Streaming", a user may bring up page 2600 via GUI 230 using a suitable input device, such as a modem, keyboard, pointer and the like. A plurality of selectable fresh fuel bundle types 2605 may be displayed; these bundle types 2605 have been previously modeled, so information relating to the performance of these bundle types 2605 is readily available to the user. The user may then select desired bundle types to be used in the loading pattern of the reference core design by checking boxes 2610.

With the fresh bundle types selected, core loading symmetries are accounted for as described in step 606 of FIG. 6. Then, one or more current fresh fuel bundles in the test core design may be replaced (Step S25) with one or more of the selectable fresh fuel bundles 2605 during an iterative improvement process. The selection may be performed via GUI 230, which provides the user with a summary of each bundle's performance characteristics. Once the "N-streaming" (selected fresh fuel bundles) have been defined, a looping process described in terms of Steps S25 and S30 is initiated, whereby a systematic process of replacement and analysis for fresh fuel bundles is performed.

In an example, at an outermost level ("outer loop") each fresh fuel location in the current reference core design is examined in sequence. By "examined", reactor core operation is simulated (Step S30) similar to as described in FIG. 13 for the test core design with each particular unique fresh fuel loading pattern, and performance characteristics of the N-streams (unique fuel bundles) are reviewed to determine whether the test (or derivative) core design can best meet the power uprate energy requirement(s) for the reactor core design to be developed. At the innermost level, each "replacement" fresh fuel bundle 2605 selected from page 2600 is examined in each fuel location (S35). During this process, a current fresh fuel bundle in the reference core design is replaced with each new "N-streaming" fresh fuel bundle 2605.

As discussed above, reactor operation is simulated (Step S30) on the test core design containing one or more of the select fresh fuel bundles, in order to produce a plurality of simulated results, or outputs. The iterative steps of replacement and simulation are repeated (output of Step S35 is NO) until all selected fresh fuel bundles have been inserted at each fuel location and each derivative core design has been simulated (e.g., output of Step S35 is YES). Substitution of all selected fresh fuel bundles 2605 into each of the fresh fuel locations is therefore complete upon exiting the inner and outer loops.

The iterative improvement process described above may be beneficial in that it enables the user to fine tune the fresh fuel loading pattern for the core design, and to perhaps extract even more energy out of an acceptable core design than was previously possible of doing with the conventional, manual iterative process. Further, incorporation of the relational database server 250 and a number of calculation servers 400 expedite calculations, reducing processing time to hours instead of weeks.

The outputs from simulation are ranked based on the limits (Step S40), as described in FIG. 14. A user may display data related to each of the outputs, if desired. This enables a user to make a comparison against the reference core design to determine whether there was any improvement, where improvement may be defined in terms of not exceeding the defined limits, or meeting certain energy requirements, for example.

If the top ranked output is an improvement (output of Step S50 is YES) the core design corresponding to that highest ranked output is set (Step S80) as the new core design (and may be input for iteration of the core loading tool or rod pattern tool to refine the design) with the results stored (Step S90) in relational database server 250, such as in simulator results database 255. This completes a single iteration of the iterative improvement process.

Steps S25, S30, S40 and S50 (inclusive of steps S30 through S90) are repeated (e.g., N iterations), with each "improvement" becoming the new reference core design for a subsequent iteration. The defined limits are applicable to the reference core design in each of the N iterations. If, for a given iteration, there is no improvement in the top ranked output, the iterative process is complete, and data relating to the reference core design at that point, since it is the top ranked design may be displayed and interpreted (Step S60) by the user. The data may also provide the user with an indication of which location in a simulated core were the largest violators or largest contributors to a limit violation. At Step S60, the user may be inclined to initiate a modify subroutine (Step S70) similar to that described in FIGS. 18A-B and 23A-B. In an example, this could be an optional step, since the rod pattern and core loading pattern for the uprate power core design may already have been determined and set with the exception of fine tuning the location and/or makeup of the fresh fuel bundles to achieve an acceptable power uprate core design.

As discussed above with the modify rod pattern and modify core loading tools, procedural recommendations may be accessible by the user. Even if the test core design with the desired N streams of fresh fuel bundles meets all of the limits (client-inputted plant specific constraints, design limits, thermal limits, etc.) the user may verify that any excessive margin to a particular limit is converted into additional energy. Accordingly, the following logic statements may illustrate the above procedural recommendations for modifying the fresh fuel loading pattern for the test or derivative core design:

Energy Beneficial Moves
    If Critical Power Ratio (CPR) margin is too low towards core perimeter, bring more reactive fuel toward core center
    If NEXRAT (Nodal Exposure Ratio, a thermal margin constraint) problem at end-of-cycle (EOC), move more reactive (e.g., less exposed) fuel to problem location;
    If ShutDown Margin (SDM) problem at perimeter of core at beginning of cycle (BOC), place less reactive fuel towards perimeter Energy Detrimental Moves
    If CPR margin too low at EOC, move less reactive fuel into problem location
    If kW/ft margin too low at EOC, move less reactive fuel into problem location Converting Excessive Margin into Additional Energy
    If extra CPR margin in center of core at EOC, move more reactive fuel from perimeter locations to core center The data resulting from the objective function calculations may be displayed as a list of constraints with denoted violators, as shown in FIG. 15 and Table 1. The user may again be presented with graphical displays as shown in FIGS. 16 to 17B to see the effect of the core design with unique fresh fuel loading pattern on certain constraints or parameters, to give the user an indication of those fresh fuel locations in the test core design that may need modification.

Figure 27A:
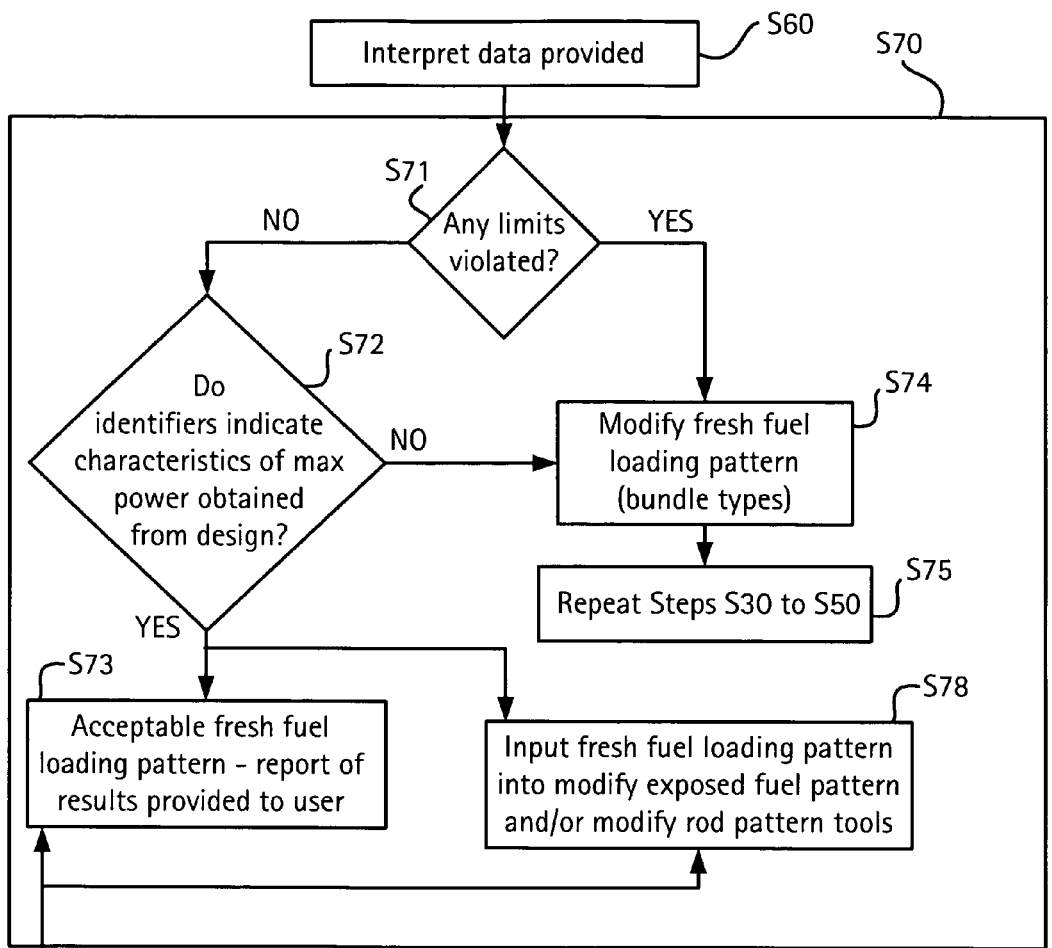
FIGS. 27A and 27B are flow diagrams describing the modification of the N-streams (unique fresh fuel types) in accordance with the invention.
Figure 27B:
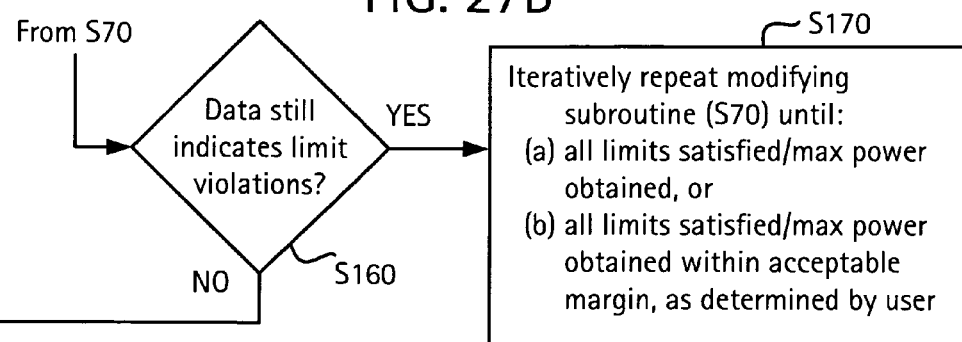

FIGS. 27A and 27B are flow diagrams describing the modification of the N-streams (unique fresh fuel types) in accordance with the invention. The functions described in these figures are similar to FIGS. 18A and 18B or FIGS. 23A and 23B, and thus similar notation has been used for clarity with the differences discussed in more detail below.

As previously discussed, the user may direct each iteration of this modifying subroutine, with the help of the graphical user GUI 230, or the modifying subroutine may be performed within the bounds of an optimization algorithm that automatically iterates simulation, calculation of objective function and evaluation of the results or values of the objective function calculations for a number of core loading pattern design iterations.

Referring to FIG. 27A, by interpreting the data at Step S60, the user may be inclined to initiate a modify subroutine (Step S70). In such a case practicality, the original test core design will not be an acceptable design, and the modify subroutine may be required if the iterative improvement process fails to provide a core design that is acceptable to the user, such as may be the case where certain limits which shall not be violated are still violated with each iteration.

As with the modify rod pattern and modify core loading tool, the user may direct each iteration of this modifying subroutine, with the help of the graphical user GUI 230, or the modifying subroutine may be performed within the bounds of an optimization algorithm that automatically iterates simulation, calculation of objective function and evaluation of the results or values of the objective function calculations for a number of core loading pattern design iterations.

The user determines, based on the displayed data, whether any limits are violated (Step S71). If no limits are violated, the user determines if any identifiers indicate that characteristics of maximum energy are obtained from the core design (i.e., indication of good thermal margin utilization (such as margins on MFLCPR and LHGR) by moving fuel so as to maximize plutonium generation for cycle extension, or where the minimum EOC eigenvalue is obtained for the core design to be used for the fuel cycle (eigenvalue search) or the desired cycle length is determined at a fixed EOC eigenvalue.

If there is an indication that maximum energy has been obtained from a core design (the output of Step S72 is YES), the acceptable core design with desired fresh fuel loading pattern has been determined, and the user may access a report of the results related to the core design (Step S73) and/or use the selected fresh fuel loading pattern in the modify rod pattern design tool and/or as an input back to the modify core loading pattern tool (Step S78).

If limits are violated (the output of Step S71 is YES) or limits are not violated but there is an indication that maximum energy has not been obtained from the core design (the output Step S72 is NO) then the user determines a fresh fuel loading pattern modification to be made to the current reference core design (Step S74). In making a modification to the fresh fuel loading pattern, and based on the recommendations from above, the user may alter the fresh bundle loading via the GUI as described in FIG. 24, such by identifying the bundle symmetry option of any potential fresh bundle(s) in the test core design to be moved, and selecting the "target" fresh fuel bundle(s), the destination(s) where the target bundle(s) is/are to be moved. The identified target bundles are then shuffled according to the required symmetry (mirror, rotational, etc.). This process may be repeated for any fresh bundle shuffle that is required to re-load the core reference pattern in the desired manner. Further, the test core design modifications may be saved in simulator input parameters database 259, for example.

The user may repeat steps S30 to S50 (Step S75) incorporating the design modifications. The resultant highest ranked output establishes a new reference core design from which the iterative improvement process of FIG. 25 may be repeated. In other words, Steps S30-S50 may be repeated to determine if the derivative core design meets all limits (Step S75). This may become an iterative process, as described above.

Referring to FIG. 27B, the modify subroutine in Step S70 is iteratively repeated until all limits are satisfied, or until all limits are satisfied within a margin that is acceptable, as determined by the user (Step S170). The functions of FIGS. 27A and 27B may be iterated over N different fresh fuel loading pattern designs, in an effort to consistently improve toward a desired fresh fuel pattern design that satisfies all user limits and constraints, for use in a nuclear reactor core. Assuming the core loading pattern for exposed fuel and rod patterns have been set to satisfy the limits for power uprate operations, this fine tuning determines the desired fresh fuel loading pattern, that could with exposed fuel and rod pattern designs, generates the power uprate core design reported to the customer at block 1100 in FIG. 4.

Referring again to FIG. 20, for optimizing the iterative N-streaming process, the user would check box 2042 for the optimize fuel loading and optimize bundle selection parameters, and select desired optimization constraints 2150 and set the importance for each optimization constraint 2150 as described in FIG. 21. Once the above selections have been completed, a calculation server 400 retrieves the selections above from relational database server 250 and configures the objective function according to the generic definition discussed above and the selections made during the selection process, and the optimization process in accordance with FIG. 22 may then proceed to determine an acceptable derivative core design with the desired fresh fuel loading pattern.

Accordingly, the N-streaming tool permits any number or combinations of fresh fuel bundle loading pattern designs (e.g., "N streams") to be utilized in order to determine an accepted core design that satisfies the plurality of limits or constraints that have been input by a user for uprated power operations. The thus determined power uprate core design may include N new fresh fuel bundle solutions therein, for example.

In contrast to current reactor core designs, which typically utilize at most one or two fresh fuel bundle types (i.e., a one or two stream solution), any number or combinations of fresh fuel bundle loading pattern designs for location and type of fresh fuel bundle (e.g., "N streams") may be utilized in order to determine the desired fresh fuel bundles for placement in the core design. In an example, the N-streaming methodology may be used to determine a core design satisfying the limits and/or constraints for uprated power operations with N unique fresh fuel bundle types (N streams), where N equals or exceeds at least 2 unique fresh fuel bundle types (N≥2).

Accordingly, as described here above, each of the rod pattern, core loading pattern and unique fresh fuel bundle type design tools may be iterated sequentially and/or together by the user and can provide feedback to one or both of the other tools, until all rod (control blade), exposed fuel and/or fresh fuel type changes have been exhausted in the test core design and/or a given "candidate" modified test core design satisfies each of the limits or constraints set for uprated power operations.

For each automated tool, operation or iteration of the selected automated tool to evaluate the test core design against the input limits or constraints includes performing a simulation based on the constraints (inclusive of limits or targets for power uprate operations), in order to produce a plurality of simulation results for comparison against the constraints. Data indicating the constraints that were violated by the test core design during the simulation may be accompanied by procedural recommendations to modify one or more of the rod pattern core loading pattern and or unique fresh fuel bundle type makeup in the core design. One, some or all of the automated tools are implemented and iteratively repeated until a test core design is determined which meets all constraints for uprated power operations. This design thus represents an acceptable power uprate core design.

As discussed above, the comparison includes configuring an objective function to generate a corresponding objective function value for each output using the objective function. The objective function values are evaluated based on the constraints to determine which of the outputs violate a limit. Based on procedural recommendation and/or by the user's own choosing, the user may then modify the test core design via GUI 230 to create a derivative reactor core design. Modifications may be made to control blade placement (modify rod pattern design tool), exposed fuel placement (modify core loading pattern design tool), fresh fuel bundle type make-up and placement (N-streaming design tool), and repeating simulation to evaluate if there is any performance improvement in a given derivative test core design.

Referring back to FIG. 4, if after all tools have been iterated and all rod (control blade), exposed fuel and fresh fuel bundle changes have been exhausted, one or more limits from block 500 are still not satisfied, the user may be required to make global changes to exposed fuel to reload in block 600 and to reload the test core in accordance with the new exposed fuel loading pattern, as described in FIGS. 8 and 9. As previously discussed, if limit violations still exist after all modifications in block 700 have been exhausted, the user may return to block 600 and evaluate whether all exposed fuel bundles from the fuel pool inventory have been used. The user may change the exposed fuel bundles that are to be reloaded in the core design as described in FIGS. 8 and 9, accessing a different combination of exposed fuel bundles from the fuel pool with the filter window of FIG. 9, for example.

If one or more limits from block 500 are still not satisfied, the user may be directed back to the processes in core loading block 600 and modify the original fuel loading template, inclusive of changing the exposed and fresh fuel placements of bundles, in order to change the locations in the template for insertion of different exposed and/or fresh fuel bundles selected from existing inventory. Once these changes have been made, a modified or derivative core design may be re-evaluated using one, some or all of the automated tools in block 700 until all limits have been satisfied and/or are within an acceptable margin to the limits as determined by the user.

If the example methodology implemented by the user has produced an accepted power uprate core design that satisfies the limits and/or is within acceptable margins thereto, and the user has received the data and design parameters (e.g., via suitable reports and graphical representations) corresponding to the acceptable power uprate core design at block 1100, the plant operators and/or staff may modify the actual reactor core being evaluated in accordance with the accepted design at a next planned outage to achieve the desired increased thermal output which satisfies NRC licensing requirements.

However, the user or designer may desire to fine tune the design using the latest actual core operating conditions, and test each and every cycle of the core in implementation block 1200. The functions in implementation block may be understood as performing an exposure accounting process (referred to as a core tracking routine) to get actual conditions and limits, performing a revised margin analysis using the accepted power uprate core design to determine revised margins to limits for power uprate. The revised margins and actual operating conditions and limits can be incorporated into an "online operations optimization routine". This latter function incorporates the modify rod pattern tool and associated simulation, evaluation using the objective function and iteration of modifying the rod pattern using the optimization routine of FIG. 22. As these functions have already been described, attention is directed to an overview of the core tracking and revised margin determination functions in implementation block 1200.

Core Tracking

Figure 28:
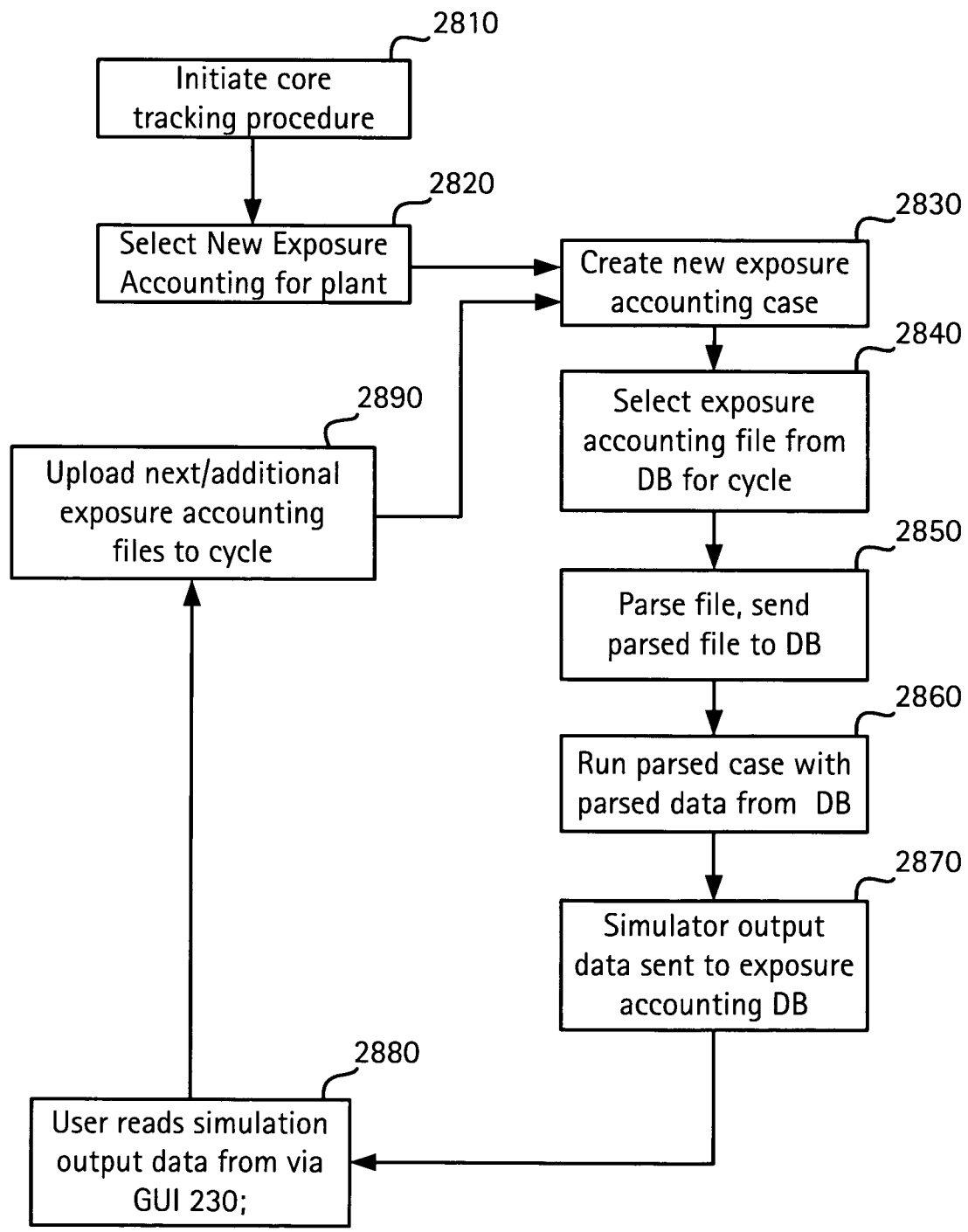
FIG. 28 is a flow diagram for illustrating the core tracking function in more detail.

FIG. 28 is a flow diagram for illustrating the core tracking function in more detail. Typically, a process computer at the reactor plant being evaluated has a process computer that records data (operating and limit data) from the core at a particular time, such as daily. This recorded data is written to an exposure accounting file (a text file) in a particular format depending on the core monitoring program used. Known core monitoring programs use two primary formats, a 3DM format and a PowerPlex format.

In accordance with this core tracking function, these exposure accounting files may be sent from the plant's process computer through a firewall to a drop box or computer (such as host processor 210) within system 1000, to be stored in memory (i.e., at a desired location in the relation database server 250, for example. Exposure accounting files for each cycle of the plant (historical up to current) may be stored for access in server 250, such as in a global exposure accounting database within server 250.

Referring now to FIG. 28, the user, using a suitable input device (mouse, keyboard, touch screen, voice command, etc) and GUI 230, may initiate a core tracking operation by the user (2810) and selects a new exposure accounting for the plant of interest (2820) by selecting a given icon on a webpage for example. The user is queried to create a new exposure accounting case (2830). In 2830, a new dialogue may appear on the display and the user is prompted to enter inputs such as cycle number, cycle start date, and to initiate a wrapup operation in which a wrapup file including all cycles from the plant is copied from the exposure accounting databases in server 250 to a temporary directory for access by the user. A new cycle ID strategy ID may be created for the new case, with the information from the inputs written to the database. The new exposure accounting case is ready to accept exposure data.

The user then selects the exposure accounting files for the case in the cycle of interest (2840). Each file may be processed in turn. In 2840, the user may be prompted to add exposure accounting files and browse the temporary directory to select and upload the desired files.

Each file is then parsed (2850), with the parsed or extracted data sent to the exposure accounting database. All files are to be parsed without error, thus there is an error checking routine which informs the user as to which files suffered an error in the parsing operation, and the reasons for the error. For example, in the parsing operation, parsed data from each exposure is held in memory to allow for sorting and error checking. The following example accounting data is read, including but not limited to: core name, date and time, power, flow, sub-cooling, core dome pressure, measured data for the local power range monitors (LPRMs), such as MFLCPR, MFLPD and MAPRAT(MAPLHGR), positions of control blades (rods), axial relative power (core average radial power distribution) and feedwater flow.

The parsed exposure data is sorted by exposure and checked for the following: (i) all exposures from correct plant, (ii) all exposures from correct cycle, (iii) date and exposure always increase, (iv) exposure not later than EOC date, (v) exposure filename does not already exist, (vi) additional error checks (checksum). When no errors are found, the parsed data is written to the database, but are copied on server 250 so they can be viewed via GUI 230.

A simulation is then run using the accepted power uprate core design ((2860), in this example, it may be a PANAC simulator) using the parsed data of a single exposure accounting file, and stored (2870) in the exposure accounting database in server 250. The data output from the simulation is read by the user via GUI (2880), and then the next file is uploaded (2890), with the routines in 2830 to 2880. Accordingly, the core tracking function allows accounting data from all exposures in a given cycle of interest to be stored in the server 250.

Revising Margins to Limits for the Uprated Core Design

Conventionally, differences between given on-line margin (actual plant) and given off-line margin (virtual or modeled core being simulated for the actual plant of interest) determinations to operating limits exist. As used hereafter, operating limits refer to thermal, reactivity and/or power-related operating limits. These differences force plant operators to require additional margin to the operating limits, so as to insure trouble free operation.

Additional margin typically is obtained by making changes to the operational parameters, and/or by selection and positioning of different rod patterns. However, the cost of such changes typically is a loss of power or fuel cycle efficiency. Moreover, a "larger than needed" margin requirement has an adverse economic impact on the plant. To protect against these differences, engineers have developed standard design margins or historical design margins that are to be used to account for or "cover" these differences.

However, these standard design margins are crude at best. Sometimes, the historical required design margin is inadequate, resulting in manipulation of control rods during operation in order to regain lost margin. If rod pattern changes do not alleviate or correct the problem, plants have been even known to have to de-rate (lower power production). Either solution is extremely costly to the fuel cycle efficiency and can cost millions of dollars in lost revenue. Additionally, the historical design margin is occasionally inappropriately conservative, thereby resulting in a reduction in possible fuel cycle efficiency.

For the example power uprate core design, revised margins are even more critical to proper plant operation. Accordingly, the core tracking data described in FIG. 28 may be used in conjunction with the accepted power uprate core design to simulate reactor operation and determine revised margins to these limits, inclusive of the limits for operating the core in excess of rated thermal output.

Figure 29:
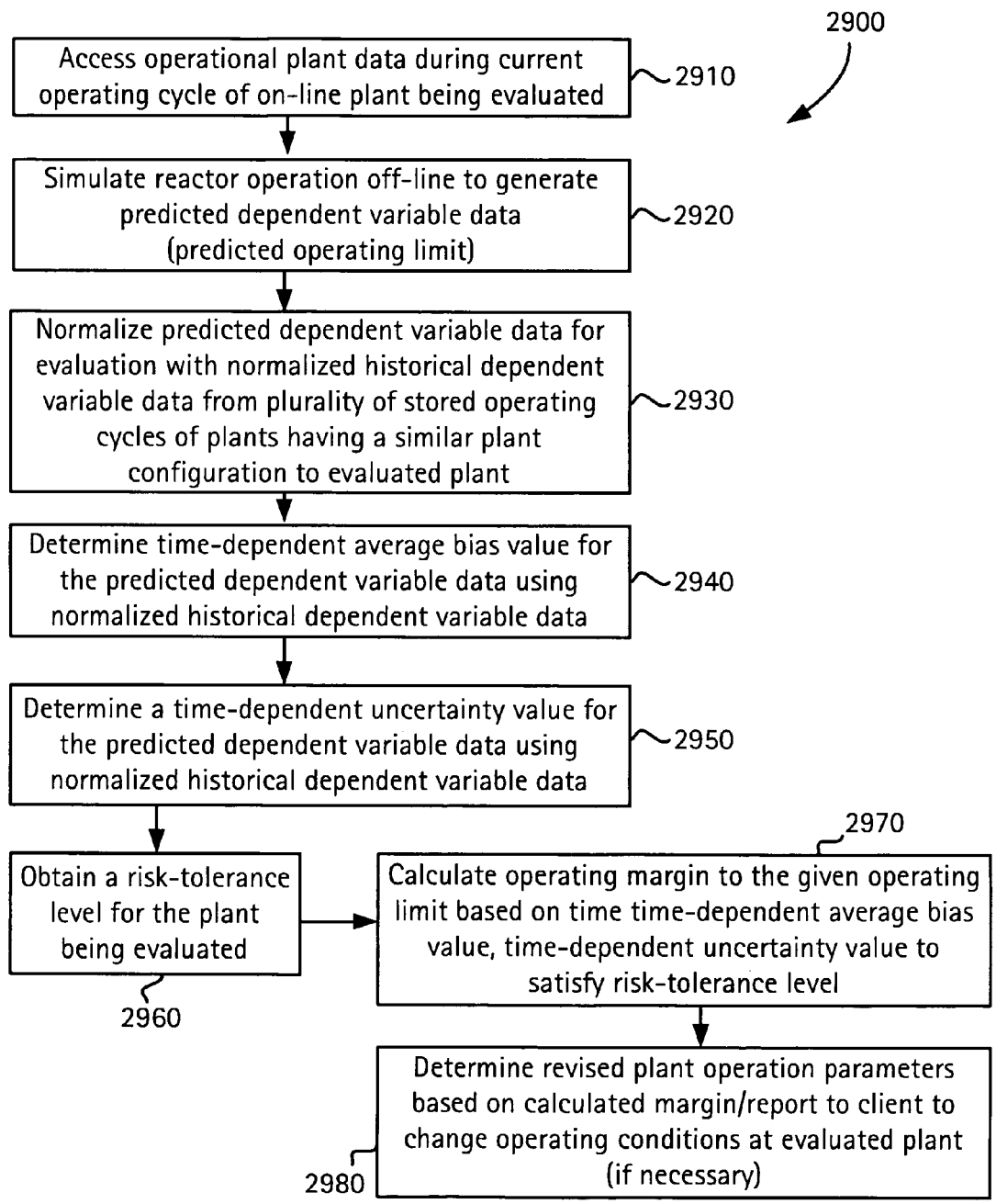
FIG. 29 is a process flow diagram to explain the method of determining a revised margin to a given operating limit.

FIG. 29 is a process flow diagram to explain the method of determining a revised margin to a given operating limit. The example methodology is described in co-pending and commonly assigned U.S. application Ser. No. 11/320,919 to William Earl Russell, II, et al., filed Dec. 30, 2005 and entitled "Method of Determining Margins to Operating Limits for Nuclear Reactor Core Operation". The relevant portions of the '919 application describing the margin determination are hereby incorporated in their entirety by reference herein.

In general, data in the exposure accounting files stored in server 250 may be used to model the on-line reactor plant being evaluated for the particular cycle, matching the operating parameters at the current exposure in cycle, so as to execute an off-line simulation (e.g., an executable 3D simulator program such as PANACEA, LOGOS, SIMULATE, POLCA) of the accepted power uprate core design.

The simulation provides results including predicted margins to given operating limits for the uprated core design in the cycle of interest, which hereafter may be referred to as "predicted dependent variable data". The predicted dependent variable data may be stored in server 250, and is also provided to a calculation processor 400, which is to be used for determining a revised operating margin to a given operating limit.

Once the margin value has been calculated, this data may be used by processor 400 to determine revised operating parameters for the on-line plant being evaluated, and may be communicated to plant operators at plant so as to change operating parameters (i.e., control rod sequence, core flow, power level, etc.) at the current exposure (time in operating or energy cycle) or at a future point in the current operating cycle of the plant. These margin calculations may be performed continuously at any desired frequency or periodicity, in an effort to maximize plant efficiency, for example.

Referring now to FIG. 29, in the example method 2900, operating conditions and monitored parameters are accessed (2910) during a current operating cycle from the operating plant being evaluated by the process computer and saved to database 250. This data is transferred to system 1000 as described in FIG. 28 and all exposure accounting files for the cycle of interest in the plant being evaluated are created and stored in the exposure accounting database within relational server 250.

For the exposure accounting files, example independent variables (i.e., rod pattern, operating conditions such as reactor power and core flow, plant configuration, mechanical conditions, core conditions, enrichment and gadolinium properties, cycle exposure, etc.) are thus saved to the exposure accounting database in order to correlate any potential trends between simulation biases and core configuration. Similarly, all monitored results or dependent variable data such as Maximum Fraction of Limiting CPR (MFLCPR), MFLPD, MAPLHGR, cold shutdown margin, reactivity-related parameters (such as Hot Eigenvalue, etc.), and predicted margins to these operating limits are also saved to database server 250.

The plant operating conditions retrieved from the process computer by the core tracking routine in FIG. 28 may thus be understood as independent variables, and monitored or measured operating limit data (thermal and power-related limits and margins thereto) retrieved by the process computer is actual dependent variable data. These independent and dependent variables from one or more exposure points in the current operating cycle may thus be saved or stored in database server 250.

With the above information saved to the database server 250, a reactor simulation input file can be created or prepared. The simulation input file uses identical independent variables as described above and may be stored in an electronic file format (i.e., ASCII) that is recognized by the identified core simulation software program (off-line simulator). Once the input file is prepared, the off-line simulator executes its program (2920) to simulate reactor operation of the plant off-line and to generate simulator outputs. The simulator outputs are a prediction of the dependent variables, referred to as predicted dependent variable data. The predicted dependent variable data may be understood as a nominal estimate of future results, and therefore may be used to calculate a nominal estimate of operating margins, but does not take into account any uncertainty for the predictions.

Ideally, the off-line simulated dependent variables (predicted margins to limits such as MFLCPR, MFLPD, MAPLHGR, etc.) and the measured or actual dependent variable data (actual margins to MFLCPR, MFLPD, MAPLHGR, etc.) from plant operation would be identical. However, due to several (or more) of the factors identified above, these typically are not. At this time, the predicted dependent variable data is normalized (2930) with respect to time (exposure) relative to anticipated EOC (End of Cycle). In other words, the data is normalized by calculation processor 400 on a BOC (Beginning of Cycle) to EOC time range of 0.0 (BOC) to 1.0 (EOC). In doing so, the normalized predicted dependent variable data can be evaluated with results (such as normalized historical dependent variable data) from many reactor simulations of other plant cycles, with the normalized data being stored in database server 250.

Relational database server 250 contains a substantial collection of reactor simulations (in subordinate databases 255, 257, and 259), and hence, includes a substantial amount of historical dependent variable data from reactor simulations of operating cycles in other reactor plants. For example, because the assignee has provided fuel and engineering services for approximately 30 BWR's over approximately 20 years, almost 400 complete exposure depletion cycles are available (given an approximate 1½ year average cycle length). A collection of data for 400 operating cycles is a significant collection of information for evaluating operation of nuclear reactors.

This information can be utilized by the example methodology of the present invention and for the resulting predictions there from. For example, as part of step 230, the processor 400 retrieves historical simulation data from plants having a similar plant configuration to plant. This historical dependent variable data is also normalized with respect to time on the 0.0 to 1.0 scale for evaluation, although any other normalized scale could be employed, as would be evident to one of skill in the art.

While all of this data has been normalized with respect to time (exposure) so that all data ranges from 0 to 1 (0.0=BOC, 1.0=EOC), some of the operating strategies for the various stored operating cycles are dissimilar. Consequently, it may be desirable to filter the larger collection of cycle data in database server 250 to collect a sub-set of data that is most similar in plant operation style to the specific plant being evaluated.

Filtering parameters may include, but are not limited to: cycle length, power density, average gadolinia concentration, flow strategies, loading strategies, etc. Thus, the filtered historical data incorporates data from similar plant operation styles. As a result of the above filtering process, predicted uncertainties may become smaller, and may be used to improve fuel cycle efficiency.

Similarly, it may also be desirable to provide correlation to the above continuous variables by way of least squares, neural networks, or any other trend capturing mathematics. In doing so, a larger set of data can be incorporated and global trends may be included, possibly resulting in a further reduction in predicted uncertainties, and may be used to improve fuel cycle efficiency.

Figure 30:
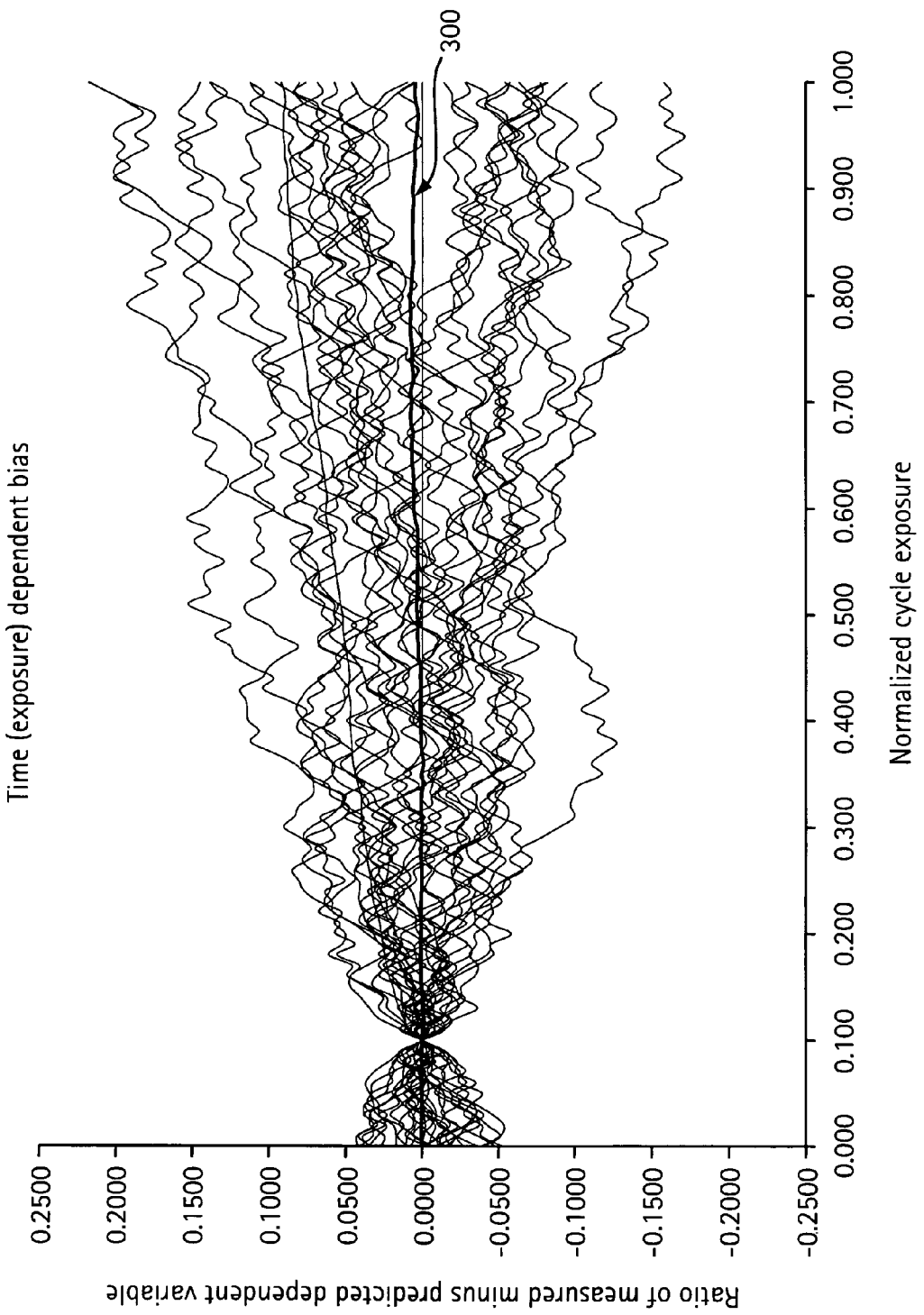
FIG. 30 is a graph of calibrated time-dependent bias for a given operating limit versus normalized time to explain the calculation of a time-dependent average bias value in accordance with the example method.
Figure 31:
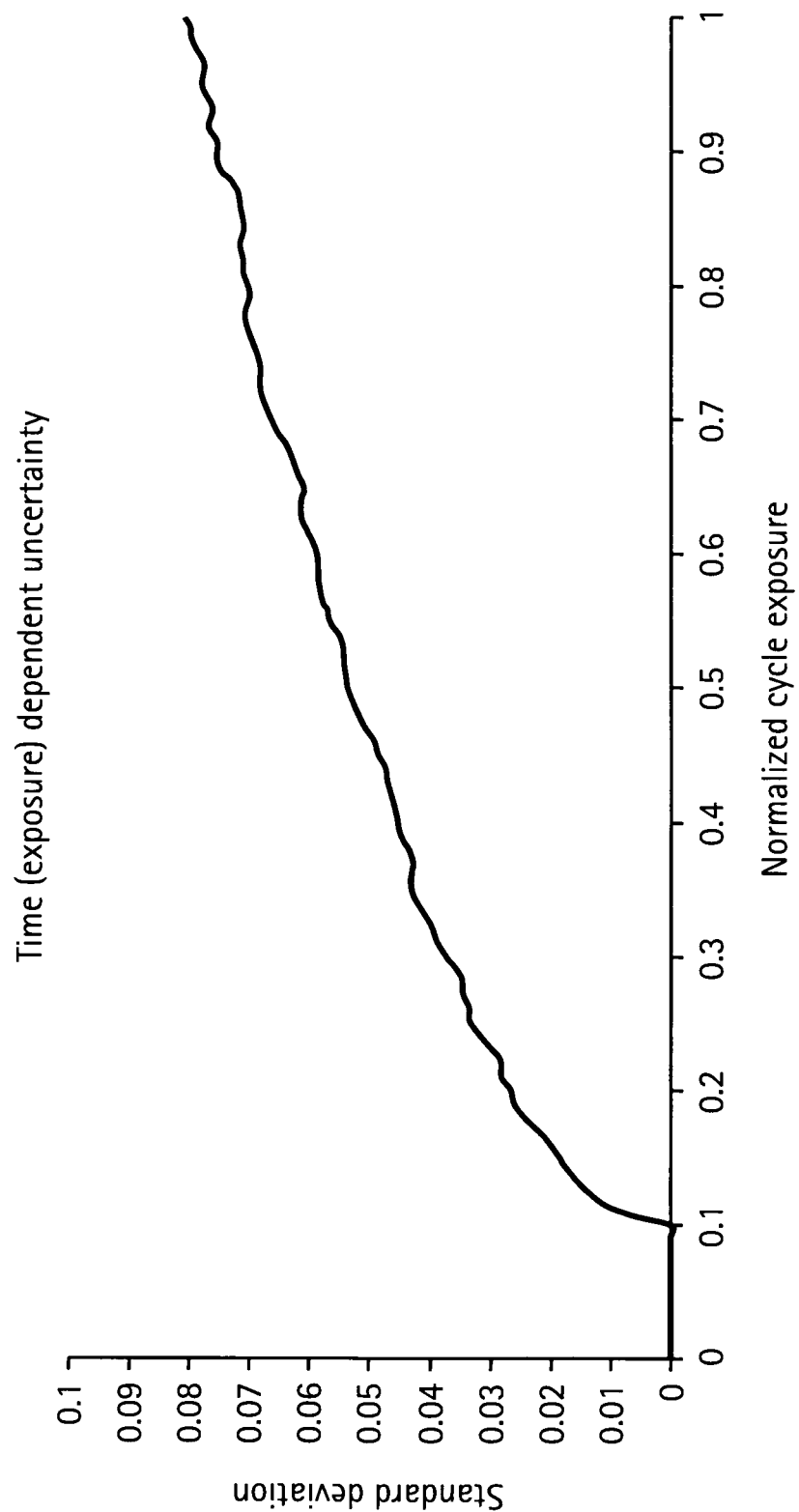
FIG. 31 is a graph of time-dependent uncertainty versus normalized time to explain the calculation of the time-dependent uncertainty value in accordance with the example revised margin determination method.

FIG. 30 is a graph of calibrated time-dependent bias for a given operating limit versus normalized time to explain the calculation of a time-dependent average bias value in accordance with the example method. FIG. 31 is a graph of time-dependent uncertainty versus normalized time to explain the calculation of the time-dependent uncertainty value in accordance with the example revised margin determination method.

In general, the normalized historical dependent variable data will be used by processor 400 in order to calculate a time-dependent average bias value that will provide a predicted expected bias at all future times in the cycle for the predicted dependent variable data (such as a given margin to a given operating limit) calculated as a result of the off-line simulation of plant.

In FIG. 30, there are shown time-dependent bias curves for 30 identified operating cycles of plants having a similar plant configuration to plant. This information is retrieved from database server 250 by processor 400. For each historical cycle being evaluated, a bias value for the historical dependent variable data is known and has been calculated in advance (and stored in database sever 250). The known bias value at a given exposure point, for a given stored historical operating cycle, represents a difference between the measured and the predicted operating limit at that exposure point for the given historical cycle.

Once the selected data has been collected for all 30 cycles between 0.0 to 1.0 (the data here being the known bias values along all exposure points for each of the historical dependent variable data of each historical operating cycle), the data is calibrated relative to the current time in operation of the operating cycle of plant being evaluated, e.g., the point in cycle time being evaluated.

For example, and referring to FIG. 30, if cycle operation of plant 2910 is approximately 10% complete (t=0.10), all data (all bias values) at all time intervals should be calibrated upwards or downwards until the value at t=0.10 is set to zero on the y-axis (ratio of measured minus predicted dependent variable). Calibrations to bias values after t=0.10 would be adjusted to correct for the calibration. FIG. 30 illustrates how the multiple curves (30 curves) are calibrated at t=0.10. Whereas the above example identifies calibration by way of addition-subtraction to set values to zero at t=0.10, calibration can also be performed using multiplication-division to set values to one at t=0.10. Calibration by way of addition-subtraction or multiplication-division may be selected by the mathematical processes which provide the smallest prediction of future uncertainty.

As can be seen from FIG. 30, all lines go through zero at t=0.10. This is because at any given current time (t=0.10 in this example) there is a known exact bias between the off-line simulation results (predicted margin) and operating plant-measured result (actual margin to the given operating limit). From the calibrated curves, two time-dependent curves are determined. First, the time (exposure) dependent bias value is determined (2940) by averaging all of the future data (t>0.10). In the above example, the data is somewhat random and the time dependent bias for all future times is approximately 0.0. In FIG. 30 this time dependent bias value is shown as curve 300, which is the average of the bias values of the 30 curves at each evaluated exposure point between t=0.1 (current time) and t=1.0 (future time).

Accordingly, to calculate the time dependent bias value (curve 300), the normalized historical dependent variable data is calibrated to force the known bias values to the current exposure point in the operating cycle of plant. The time-dependent average bias value is this determined by averaging all the bias values of the normalized historical dependent variable data at each of the exposure points, as calibrated from the current exposure point in plant being evaluated.

Next, and as shown in FIG. 31, a time (exposure) dependent uncertainty is determined (2950). This is determined by calculating the standard deviation at all times greater than the present time (in this example, all times greater than t=0.10). An example of a time dependent uncertainty curve is shown in FIG. 31. The curve in FIG. 31 represents the standard deviation at each exposure point of the time-dependent bias curve 300 in FIG. 30. In FIG. 31, it can be seen that the generally parabolic shape of the curve indicates that the uncertainty in the bias value goes up over time. Thus, if the designer knows where he is at any point in the cycle (past or present), such as at t=0.2, the curve can be used to predict the uncertainty in the bias value for the predicted dependent variable data at any other future time in the cycle.

An observation can be made by studying the curves in FIGS. 30 and 31 in greater detail. There is an exact and simple correlation that relates all of the uncertainties, represented as "σ", of a random system to time. If the uncertainty σ of the system is known at any point (example t=ref), the uncertainty σ of any other point can be calculated by the following set of equations in (1):

$$\sigma_{target} = \sigma_{ref}[t_{target}/t_{ref}]^{1/2} \text{ or rewritten as,}$$

$$\sigma^2_{target} t_{ref} = \sigma^2_{ref} t_{target} \text{ or rewritten as,}$$

$$\sigma^2_{target}/\sigma^2_{ref} = t_{target}/t_{ref} \quad (1)$$

The last equation of (1) illustrates the relation used to determine required future dependent variable uncertainties for a modeled independent variable measured-to-predicted system, In (1), $t_{target}$=desired time of desired uncertainty, $t_{ref}$=reference time where uncertainty of system is known, $\sigma_{ref}$=reference uncertainty at reference time ($t_{ref}$) and $\sigma_{target}$=desired uncertainty at desired time ($t_{target}$). As shown by the last equation of (1), relative time therefore equals relative uncertainty and relative uncertainty equals relative time. Therefore utilization of this relation can provide a determination of future uncertainties. Consequently, given the amount of future time that is required (i.e. the next control blade sequence interval) and data from a reference time, a good estimate of the required future uncertainty can be determined. The combination of this information can provide maximum fuel cycle efficiency while simultaneously providing event-free operation.

Extensive computer experiments have been performed to confirm that expression (1) is exact as the number of uncertainty curves for nuclear reactors increase to infinity.

Figure 32:
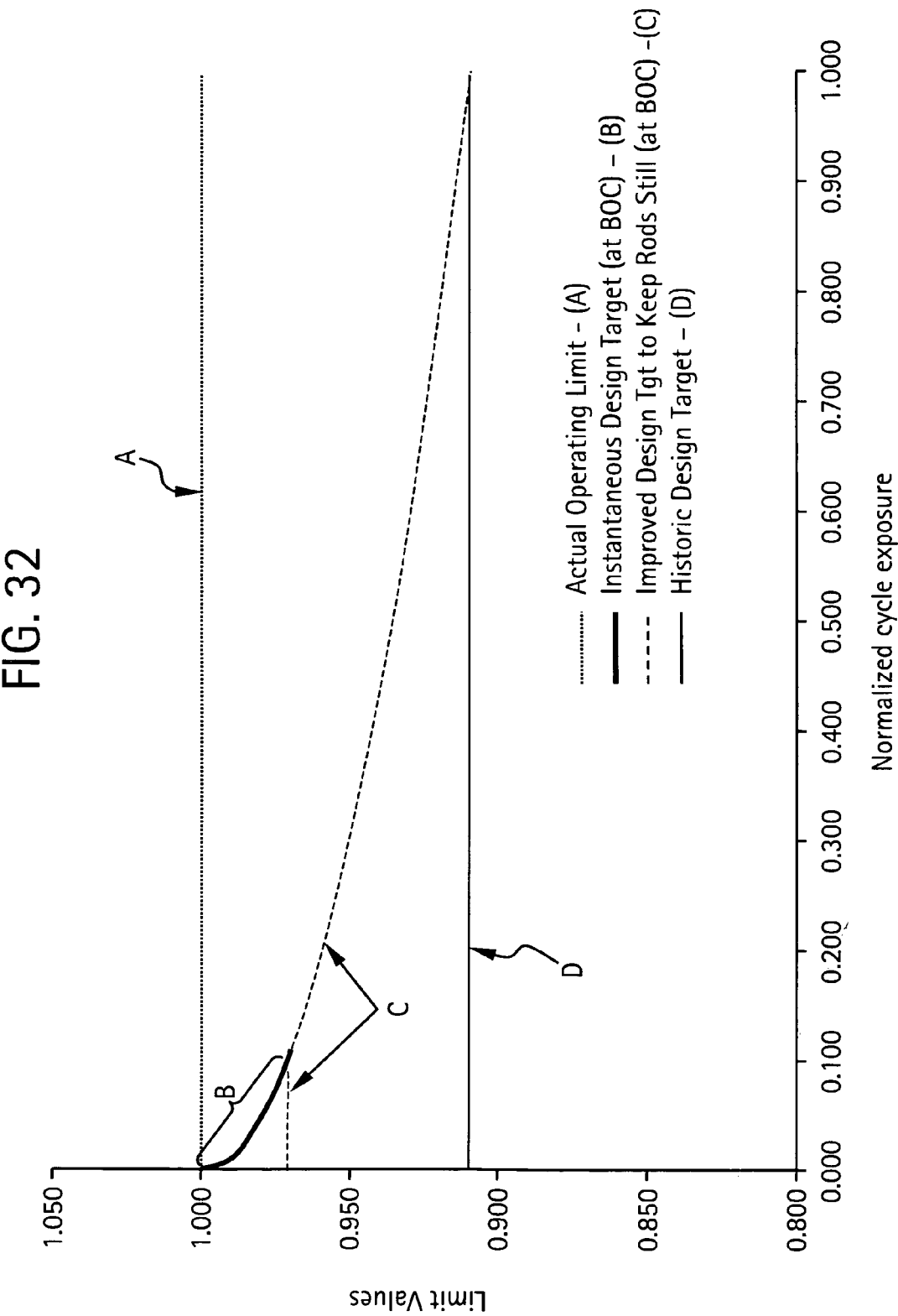
FIG. 32 is a graph to assist explanation of how a margin for a given operating limit is calculated based on the time-dependent bias value and time-dependent uncertainty value so as to satisfy a risk-tolerance level set for the plant being evaluated.

FIG. 32 is a graph to assist explanation of how a margin for a given operating limit is calculated based on the time-dependent bias value and time-dependent uncertainty value so as to satisfy a risk-tolerance level set for the plant being evaluated. Now that a time dependent bias (2940) and a time dependent uncertainty (2950) have been determined, this information can be used to determine a required or revised margin to the given operating limit (2970). This calculation is based on obtaining a risk-tolerance level 2960 for the plant being evaluated.

The risk-tolerance level may be understood as a desired predictability of meeting the operating limits of a customer's reactor plant, or in other word, a probability of an event not occurring in plant during a given period in the current operating cycle. For example if the number of historical data points is large (such as greater than 30) and the customer wanted a given probability (i.e. 90%, 95%, 99%, 99.9%, etc) of operating their nuclear reactor with fixed rod patterns for the first sequence of cycle operation, the following margin in FIG. 32 would be required. Where a smaller set of historical data points is used or specific confidence levels are required, multiplier constants known as probability K values should use appropriate confidence corrections.

In FIG. 32 (t=0), curve A represents the actual operating limit of any required thermal or power-related result (MFLCPR, MFLPD, MAPLHGR, etc). This is a line that should not be exceeded during the operation of the plant. The curve B represents the needed design target to make sure the operating limit is not violated at any future time. If the customer wanted to make sure that a first sequence of operation (t=0 to t=0.1) would not require any rod pattern modification, they would utilize the required margin prediction at t=0.1.

In FIG. 32, a design target operating limit of 0.971 would provide a sufficient margin to ensure, with 99.0% probability, that rod adjustments will not be needed (see curve C at t=0.1). Similarly, in FIG. 32 a design target of 0.953 would be required to ensure, with 99.9% probability, that rod adjustments will not be required. The 99.9% represents the risk tolerance level of the customer for this "non-event".

Accordingly, the probability value or risk-tolerance level is used to determine the multiplier constant K that is to be multiplied by the time-dependent uncertainty σ, or $\sigma_{target} = K\sigma_{ref}$, where $\sigma_{ref}$ is the known reference uncertainty at a given point in time, which provides a prediction of the uncertainty at any point in the cycle. In either case, a customer specific or plant specific solution may be easily determined.

In most cases, determining an operating margin based on a desired predictability of meeting the operating limit may provide additional margin for greater operating flexibility and superior fuel cycle efficiency (higher than the historic design target limit of curve D). In any case, the example methodology may reflect a more knowledgeable plan for reactor operation.

Based on the revised margin calculation at 2970 by processor 400, the designer can then revise plant operating parameters (2980) using processor 400, either by hand (manual calculations) or using an optimization routine to determine the desired rod pattern, core flow, power level, etc. Any suggested changes may be forwarded to operators of the plant being evaluated to change the operating conditions during the current cycle, if necessary or desired.

Referring now back to FIG. 4, once the core tracking routine of FIG. 28 and the revised margin determination routines of FIGS. 29-32 have been completed, the modify rod pattern tool as described above may be iterated in the cycle of interest, for the accepted power uprate core design, using the revised margins and current operating conditions determined from the core tracking and revised margin routines. Accordingly, the limits in block 500 are updated and follow on simulation, evaluation and possible rod pattern modification sub-processing is performed until all limits have been satisfied and/or are within an acceptable margin thereto as determined by the user or designer. Moreover, the processing steps 12*a-c* in block 1200 may be repeated (block 1300) for each energy cycle until all energy cycles have been evaluated for the accepted power uprate core design.

Therefore, in accordance with the example embodiments, there is provides a method and system for designing a nuclear reactor core for increased power operations. The system includes a GUI and processing to simulate a test initial reactor core design in an uprated power environment.

Constraints or limits related to requirements for operating a reactor core above 100% of its currently-licensed power level are input by the user via the GUI, and an initial test reactor core design is generated based on the limits. The user then may select one or more automated design tools to modify the rod pattern (control blade pattern) core loading pattern and desired unique fresh fuel bundle types (fresh fuel loading pattern) to meet power uprate requirements.

For each tool, the user initiates a reactor simulation and utilizes an objective function to determine how closely a simulated modified core design meets the constraints. Via the GUI, the user may then modify a given core design with a change in bundle design, control rod placement, exposed or fresh fuel placement, etc., and repeat simulation to gauge performance improvement in the derivate reactor core design. The modifying, simulating and evaluating functions may be iteratively repeated until a core design satisfies all limits (inclusive of limits for uprated power operations) so as to operate a reactor loaded based on the acceptable power uprate core design at increased power, or within a margin to given limits(s) that are acceptable to the user and/or customer.

As desired, the user may implement a core tracking function and a revise margin determination function to revise the accepted power uprate core design based on the current plant conditions and the power uprate requirement for operation therein. Upon determination of the revised margins to operating limits (thermal, power, etc.), the modify rod pattern tool may be iterated to confirm that the power uprate core design with the revised margins still satisfies all operating limits and constraints for operation in excess of its rated thermal output. Based on the accepted power uprate core design, the plant operators and/or staff may then modify their reactor core at a next planned outage to achieve the desired increased thermal output while satisfying NRC licensing requirements.

The example embodiments of the present invention being thus described, it will be obvious that the same may be varied in many ways. For example, the functional blocks of FIGS. 1-4, 6, 11, 13, 14, 18A-B, 22, 23A-B, 25, and 27A-B through 29 describing the exemplary methodologies and system may be implemented in hardware and/or software. The hardware/software implementations may include a combination of processor(s) as shown and/or article(s) of manufacture. The article(s) of manufacture may further include storage media and executable computer program(s).

The executable computer program(s) may include the instructions to perform the described processes or functions to determine a power uprate core design. The computer executable program(s) may also be provided as part of externally supplied propagated signal(s).

The technical effect of the invention may be a system and/or method invoking the processing capabilities of multiple processors(s) and/or computer program logic of the programs implemented by the one or more processors to provide a way to efficiently develop a power uprate core design a nuclear reactor that satisfies all input limits and constraints for reactor operation in a given plant being evaluated. Additionally, the technical effect of the example embodiments provide a computer/processing-driven system for providing internal and external users the ability to quickly develop, simulate, modify and perfect a power uprate core design with a specified rod pattern, core loading pattern for exposed fuel and fresh fuel assemblies which satisfies all input limits including those limits related to reactor power operations in excess of the plant's rated thermal output. The accepted design may thus be loaded in the core of the evaluated reactor plant at a next scheduled outage, with the core operating in a next and subsequent cycles in accordance with the thus determined power uprate core design.

Such variations are not to be regarded as departure from the spirit and scope of the exemplary embodiments of the present invention, and all such modifications as would be obvious to one skilled in the art are intended to be included within the scope of the following claims.

What is claimed is:

1. A method of modifying a nuclear reactor core for uprated power operations, comprising:
   inputting a set of constraints to be satisfied for uprated power operations, the uprated power operations operating at greater than 100% of a currently-licensed power level for the nuclear reactor core;
   generating a test reactor core design based on the constraints;
   selecting, from a set of automated tools, one or more automated tools to evaluate the test core design against the constraints; and
   operating the selected automated tool, including,
      simulating reactor operation with the test core design, based on the constraints, to produce a plurality of outputs,
      comparing the outputs against the constraints, and
      providing data indicating constraints that were violated by the test core design during the simulation, based on the comparison,
      providing procedural recommendations for modifying the test reactor core design to achieve the uprated power operations based on the violated constraints, wherein one of more of the automated tools are iterated until a test core design meets all constraints for uprated power operations, thereby representing an acceptable power uprate core design.

2. The method of claim 1, wherein the set of automated tools includes a rod pattern design tool to modify the rod pattern of the test core design, a core loading pattern design tool to modify core loading pattern of the test core design, and a fresh fuel bundle type design tool to modify the fresh fuel loading pattern within the test core design.

3. The method of claim 2, wherein each of the rod pattern, core loading pattern and fresh fuel bundle type design tools are invoked sequentially and provide feedback as an output to each corresponding tool, until all rod, exposed fuel and fresh fuel changes have been exhausted in the test core design.

4. The method of claim 1, further comprising:
storing information related to the test design, constraints, outputs and data from the comparison.

5. The method of claim 1, wherein inputting a set of constraints further includes:
defining input constraints applicable to variables that are to be input for performing the simulating step; and
defining output constraints applicable to the outputs,
wherein the input constraints and output constraints are evaluated in the comparison step.

6. The method of claim 5, wherein the input constraints are related to client-inputted plant specific constraints and core performance criteria.

7. The method of claim 5, wherein the output constraints are related to at least one of operational parameter limits used for reactor operation, core safety limits, margins to those operational and safety limits and client-inputted plant specific constraints.

8. The method of claim 1, wherein the comparing step further comprises:
configuring an objective function to evaluate the outputs; and
generating objective function values for each output using the objective function; and
evaluating the objective function values based on the constraints to determine which of the outputs violate a limit.

9. The method of claim 1, further comprising:
outputting data related to an acceptable power uprate core design, if the comparing step indicates that all constraints have been satisfied, or satisfied within an acceptable margin.

10. The method of claim 1, further comprising:
modifying the test core design to create a derivative core design; and
repeating the selecting and operating steps for multiple automated tools to determine whether any constraints were violated by the derivative core design during the simulation.

11. The method of claim 10, wherein, for the derivative core design, the selecting step selects the same automated tool used for the test core design.

12. The method of claim 10, wherein, for the derivative core design, the selecting step selects a different automated tool than used for the test core design.

13. The method of claim 10, further comprising:
iteratively repeating the modifying, selecting and operating steps for N iterations of the derivative design, and, for selected ones of the N iterations,
storing information at each iteration related to the given derivative core design, constraints, outputs and data from the comparison.

14. The method of claim 13, wherein, based on which constraints were violated by a particular derivative design, a specific automated tool is selected for a subsequent iteration.

15. The method of claim 13, wherein the iteratively repeating step is performed until a particular iteration of a derivative design indicates that all constraints have been satisfied, or satisfied within an acceptable margin, the method further comprising:
outputting data related to an acceptable reactor core design for the nuclear reactor.

16. The method of claim 1, wherein the acceptable power uprate core design includes data illustrating to a user how to load and run the reactor to satisfy the constraints and operate at the increased power level.

17. The method of claim 1, wherein the accepted power uprate core design has N unique fresh fuel bundle types, N≥2.

18. The method of claim 1, wherein the constraints to be satisfied for uprated power operations include client-inputted plant-specific limits and core performance criteria for uprate reactor power operation and core flow, the method further comprising:
accessing actual exposure accounting data from the evaluated plant for a given cycle of interest,
revising margins to the plant specific limits based on the exposure accounting data, and
simulating reactor operation with the accepted power uprate core design based on the revised margins using one of the selectable automated tools to determine if the accepted power uprate core design satisfies the limits with the revised margins thereto.

19. A core of a nuclear reactor, the core loaded in accordance with the method of claim 1.

\* \* \* \* \*